(12) United States Patent  
Yanagisawa et al.

(10) Patent No.: US 7,926,953 B2  
(45) Date of Patent: Apr. 19, 2011

(54) PROJECTOR WITH SEALED STRUCTURE HAVING AIR CIRCULATION PATH

(75) Inventors: Yoshiyuki Yanagisawa, Matsumoto (JP); Yasunaga Momose, Tatsuno-machi (JP)

(73) Assignee: Seiko Epson Corporation, Tokyo (JP)

( * ) Notice: Subject to any disclaimer, the term of this patent is extended or adjusted under 35 U.S.C. 154(b) by 965 days.

(21) Appl. No.: 11/808,534

(22) Filed: Jun. 11, 2007

(65) Prior Publication Data

US 2007/0291238 A1 Dec. 20, 2007

(30) Foreign Application Priority Data

Jun. 15, 2006 (JP) ................................. 2006-166315

(51) Int. Cl.
*G03B 21/18* (2006.01)

(52) U.S. Cl. .............. 353/61; 353/57; 353/58; 352/202; 362/294

(58) Field of Classification Search .................... 353/61, 353/58, 52, 56; 352/202; 362/294
See application file for complete search history.

(56) References Cited

U.S. PATENT DOCUMENTS

| | | | | |
|---|---|---|---|---|
| 5,638,687 | A * | 6/1997 | Mizohata et al. | 62/62 |
| 5,813,233 | A * | 9/1998 | Okuda et al. | 62/3.7 |
| 6,350,033 | B1 | 2/2002 | Fujimori | |
| 6,428,170 | B1 | 8/2002 | Haba | |
| 6,443,575 | B1 * | 9/2002 | Miyamoto et al. | 353/58 |
| 6,554,432 | B2 * | 4/2003 | Ohfune et al. | 353/57 |
| 6,783,245 | B2 * | 8/2004 | Shiaki et al. | 353/61 |
| 6,890,078 | B2 | 5/2005 | Koide | |
| 2002/0008852 | A1 * | 1/2002 | Onishi et al. | 353/57 |
| 2005/0274892 | A1 * | 12/2005 | Oda | 250/339.04 |
| 2006/0209266 | A1 * | 9/2006 | Utsunomiya | 353/54 |
| 2006/0290895 | A1 * | 12/2006 | Park et al. | 353/61 |

FOREIGN PATENT DOCUMENTS

JP A 10-221779 8/1998

(Continued)

*Primary Examiner* — Thanh X Luu  
*Assistant Examiner* — Kevin Wyatt  
(74) *Attorney, Agent, or Firm* — Oliff & Berridge, PLC

(57) ABSTRACT

A projector includes: an optical component; a sealed structure that includes an optical component casing accommodating the optical component inside, a cooling device, a plurality of duct members including a flow-path-upstream-side duct member that guides the air from the cooling device to the optical component casing, and a ringed air flow passage defined by the duct members, the optical component casing including an air inlet for introducing air into the optical component casing and an air outlet for exhausting the air to an outside of the optical component casing, the cooling device including a thermoelectric conversion element having a heat absorbing surface that faces an inside of the sealed structure and a heat releasing surface that faces an outside of the sealed structure, the duct members introducing the air into the optical component casing via the air inlet and re-introducing the air that is exhausted from the inside to the outside of the optical component casing via the air outlet again into the optical component casing via the air inlet, the flow-path-upstream-side duct member formed of a material having a heat conductivity of equal to or lower than 0.9 W/(m·k), the optical component disposed in the air flow passage, the air flow passage allowing the air circulating therein; and a circulation fan that circulates the air in the ringed air flow passage, the circulation fan disposed on a downstream side of the cooling device and an upstream side of the optical component casing along an air-flowing direction in the air flow passage.

11 Claims, 29 Drawing Sheets

FOREIGN PATENT DOCUMENTS

| | | |
|---|---|---|
| JP | A 2000-221598 | 8/2000 |
| JP | A 2000-298311 | 10/2000 |
| JP | A 2001-355937 | 12/2001 |
| JP | A 2003-233132 | 8/2003 |
| JP | A 2003-337380 | 11/2003 |
| JP | A 2004-37862 | 2/2004 |
| JP | A 2005-115220 | 4/2005 |
| JP | A 2005-121712 | 5/2005 |

* cited by examiner

PROJECTOR WITH SEALED STRUCTURE HAVING AIR CIRCULATION PATH

The entire disclosure of Japanese Patent Application No. 2006-166315, filed Jun. 15, 2006, is expressly incorporated by reference herein.

BACKGROUND

1. Technical Field

The present invention relates to a projector.

2. Related Art

There has been known a projector that includes a light source device, an optical modulator that modulates a light beam irradiated from the light source device in accordance with image information to form an optical image; and a projection optical device that projects the optical image in an enlarged manner.

In the projector, when dust, lamp black or the like is attached on a surface of the optical modulator, image quality of a projected image is deteriorated. In addition, since the optical modulator such as a liquid crystal panel is generally heat-sensitive, the optical modulator may be deteriorated due to heat caused by irradiation of a light beam from the light source device.

With such a background, to ensure stable image quality of the projected image and to efficiently cool the optical modulator, an arrangement has been suggested in which the optical modulator is disposed in a sealed structure, air in the sealed structure is circulated by a circulation fan, and heat in the air in the sealed structure is released to the outside of the sealed structure by a thermoelectric conversion element such as a peltier element (see, for example, Document: JP-A-2000-298311).

In the arrangement disclosed in Document, the thermoelectric conversion element, the optical modulator and the circulation fan are disposed in order of mention along an air-flowing direction in the sealed structure.

However, in the sealed structure, when the circulation fan sucks air around the optical modulator and sends air that is cooled on a heat absorbing surface of the thermoelectric conversion element to the optical modulator, the cooled air is likely to stay between the thermoelectric conversion element and the optical modulator due to the arrangement in which the optical modulator is interposed between the thermoelectric conversion element and the circulation fan. Accordingly, it is difficult to send the air that is cooled to low temperature on the heat absorbing surface of the thermoelectric conversion element to the optical modulator while maintaining the low temperature, and thus difficult to cool the optical modulator efficiently. In order to cool the optical modulator efficiently, for example, rotation speed of the circulation fan needs to be increased or power consumption of the thermoelectric conversion element needs to be increased.

Therefore, there has been a demand for a technology that realizes efficient cooling of optical components such as the optical modulator while stably securing an image quality of a projected image.

SUMMARY

An advantage of some aspects of the invention is to provide a projector that can realize efficient cooling of optical components while stably securing image quality of a projected image.

A projector according to an aspect of the invention includes: an optical component; a sealed structure that includes an optical component casing accommodating the optical component inside, a cooling device, a plurality of duct members including a flow-path-upstream-side duct member that guides the air from the cooling device to the optical component casing, and a ringed air flow passage defined by the duct members, the optical component casing including an air inlet for introducing air into the optical component casing and an air outlet for exhausting the air to an outside of the optical component casing, the cooling device including a thermoelectric conversion element having a heat absorbing surface that faces an inside of the sealed structure and a heat releasing surface that faces an outside of the sealed structure, the duct members introducing the air into the optical component casing via the air inlet and re-introducing the air that is exhausted from the inside to the outside of the optical component casing via the air outlet again into the optical component casing via the air inlet, the flow-path-upstream-side duct member formed of a material having a heat conductivity of equal to or lower than 0.9 W/(m·k), the optical component disposed in the air flow passage, the air flow passage allowing the air circulating therein; and a circulation fan that circulates the air in the ringed air flow passage, the circulation fan disposed on a downstream side of the cooling device and an upstream side of the optical component casing along an air-flowing direction in the air flow passage.

According to the aspect of the invention, since the optical components such as the optical modulator are accommodated in the optical component casing of the sealed structure, dust, lamp black or the like can be prevented from adhering on the optical components, thereby ensuring stable image quality in projection image projected from the projector.

In addition, since the cooling device, the circulation fan and the optical component casing that form the sealed structure are disposed in order of mention along the air-flowing direction in the air flow passage in the sealed structure. With the arrangement, the circulation fan sucks the air that is cooled on the heat absorbing surface of the thermoelectric conversion element of the cooling device and ejects the cooled air to optical components accommodated in the optical component casing. Accordingly, the air that is cooled to a low temperature on the heat absorbing surface of the thermoelectric conversion element can be sent to the optical components while maintaining the low temperature, thereby efficiently cooling the optical components.

Especially, by employing a sirocco fan which is a centrifugal fan as the circulation fan, ejecting pressure and air speed of the ejected air can be sufficiently secured, thereby efficiently cooling the optical components.

The flow-path-upstream-side duct member out of the plurality of duct members is formed of a material having heat conductivity of equal to or lower than 0.9 W/(m·k). By forming the flow-path-upstream-side duct member of a material having a sufficiently low heat conductivity, heat of the air outside the sealed structure or heat of components disposed outside the sealed structure can be prevented from being transferred via the flow-path-upstream-side duct member to the air flowing from the cooling device to the optical component casing. Accordingly, the air that is cooled to a low temperature on the heat absorbing surface of the thermoelectric conversion element can be sent to the optical components while maintaining the low temperature, thereby appropriately and efficiently cooling the optical components.

By employing a structure for efficiently cooling the optical components as described above, rotation speed of the circulation fan does not have to be unnecessarily increased, thereby contributing to noise-reduction of the projector. In addition, power consumption of the thermoelectric conversion element needs not be unnecessarily increased, thereby contributing to power-saving of the projector.

In the projector according to the aspect of the invention, it is preferable that a flow-path-downstream-side duct member out of the plurality of duct members that guides the air from the optical component casing to the cooling device is formed of a material having a heat conductivity of equal to or higher than 42 W/(m·K).

According to the aspect of the invention, since the flow-path-downstream-side duct member out of the plurality of duct members is formed of a material having a sufficiently high heat conductivity as described above, heat of the air flowing in the flow-path-downstream-side duct member (i.e., heat of the air heated by the optical components accommodated in the optical component casing) can be released to the outside of the sealed structure via the flow-path-downstream-side duct member. With the arrangement, the temperature of the air flowing in the air flow passage in the sealed structure can be set to sufficiently low, so that the optical components can be cooled more efficiently.

In the projector according to the aspect of the invention, it is preferable that: a flow-path-downstream side duct member out of the plurality of duct members that guides the air from the optical component casing to the cooling device includes a high-heat-conductive duct portion at a position planarly interfering with the air outlet; and the high-heat-conductive duct portion is formed of a material having a heat conductivity of equal to or higher than 42 W/(m·K).

According to the aspect of the invention, the flow-path-downstream-side duct member out of the plurality of duct members has a high-heat-conductive duct portion formed of the above-described material having a sufficiently high heat conductivity at a position planarly interfering with the air outlet. In other words, in the flow-path-downstream-side duct member, a portion onto which the air heated by the optical components accommodated in the optical component casing is blown is provided with the high-heat-conductive duct portion. With the arrangement, the heat of the air flowing in the flow-path-downstream-side duct member (i.e., the heat of the air heated by the optical components accommodated in the optical component casing) can be released to the outside of the sealed structure through the high-heat-conductive duct portion. With the arrangement, the temperature of the air flowing in the air flow passage in the sealed structure can be set to sufficiently low, so that the optical components can be cooled more efficiently.

In the projector according to the aspect of the invention, it is preferable that: the flow-path-downstream-side duct member includes two components of the high-heat-conductive duct portion and a low-heat-conductive portion that is disposed close to the optical component casing; and the low-heat-conductive duct portion is formed of a material having a heat conductivity of equal to or lower than 0.9 W/(m·K).

According to the aspect of the invention, the flow-path-downstream-side duct member is formed by the two components of the above-described high-heat-conductive duct portion and the low-heat-conductive duct portion that is formed of the above-described material having a sufficiently low heat conductivity and disposed close to the optical component casing. With the arrangement, the heat transferred from the optical components and the like to the optical component casing can be prevented from being transferred via the low-heat-conductive duct portion to the air flowing in the flow-path-downstream-side duct member. Accordingly, by forming the flow-path-downstream-side duct member by the two components of the high-heat-conductive duct portion and the low-heat-conductive duct portion, the temperature of the air flowing in the air flow passage of the sealed structure can be set to sufficiently low, so that the optical components can be cooled more efficiently.

In the projector according to the aspect of the invention, it is preferable that the cooling device includes a heat-absorbing-side heat conductive member, a heat-releasing-side heat conductive member, a cooling fan and an outer-side duct member, the heat-absorbing-side heat conductive member and the heat-releasing-side heat conductive member respectively attached to the heat absorbing surface and the heat releasing surface of the thermoelectric conversion element in a heat-conductive manner, the cooling fan introducing the air from an outside of the projector into an inside of the projector and ejecting the air toward the heat-releasing-side heat conductive member, the outer-side duct member guiding the air that is ejected by the cooling fan and passed through the heat-releasing-side heat conductive member to a heat-generating member disposed outside the sealed structure in the projector.

According to the aspect of the invention, in the cooling device, the heat-absorbing-side heat conductive member and the heat-releasing-side heat conductive member are heat-conductively attached to the heat absorbing surface and the heat releasing surface of the thermoelectric conversion element, surface areas of the heat absorbing surface for absorbing heat and the heat releasing surface for releasing heat can be large. The cooling device includes the cooling fan that ejects the air to the heat-releasing-side heat conductive member. With the arrangement, absorption and release of heat can be properly performed in the cooling device, thereby sufficiently cooling the air flowing in the air flow passage in the sealed structure.

Since the projector includes the outer-side duct member, the air ejected from the cooling fan and passed through the heat-releasing-side heat conductive member can be sent to the heat-generating member outside the sealed structure in the projector. With the arrangement, the projector does not have to be provided with a cooling fan dedicated to cool the heat-generating member, thereby reducing the number of cooling fans and simplifying a cooling mechanism for cooling the heat-generating member outside the sealed structure.

The projector according to the aspect of the invention preferably further includes a control board that controls components of the projector. The optical component casing, the flow-path-downstream-side duct member out of the plurality of duct members that guides the air from the optical component casing to the cooling device and the control board are preferably disposed in order of mention in an overlapping manner. The outer-side duct member preferably guides the air that is ejected from the cooling fan and passed through the heat-releasing-side heat conductive member to a position between the flow-path-downstream-side duct member and the control board.

According to the aspect of the invention, since the outer-side duct member introduces the air ejected from the cooling fan and passed through the heat-releasing-side heat conductive member to a position between the flow-path-downstream-side duct member and the control board, the air can cool the flow-path-downstream-side duct member and a circuit element or the like mounted on the control board that are heated by the heat of the air heated by the optical components accommodated in the optical component casing, so that the flow-path-downstream-side duct member and the control board can be prevented from being deteriorated by the heat.

The projector according to the aspect of the invention preferably further includes: a control device, a heat-absorbing-side temperature detector and an ambient temperature detector, the control device applying a voltage to the thermoelectric conversion element to control drive of the thermoelectric conversion element, the heat-absorbing-side temperature detector detecting a temperature of a heat-absorbing-side heat conductive member that is attached to the heat absorbing surface of the thermoelectric conversion element in a heat-conductive manner, the ambient temperature detector detecting an ambient temperature outside the sealed structure. The control device preferably includes: a set temperature difference information storage section that stores set temperature difference information about a set temperature difference between a set temperature of the heat-absorbing-side heat conductive member and a set ambient temperature outside the sealed structure; and a polarity switch controller that performs a polarity switch control in which the polarity switch controller compares a detected temperature detected by the heat-absorbing-side temperature detector with an ambient temperature detected by the ambient temperature detector and switches polarity of the voltage applied to the thermoelectric conversion element when a detected temperature difference between the detected temperature and the ambient temperature becomes equal to or larger than the set temperature difference based on the set temperature difference information.

Meanwhile, in a driving state of the projector, namely in a driving state of the thermoelectric conversion element, when the temperature of the heat absorbing surface of the thermoelectric conversion element becomes excessively low relative to the ambient temperature, condensation occurs on a heat absorbing side of the cooing device. The occurrence of the condensation on the heat absorbing side of the cooling device might cause operational defect of the cooling device.

In this regard, in the invention, the polarity switch controller of the control device for the thermoelectric conversion element recognizes, in the driving state of the thermoelectric conversion element, the detected temperature of the heat-absorbing-side heat conductive member detected by the heat-absorbing-side temperature detector and the ambient temperature of the outside of the sealed structure detected by the ambient temperature detector, the heat-absorbing-side heat conductive member attached heat-conductively to the absorbing surface of the thermoelectric conversion element and thus receiving the heat of the absorbing surface. Based on the recognized temperatures, the polarity switch controller constantly calculates the difference (detected temperature difference) between the detected temperature and the ambient temperature. The polarity switch controller then compares the detected temperature difference with the set temperature difference based on the set temperature difference information stored in the set temperature difference information storage section. When the detected temperature difference becomes equal to or larger the set temperature difference, the polarity switch controller performs the polarity switch control for switching the polarity of the voltage applied to the thermoelectric conversion element. Specifically, by the polarity switch control for switching the polarity of the voltage applied to the thermoelectric conversion element (i.e., by switching a direction of a current of the thermoelectric conversion element), a surface facing the inside of the sealed structure in the thermoelectric conversion element is switched to the heat releasing surface, while a surface facing the outside of the sealed structure in the thermoelectric conversion element is switched to the heat absorbing surface. With the arrangement, by performing the polarity switch control when the detected temperature difference is equal to or larger than the set temperature difference, namely when the temperature of the heat absorbing surface of the thermoelectric conversion element becomes excessively low relative to the ambient temperature, the temperature of the surface facing the inside of the sealed structure in the thermoelectric conversion element is increased. Accordingly, the occurrence of the condensation on the heat absorbing side (on an inner side of the sealed structure) of the cooling device can be prevented, thereby preventing the operational defect of the cooling device caused by the condensation.

The projector according to the aspect of the invention preferably further includes: a control device that applies a voltage to the thermoelectric conversion element to control drive of the thermoelectric conversion element. The control device preferably includes a rectangular controller that performs a rectangular control in which the rectangular controller increases stepwise the voltage applied to the thermoelectric conversion element to a normal voltage value when the drive of the thermoelectric conversion element is started and decreases stepwise the voltage applied to the thermoelectric conversion element from the normal voltage value when the drive of the thermoelectric conversion element is stopped.

Meanwhile, in a case where the normal voltage value for normally driving the thermoelectric conversion element is applied to the thermoelectric conversion element in a short time when the drive of the thermoelectric conversion element is started, gradient of temperature fall on the heat absorbing side of the cooling device is relatively large and gradient of temperature rise on the beat releasing side of the cooling device is relatively large. When the gradient of the temperature change is relatively large, connecting states among components of the cooling device are broken due to thermal stress among the components, which might result in operational defect of the cooling device. Also in a case where the voltage value applied to the thermoelectric conversion element is changed from the normal voltage value to 0V in a short time when the drive of the thermoelectric conversion element is stopped, the operational defect of the cooling device might occur similarly to the above case.

In the aspect of the invention, when the drive of the thermoelectric conversion element is started, the rectangular controller of the control device for the thermoelectric conversion element performs the rectangular control for increasing stepwise the voltage value applied to the thermoelectric conversion element from 0V to the normal voltage value. With the arrangement, as compared to the above-described arrangement in which the normal voltage value is applied to the thermoelectric conversion element in a short time, the gradient of the temperature fall on the heat absorbing side of the cooling device can be small while the gradient of the temperature rise on the heat releasing side of the cooling device can be small. Accordingly, the thermal stress among the components of the cooling device can be reduced, thereby preventing the operational defect of the cooling device.

Likewise, when the drive of the thermoelectric conversion element is started, the rectangular controller performs the rectangular control for decreasing stepwise the voltage value applied to the thermoelectric conversion element from the normal voltage value to 0V. With the arrangement, as compared to the above-described arrangement in which the voltage value applied to the thermoelectric conversion element is changed from the normal voltage value to 0V in a short time, the gradient of the temperature rise on the heat absorbing side of the cooling device can be small while the gradient of the temperature fall on the heat releasing side of the cooling device can be small. Accordingly, the thermal stress among the components of the cooling device can be reduced, thereby preventing the operational defect of the cooling device.

The projector according to the aspect of the invention preferably further includes: a control device that applies a voltage to the thermoelectric conversion element to control drive of the thermoelectric conversion element; and an internal air temperature detector that detects an air temperature inside the sealed structure. The control device preferably includes: a set temperature information storage section that stores set temperature information about a set air temperature inside the sealed structure; a duty ratio information storage section that stores duty ratio information about a predetermined duty ratio; and a duty ratio controller that performs a duty ratio control in which the duty ratio controller compares a detected temperature detected by the internal air temperature detector with a set temperature based on the set temperature information and intermittently drives the thermoelectric conversion element with a duty ratio based on the duty ratio information when the detected temperature becomes equal to or lower than the set temperature.

It should be noted that the duty ratio information is information about a ratio (duty ratio) of a drive time per unit time when the voltage is applied to the thermoelectric conversion element to a non-drive time per unit time when the voltage is not applied to the thermoelectric conversion element, during a state where the thermoelectric conversion element is intermittently performed.

In the aspect of the invention, the duty ratio controller of the control device for the thermoelectric conversion element constantly recognizes the detected temperature of the air in the sealed structure that is detected by the internal air temperature detector during the drive time of the thermoelectric conversion element. The duty ratio controller performs the duty ratio control in which the duty ratio controller compares the detected temperature with the set temperature based on the set temperature information stored in the set temperature information storage section and intermittently drives the thermoelectric conversion element with the duty ratio based on the duty ratio information stored in the duty ratio information storage section when the detected temperature becomes equal to or lower than the set temperature, namely when the drive of the thermoelectric conversion element is stabilized. With the arrangement, as compared to an arrangement in which a certain normal voltage is constantly applied even after the drive of the thermoelectric conversion element is stabilized, consumption power of the thermoelectric conversion element can be reduced, thereby contributing to power saving of the projector. In addition, since the duty ratio control is performed after the drive of the thermoelectric conversion element is stabilized, in the cooling device, the cooling efficiency of the air flowing in the air flow passage in the sealed structure can be sufficiently ensured.

The projector according to the aspect of the invention preferably further includes: a control device that applies a voltage to the thermoelectric conversion element to control drive of the thermoelectric conversion element; and an internal air temperature detector that detects an air temperature inside the sealed structure. The control device preferably includes: a set temperature information storage section that stores set temperature information about a set air temperature inside the sealed structure; a drive time information storage section that stores normal drive time information about a normal drive time of for normally driving the thermoelectric conversion element and low-voltage drive time information about a low-voltage drive time for driving the thermoelectric conversion element at a low voltage lower than a normal voltage value that is applied during the normal drive time; and a voltage switch controller that performs a voltage switch control in which the voltage switch controller compares a detected temperature detected by the internal air temperature detector with a set temperature based on the set temperature information and repeatedly performs normal drive and low-voltage drive based on the normal drive time information and the lo-voltage drive time information when the detected temperature becomes equal to or lower than the set temperature.

In the aspect of the invention, the voltage switch controller of the control device for the thermoelectric conversion element constantly recognizes the detected temperature of the air in the sealed structure that is detected by the internal air temperature detector during the drive time of the thermoelectric conversion element. The voltage switch controller performs the voltage switch control in which the voltage switch controller compares the detected temperature with the set temperature based on the set temperature information stored in the set temperature information storage section and repeatedly performs the normal drive and the low-voltage drive when the detected temperature becomes equal to or lower than the set temperature, namely when the drive of the thermoelectric conversion element is stabilized. In the normal drive, the normal voltage value is applied to the thermoelectric conversion element for the normal drive time based on the normal drive time information stored in the drive time information storage section. In the low-voltage drive, the low voltage value lower than the normal voltage value is applied to the thermoelectric conversion element for the low-voltage drive time based on the low-voltage drive time information stored in the drive time information storage section With the arrangement, as compared to an arrangement in which a certain normal voltage is constantly applied even after the drive of the thermoelectric conversion element is stabilized, power consumption of the thermoelectric conversion element can be reduced, thereby contributing to power saving of the projector. In addition, since the voltage switch control is performed after the drive of the thermoelectric conversion element is stabilized, in the cooling device, the cooling efficiency of the air flowing in the air flow passage in the sealed structure can be sufficiently ensured.

BRIEF DESCRIPTION OF THE DRAWINGS

The invention will be described with reference to the accompanying drawings, wherein like numbers reference like elements.

DESCRIPTION OF EXEMPLARY
EMBODIMENT(S)

First Exemplary Embodiment

Figure 1:
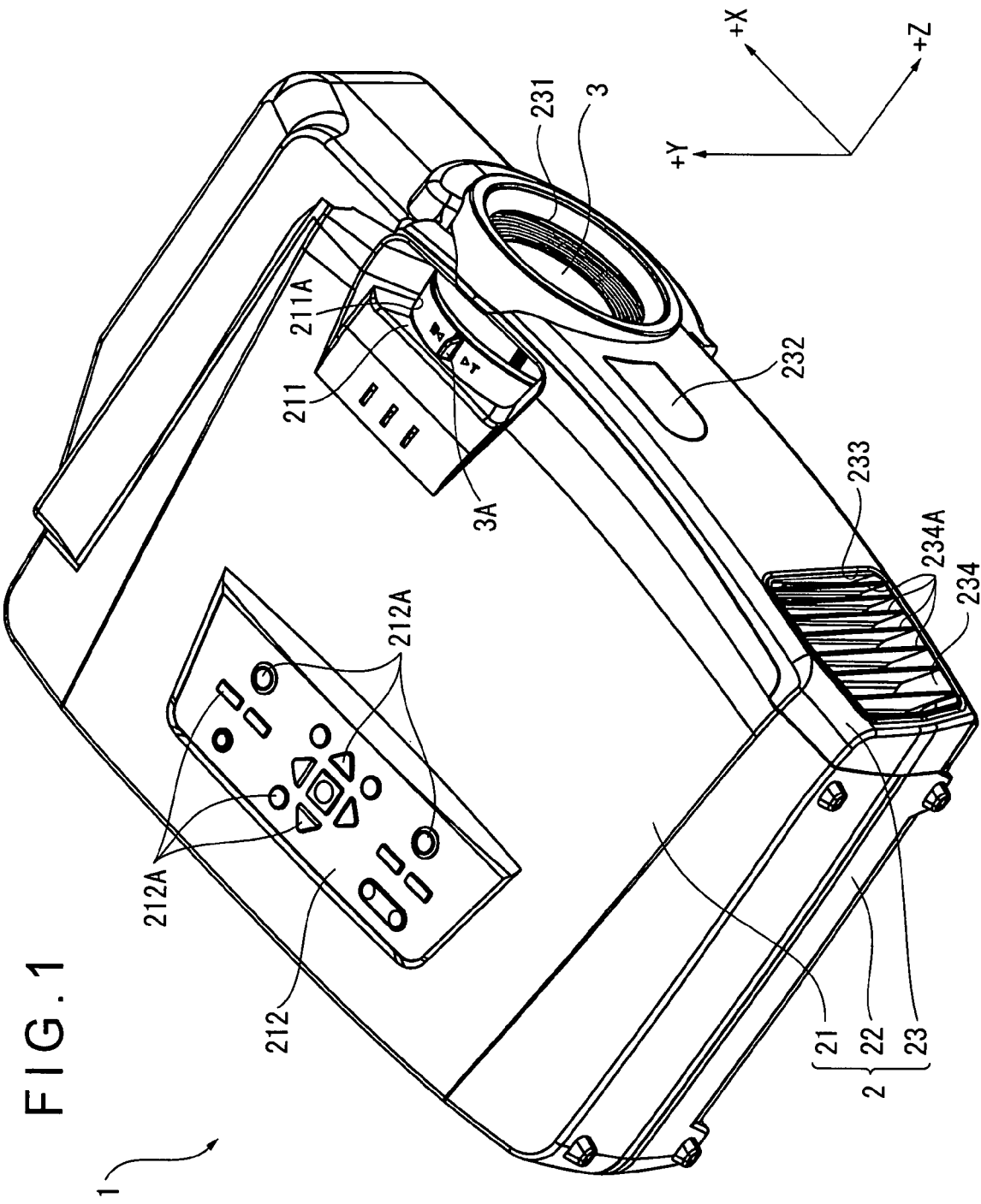
FIG. 1 is a perspective view showing an external appearance of a projector of a first exemplary embodiment.

A first exemplary embodiment of the invention will be described below with reference to the drawings.
1 External Arrangement FIG. 1 is a perspective view showing an external appearance of a projector 1 of the first exemplary embodiment. Specifically, FIG. 1 is a perspective view of the projector 1 when seen from an upper front side. Note that, in FIG. 1, a direction in which an optical image is projected is defined as the Z axis and two axes orthogonal to the Z axis are defined as the X axis (a horizontal axis) and the Y axis (a vertical axis) for easy understanding. In the other figures, the same is applied.

The projector 1 modulates a light beam irradiated from a light source in accordance with image information to form an optical image and projects the optical image on a screen (not shown) in an enlarged manner. As shown in FIG. 1, the projector 1 includes a substantially rectangular parallelepiped exterior casing 2 and a projection lens 3 as a projection optical device that is exposed from the exterior casing 2.

The projection lens 3 is a lens set including a plurality of lenses accommodated in a cylindrical lens barrel. The projection lens 3 projects in an enlarged manner the optical image that is modulated by a device main body of the projector 1 in accordance with the image information. The projection lens 3 includes a lever 3A for changing relative positions of the plurality of lenses. The projection lens 3 can adjust a focus and a magnification of the to-be-projected optical image.

The exterior casing 2 is a casing made of synthetic resin and accommodates the device main body of the projector 1. As shown in FIG. 1, the exterior casing 2 includes: an upper case 21 covering an upper portion, a part of a front surface portion, parts of lateral surface portions and a part of a rear surface portion of the device main body; a lower case 22 covering a lower portion, a part of the front surface portion, parts of the lateral surface portions and a part of the rear surface portion of the device main body; and a front case 23 covering a part of the front surface portion of the device main body.

As shown in FIG. 1, a dented portion 211 that is dented toward an inner side of the exterior casing 2 is provided on a plus X axis direction side (the right side when seen from a front side) on the upper portion of the upper case 21. An opening portion 211A is formed in a bottom portion of the dented portion 211, the opening portion 211A communicating with the inside. The lever 3A of the projection lens 3 is exposed through the opening portion 211A, so that the lever 3A can be operated.

As shown in FIG. 1, an operation panel 212 for actuating and adjusting the projector 1 is provided substantially at the middle in plan view of the upper portion of the upper case 21, the operation panel 212 extending in right and left directions. When an operation button 212A of the operation panel 212 is pressed down, the operation button 212A touches a tactile switch mounted on a circuit board (not shown) disposed on an inner side of the operation button 212A, thereby allowing a desired operation.

Note that the circuit board of the above-described operation panel 212 is electrically connected with a later-described control board. An operation signal accompanying the pressing operation of the operation button 212A is output to the control board.

Although not specifically shown, a power-source air inlet is formed in the rear surface portion of the upper case 21 on a minus X axis direction side (the right side when seen from a rear side), the inside and the outside of the exterior casing 2 communicated with each other by the power-source air inlet. The power-source air inlet is an opening for introducing cooling air from the outside to the inside of the exterior casing 2. The cooling air is introduced from the outside of the exterior casing 2 through the power-source air inlet into the inside of the exterior casing 2 by a later-described inside-casing cooling device of the device main body in the exterior casing 2. The cooling air is then sent to a power source unit of the device main body.

Figure 2:
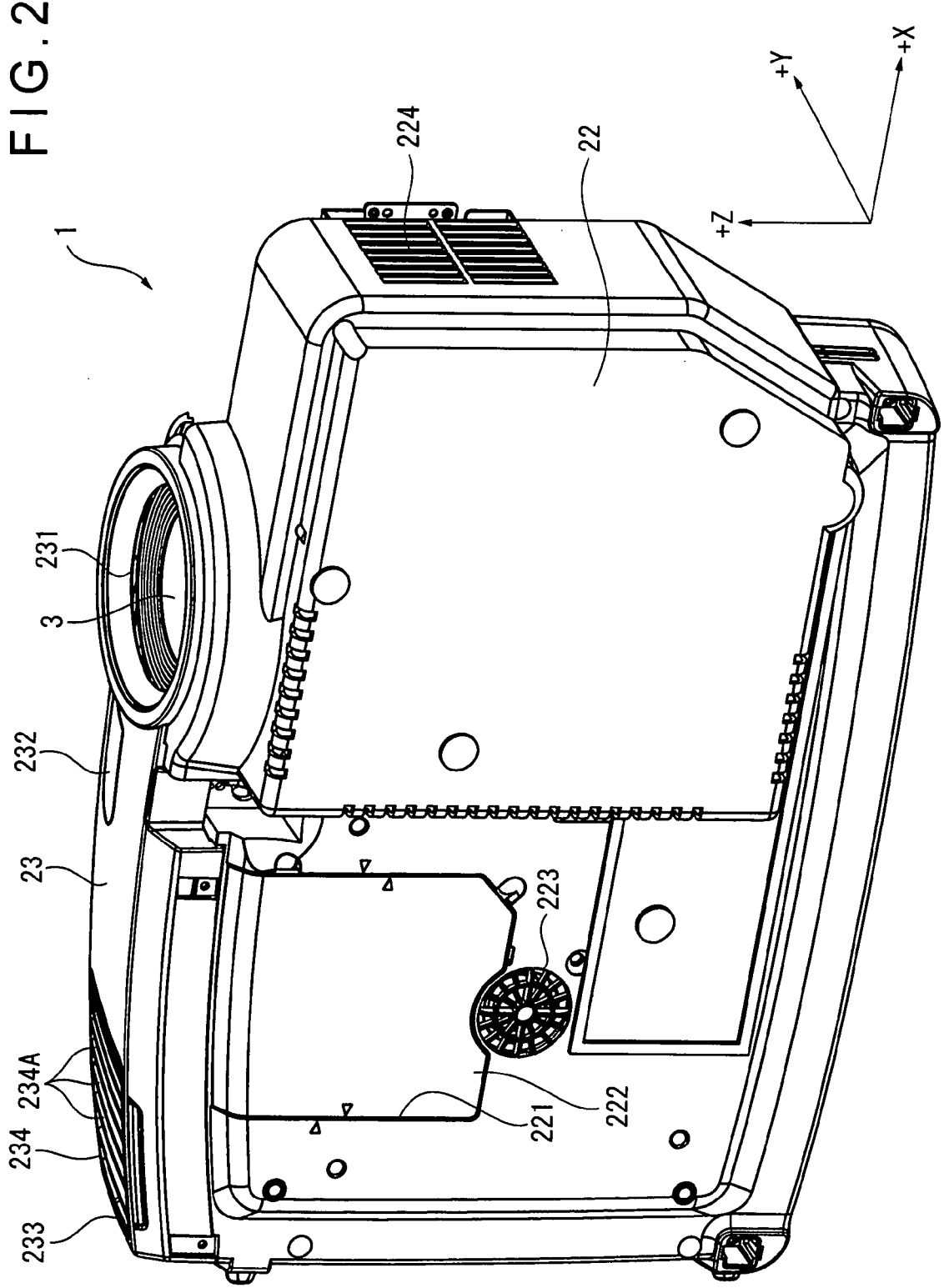
FIG. 2 is a perspective view showing a lower case and a front case when seen from a lower side according to the first exemplary embodiment.

FIG. 2 is a perspective view of the lower case 22 and the front case 23 when seen from a front lower side.

As shown in FIG. 2, an opening 221 in a rectangular shape in plan view is formed in a bottom surface portion of the lower case 22 on the minus X axis direction side. A lid body 222 in a rectangular shape in plan view is detachably attached to the opening 221.

Although not specifically shown, when the lid body 222 is detached from the lower case 22, a part of a later-described light source device of the device main body in the exterior casing 2 is exposed, thereby enabling the light source device to be replaced through the opening 221.

As shown in FIG. 2, in the bottom surface portion of the lower case 22, a light-source air inlet 223 is formed on a minus Z axis direction side (the rear side) relative to the opening 221, the light-source air inlet 223 communicating the inside and the outside of the exterior casing 2.

The light-source air inlet 223 is an opening for introducing cooling air from the outside of the exterior casing 2 to the inside of the exterior casing 2. The cooling air is introduced through the light-source air inlet 223 to the inside by the later-described inside-casing cooling device of the device main body in the exterior casing 2. The cooling air is then sent to the light source device of the device main body.

As shown in FIG. 2, in a lateral surface on a plus X axis direction side of the lower case 22, a cooling-device air inlet 224 is formed on a plus Z axis direction side (the front side), the cooling-device air inlet 224 communicating the inside and the outside of the exterior casing 2.

The cooling-device air inlet 224 is an opening for introducing cooling air from the outside of the exterior casing 2 to the inside of the exterior casing 2. The cooling air is introduced through the cooling-device air inlet 224 to the inside by a later-described sealed circulating-air-cooling unit of the device main body in the exterior casing 2. The cooling air is then sent to a heat releasing side of a peltier unit of the sealed circulating-air-cooling unit.

In the rear surface of the lower case 22, a power-source air inlet 225 (see FIGS. 3 to 5) is formed on the minis X axis direction side, the power-source air inlet 225 communicating the inside and the outside of the exterior casing 2. Similarly to the power-source air inlet formed in the upper case 21, the power-source air inlet 225 is an opening for sending cooling air from the outside of the exterior casing 2 via the power-source air inlet 225 to the power source unit by the inside-casing cooling device.

As shown in FIGS. 1 and 2, in the front case 23, a circular hole 231 is formed on the plus X axis direction side. A tip end of the projection lens 3 is exposed through the circular hole 231. Specifically, an optical image is projected in an enlarged manner from the projection lens 3 through the circular hole 231 on a screen.

As shown in FIGS. 1 and 2, a remote controller light receiving window 232 is formed substantially at the center of the front case 23 in the X axis direction. A remote controller light receiving module (not shown) for receiving an operation signal from a remote controller (not shown) is disposed on an inner side of the remote controller light receiving window 232.

Note that the remote controller is provided with an activation switch, an adjustment switch and the like which are similar to those provided on the above-described operation panel 212. When the remote controller is operated, an infrared signal corresponding to the operation is output from the remote controller. The infrared signal is received by the remote controller light-receiving module via the remote controller light receiving window 232 and processed by the later-described control board.

As shown in FIG. 1 or 2, in the front case 23, an exhaust opening 233 for exhausting the air inside the exterior casing 2 to the outside is formed on the minus X axis direction side. As shown in FIG. 1 or 2, the exhaust opening 233 is provided with a louver 234 having a plurality of flow adjusting vanes 234A aligned in a grid-like manner. As shown in FIG. 1 or 2, plate surfaces of the plurality of air adjusting vanes 234A are inclined in a direction receding from the YZ plane by a predetermined angle. The air inside the exterior casing 2 is oriented in a direction receding from the projection lens 3 by the exhaust opening 233 and the louver 234 to be exhausted to the outside.

2 Internal Arrangement

Figure 3:
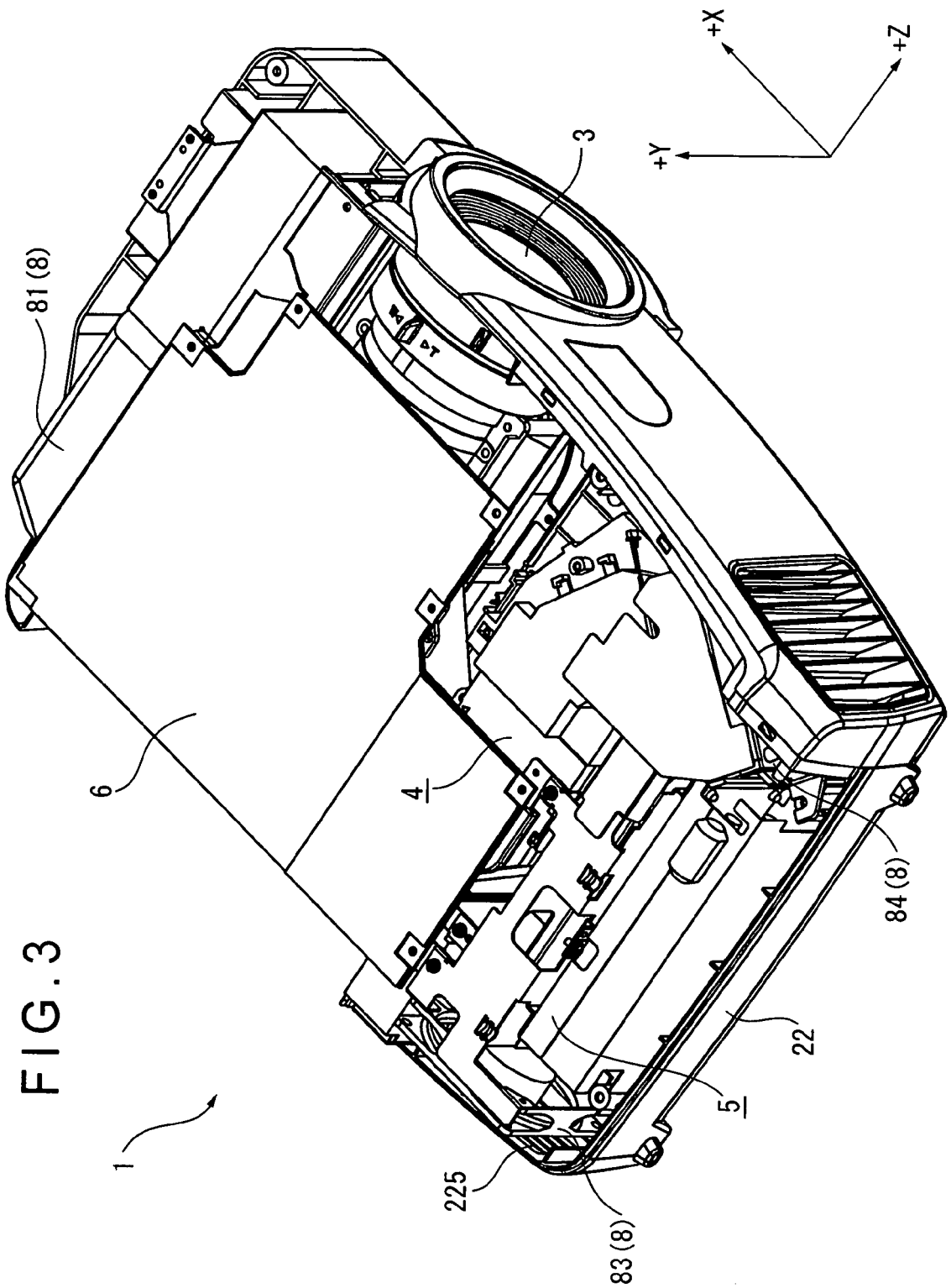
FIG. 3 shows an inner structure of the projector of the first exemplary embodiment.
Figure 4:
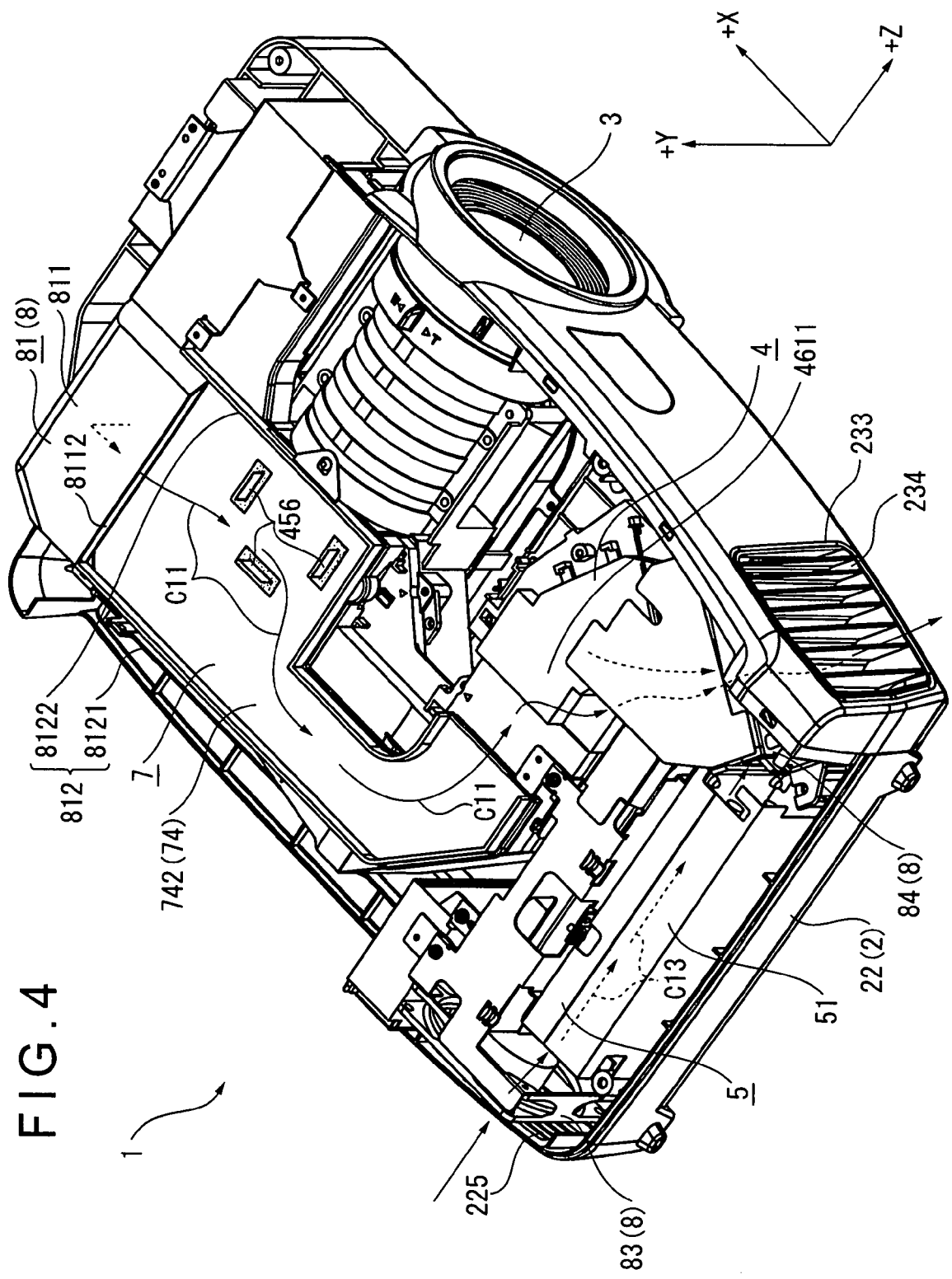
FIG. 4 shows the inner structure of the projector of the first exemplary embodiment.
Figure 5:
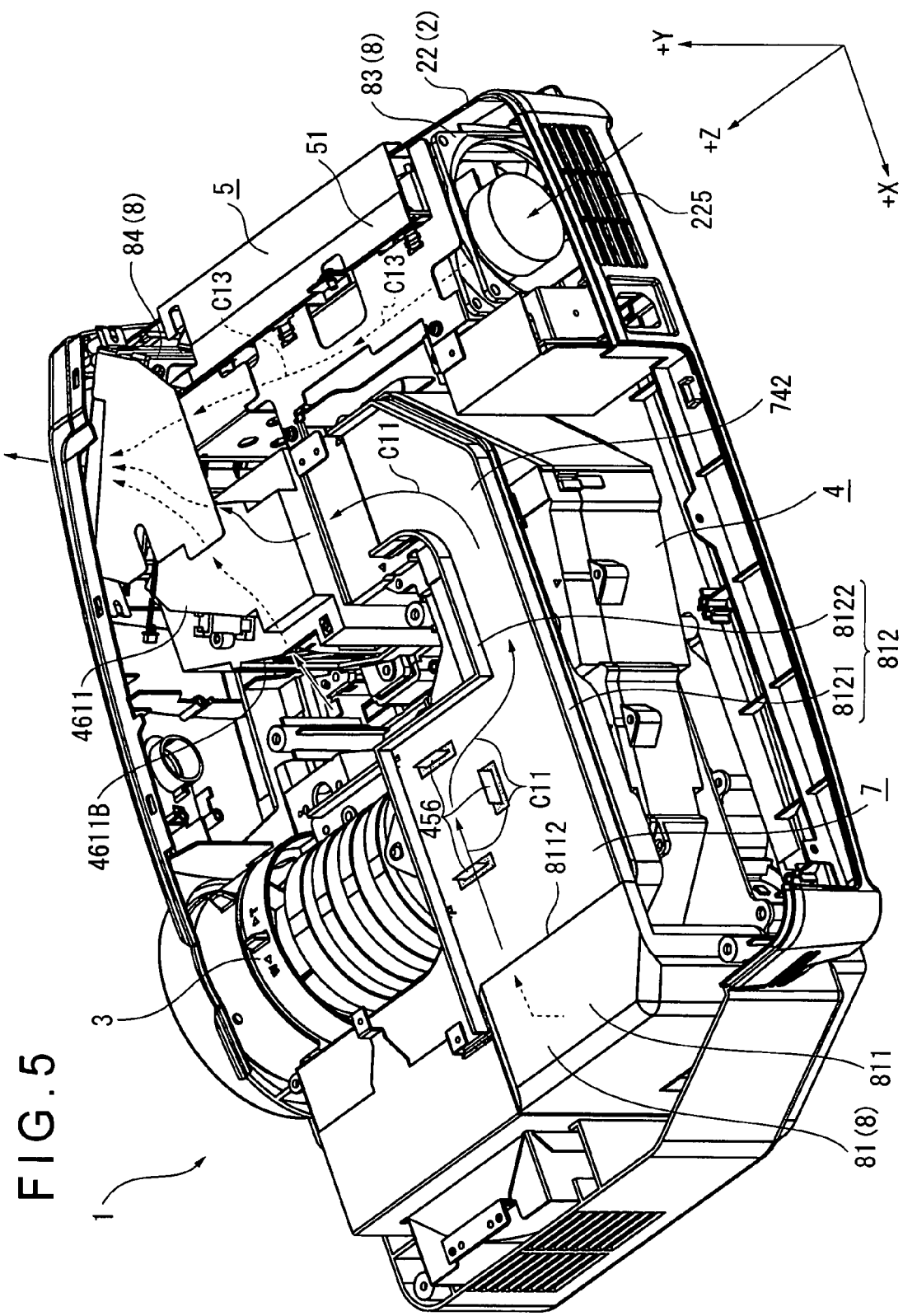
FIG. 5 shows the inner structure of the projector of the first exemplary embodiment.
Figure 6:
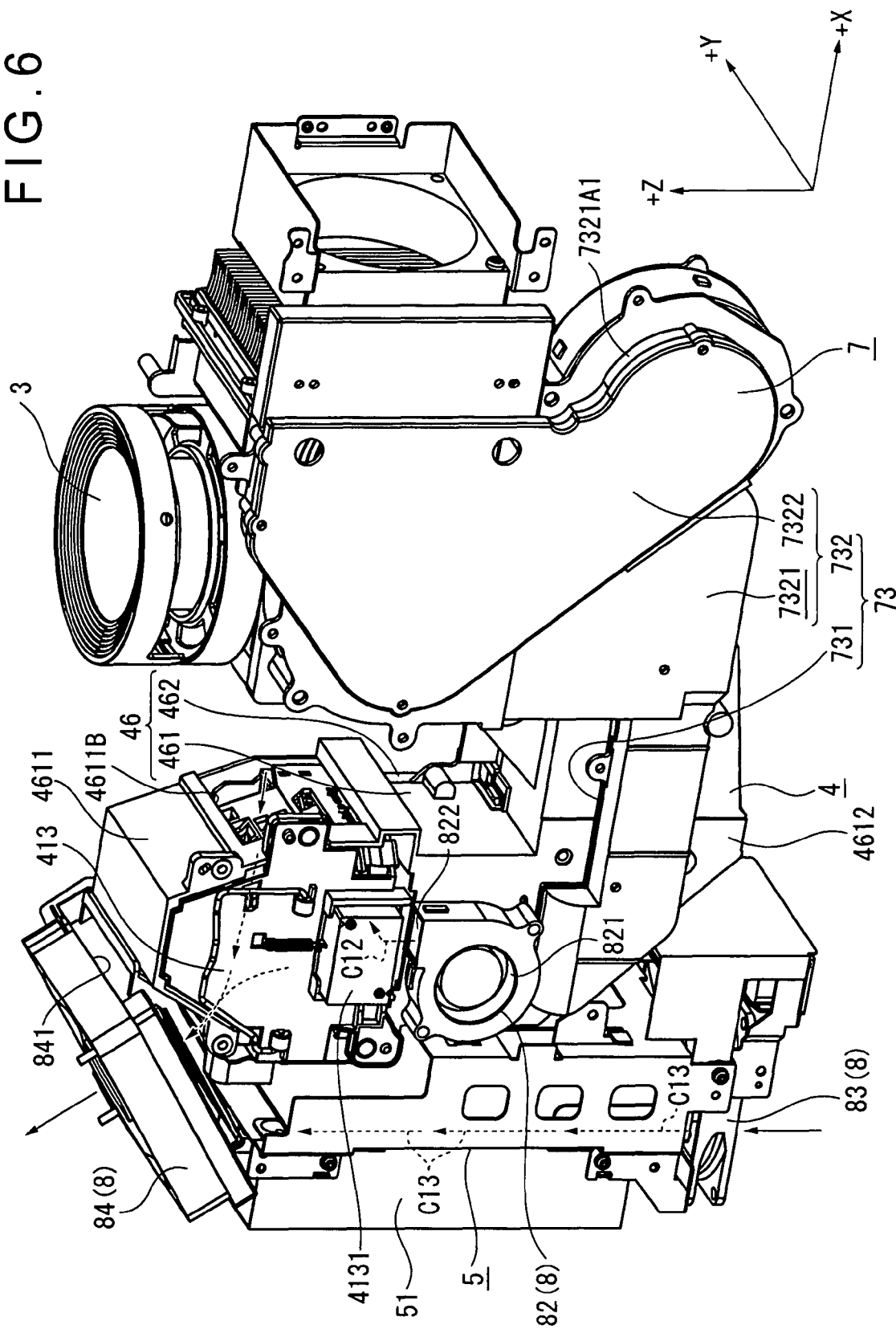
FIG. 6 shows the inner structure of the projector of the first exemplary embodiment.

FIGS. 3 to 6 each show an inner structure of the projector 1. Specifically, FIG. 3 shows the projector 1 of FIG. 1 with the upper case 21 removed. FIG. 4 shows the projector 1 of FIG. 3 with a control board 6 removed. FIG. 5 is a perspective view of the projector 1 of the FIG. 4 when seen from the rear surface side. FIG. 6 is a perspective view of the device main body of the projector 1 when seen from a lower side with the control board 6 removed.

As shown in FIGS. 3 to 6, the device main body of the projector 1 is accommodated in the exterior casing 2. The device main body includes an optical unit 4, a power source unit 5, the control board 6 (FIG. 3), a sealed circulating-air-cooling unit 7 (FIGS. 4 to 6) and an inside-casing cooling device 8.

2-1 Structure of Optical Unit

Figure 7:
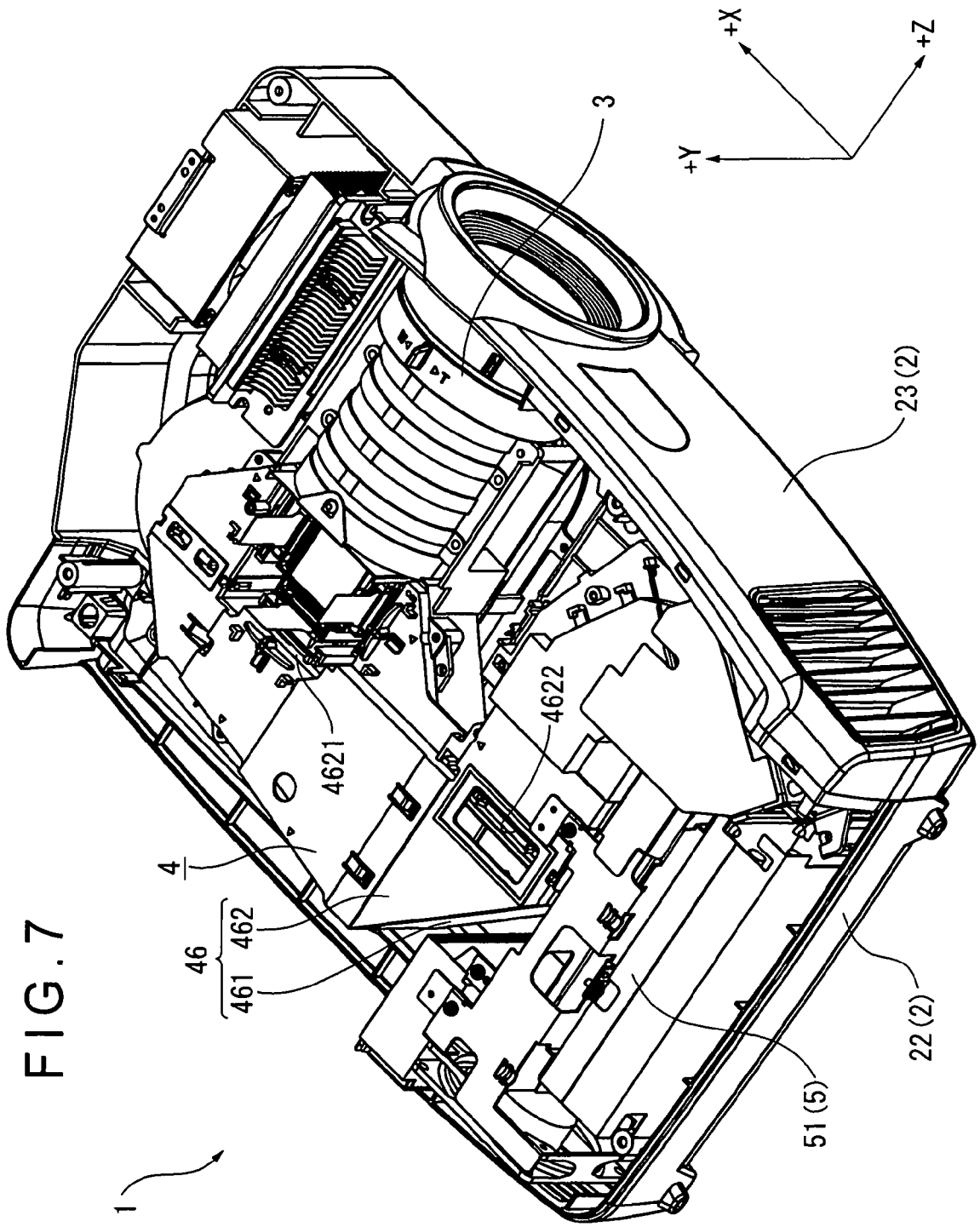
FIG. 7 shows a structure of the optical unit of the first exemplary embodiment.
Figure 8:
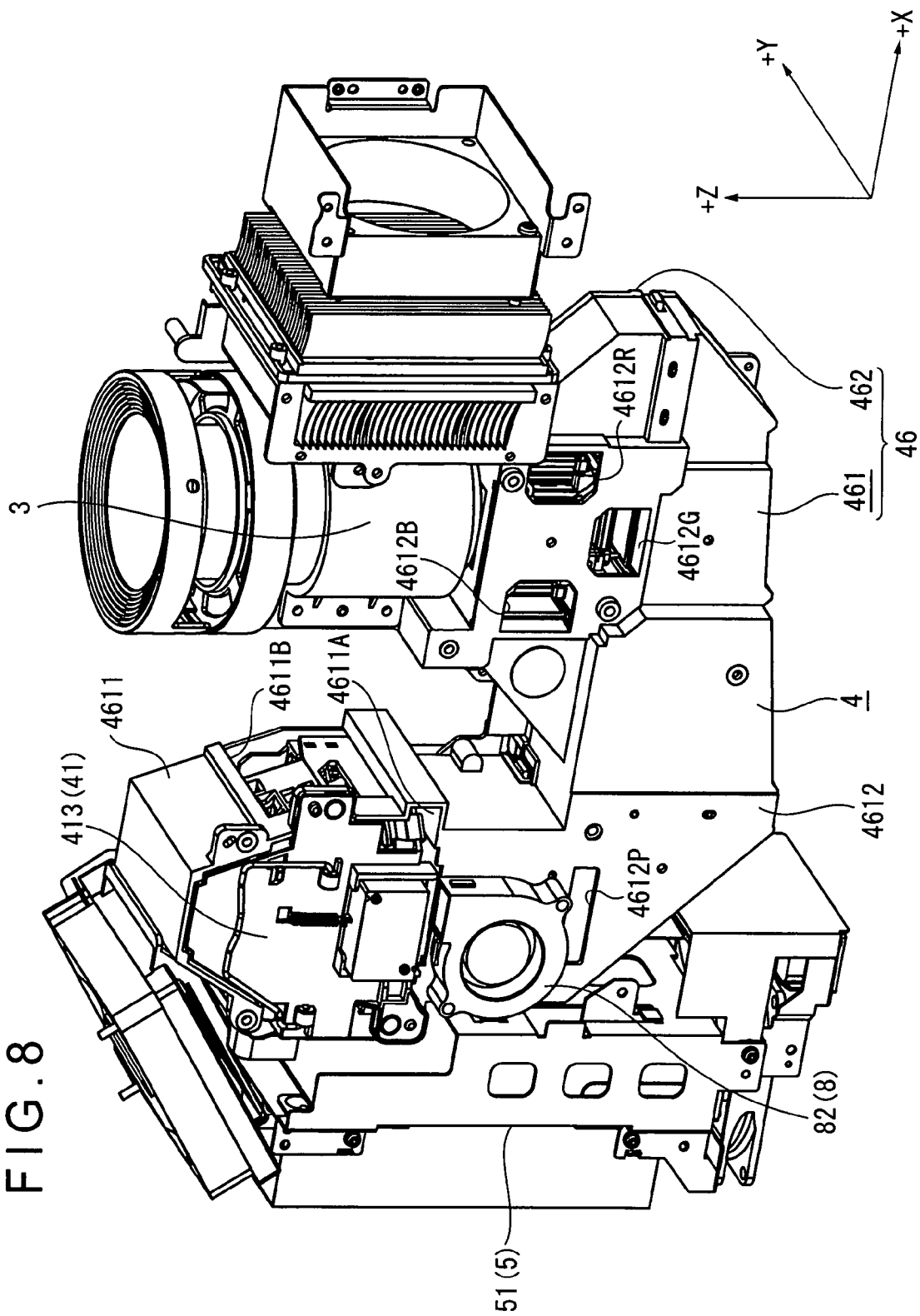
FIG. 8 shows the structure of the optical unit of the first exemplary embodiment.
Figure 9:
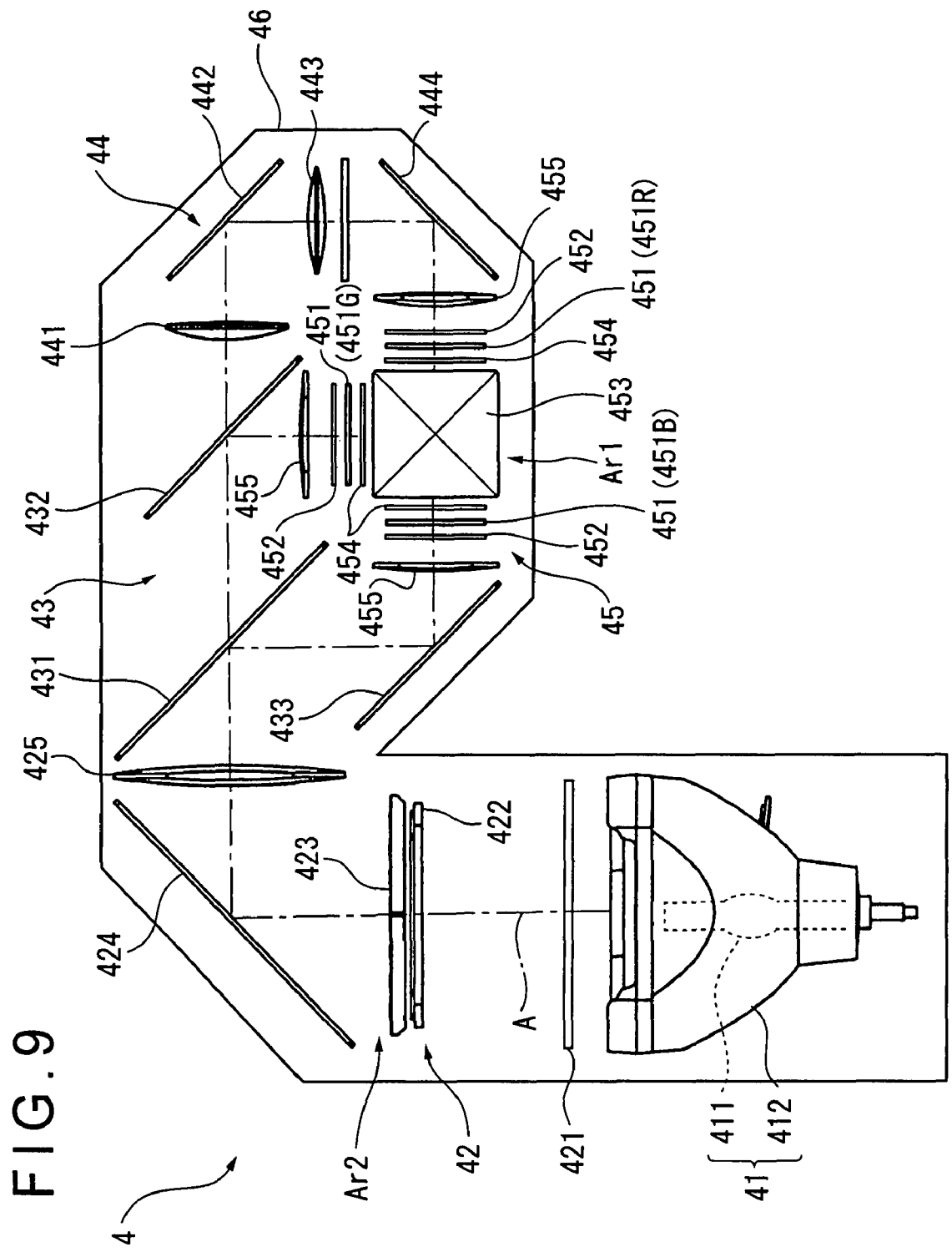
FIG. 9 shows the structure of the optical unit of the first exemplary embodiment.

FIGS. 7 to 9 each show a structure of the optical unit 4. Specifically, FIG. 7 shows the projector 1 of FIG. 4 with a peltier heat releasing air outlet unit 81 of the inside-casing cooling device 8 and a flow-path-downstream-side duct member 74 of the sealed circulating-air-cooling unit 7 removed. FIG. 8 shows the projector 1 of FIG. 6 with a flow-path-upstream-side duct member 73 of the sealed circulating-air-cooling unit 7 removed. FIG. 9 is a plan view schematically showing an optical system of the optical unit 4.

The optical unit 4 forms image light in accordance with image information under the control of the control board 6. As shown in FIG. 7, the optical unit 4 extends from the front surface side to the rear surface side of the exterior casing 2 in the Z axis direction. An end of the optical unit 4 in the minus Z axis direction bends into the plus X axis direction. The optical unit 4 then bends into the plus Z axis direction to further extend. Thus, the optical unit 4 has a substantially U-shape in plan view. As shown in FIG. 9, the optical unit 4 includes a light source device 41, an integrator illuminating optical system 42, a color separating optical system 43, a relay optical system 44, an optical device 45 and an optical component casing 46.

The light source device 41 aligns a light beam emitted from a light source lamp 411 in one direction to irradiate, thereby illuminating the optical device 45. As shown in FIG. 9, the light source device 41 includes the light source lamp 411, a reflector 412 and a lamp housing 413 (FIG. 8) that holds the light source lamp 411 and the reflector 412. The light source device 41 is accommodated in a light-source-device accommodating portion 4611 (FIG. 8) that is connected to the optical component casing 46. Since the light source device 41 is accommodated in the light-source-device accommodating portion 4611, the light source device 41 is positioned at a predetermined position relative to the optical component casing 46 (at a position on which a central axis of the light beam irradiated from the light source device 41 and an illumination optical axis A set in the optical component casing 46 coincide with each other).

As the light source lamp 411, a halogen lamp, a metal halide lamp or a high-pressure mercury lamp are often used.

Herein, as the reflector 412, a parabola reflector is used, which substantially collimates the light beam irradiated from the light source lamp 411 and reflects the parallelized light. Note that the reflector 412 may not be a parabola reflector but may be an ellipsoidal reflector that reflects, in cooperation with a collimating lens, the light beam irradiated from the light source lamp 411 so as to be converged to a predetermined position.

The integrator illuminating optical system 42 divides the light beam irradiated from the light source device 41 into a plurality of partial light beams, thereby equalizing in-plane illuminance of an illumination area. As shown in FIG. 9, the integrator illuminating optical system 42 includes a first lens array 421, a second lens array 422, a polarization converter 423, a reflecting mirror 424 and a superposing lens 425.

The first lens array 421 serves as a light beam dividing optical element that divides the light beam irradiated from the light source device 41 into a plurality of partial light beams. The first lens array 421 includes a plurality of small lenses arranged in a matrix manner in a plane orthogonal to the illumination optical axis A.

The second lens array 422 is an optical element that converges the plurality of partial light beams divided by the above-described first lens array 421. Similarly to the first lens array 421, the second lens array 422 includes a plurality of small lenses arranged in a matrix manner in a plane orthogonal to the illumination optical axis A.

The polarization converter 423 aligns a polarization direction of each of the partial light beams divided by the first lens array 421 to form a substantially uniform linear polarized light.

Although not shown, the polarization converter 423 includes polarization separating films and reflecting films alternately aligned with an inclination relative to the illumination optical axis A. The polarization separating films transmit one type of polarized light beam out of a P polarized light beam and an S polarized light beam contained in each partial light beam. The polarization separating films reflect the other type of polarized light beam. The reflected other type of polarized light beam is bent by the reflecting film into a direction along an irradiation direction of the one type of polarized light beam (i.e. into a direction along the illumination optical axis A). One of the irradiated polarized light beams is polarization-converted by a phase plate provided on a light beam emitting surface of the polarization converter 423, so that substantially all of the polarized directions of the polarized light beams are aligned. By using such a polarization converter 423, the light beams irradiated from the light source device 41 can be aligned into the polarized light beams in a substantially uniform direction, thereby enhancing usage efficiency of light source light used by the optical device 45.

The superposing lens 425 is an optical element that converges the plurality of partial light beams having transmitted through the first lens array 421, the second lens array 422, the polarization converter 423 and the reflecting mirror 424 in order to superpose the converged light beams on image formation areas of later-described three liquid crystal panels of the optical device 45.

As shown in FIG. 9, the color separating optical system 43 includes two dichroic mirrors 431, 432 and a reflecting mirror 433. By the dichroic mirrors 431, 432, the color separating optical system 43 separates the plurality of the partial light beams irradiated from the integrator illuminating optical system 42 into three colors of light of red (R), green (G) and blue (B).

The dichroic mirrors 431, 432 are optical elements each having a substrate on which a wavelength selecting film is provided. The wavelength selecting film reflects a light beam in a predetermined wavelength range and transmits a light beam in the other wavelength ranges. The dichroic mirror 431 disposed on the upstream of an optical path is a mirror that reflects the blue color light and transmits the red and green color light. The dichroic mirror 432 disposed on the downstream of the optical path is a mirror that reflects the green color light and transmits the red color light.

The relay optical system 44 includes an incident-side lens 441, a relay lens 443 and reflecting mirrors 442, 444 and guides the red color light having transmitted through the dichroic mirrors 431, 432 of the color separating optical system 43, the red color light guided to the optical device 45. Note that the reason why the relay optical system 44 is used for the optical path of the red color light is to avoid deterioration in light utilization efficiency due to light dispersion and the like which may be caused by a longer length of the optical path of the red color light than those of the optical paths of the other color light. In the first exemplary embodiment, such an arrangement is employed since the length of the optical path of the red color light is set long. However, another arrangement may be employed in which the length of the optical path of the blue color light is set long and the relay optical system 44 is used for the optical path of the blue color light.

The blue color light separated by the above-described dichroic mirror 431 is bent by the reflecting mirror 433 and fed to the optical device 45 via a field lens 455. The green color light separated by the dichroic mirror 432 is directly fed to the optical device 45 via the field lens 455. The red color light is converged and bent by the lenses 441, 443 and the reflecting mirrors 442, 444 of the relay optical system 44 to be fed to the optical device 45 via the field lens 455. Note that the field lenses 455 respectively disposed on the upstream of the optical paths of the color light of the optical device 45 are provided for converting each partial light beam irradiated by each of the second lens arrays 422 into a light beam parallel to a main light beam of the partial light beam.

The optical device 45 modulates an incident light beam in accordance with image information and forms a color image. As shown in FIG. 9, the optical device 45 includes the three liquid crystal panels 451 as to-be-irradiated optical modulators (a liquid crystal panel 451R on the red color light side, a liquid crystal panel 451G on the green color light side and a liquid crystal panel 451B on the blue color light side) and a cross dichroic prism 453. Note that incident-side polarization plates 452 are respectively interposed between the field lenses 455 and the liquid crystal panels 451. Irradiation-side polarization plates 454 are respectively interposed between the liquid crystal panels 451 and the cross dichroic prism 453. Light modulation of incident color light is conducted by the incident-side polarization plates 452, the liquid crystal panels 451 and the irradiation-side polarization plates 454.

Each liquid crystal panel 451 is a pair of transparent glass substrates with liquid crystal (electrooptic material) sealed therebetween. Each liquid crystal panel modulates the polarization direction of the polarized light beam irradiated by the incident-side polarization plate 452 in accordance with an image signal using, for example, polycrystalline silicon TFT (Thin Film Transistor) as a switching element.

The cross dichroic prism 453 is an optical element for forming the color image by combining the optical images that are modulated for each color light irradiated by the irradiation-side polarization plates 454. The cross dichroic prism 453 has a substantially square shape in plane view with four right-angle prisms attached with each other. Dielectric multi-layered films are formed on the boundaries adhering the respective right-angle prisms. One of the dielectric multi-layered films in a substantially X-shape reflects the red color light, and the other dielectric multi-layered film reflects the blue color light. The red and blue color light is bent by the dielectric multi-layered films to be aligned with an advancing direction of the green color light, thereby combining the three color light.

As shown in FIG. 9, the optical component casing 46 has a U-shape in plan view. A predetermined illumination optical axis A is set in the optical component casing 46. The above-described optical systems 41 to 45 are disposed at predetermined positions in the optical component casing 46. As shown in FIG. 7 or 8, the optical component casing 46 includes a component accommodating member 461 and a lid-like member 462.

As shown in FIG. 8, the component accommodating member 461 includes a light-source-device accommodating portion 4611 and a component-accommodating-portion main body 4612.

As shown in FIG. 8, the light-source-device accommodating portion 4611 is positioned on one end side of the U-shape of the optical component casing 46 and formed in a container-like shape having an opening portion 4611A on a minus Y axis direction side (the lower side). The light source device 41 can be detachably attached in the light-source-device accommodating portion 4611 through the opening portion 4611A.

As shown in FIG. 8, in the light-source-device accommodating portion 4611, opening portions 4611B are formed in lateral surfaces orthogonal to the X axis direction (on lateral surfaces facing an inner side and an outer side of the U-shape of the optical component casing 46) (FIG. 8 shows only one opening portion in the lateral surface on the inner side of the U-shape). The opening portions 4611B enable air to flow in the light-source-device accommodating portion 4611 to cool the light source device 41 therein.

The component-accommodating-portion main body 4612 has an opening portion (not shown) on a plus Y axis direction side (the upper side), forming a container-like shape. Through this opening portion, the optical systems 42, 43 are accommodated in the component-accommodating-portion main body 4612 such that the optical systems 42, 43 are aligned in this order from one end side on which the component-accommodating-portion main body 4612 is connected with the light-source-device accommodating portion 4611 and such that the optical device 45 is accommodated on the other end side (the opposite side of the one end side), these components 42, 43 and 45 accommodated through the opening portion.

As shown in FIG. 8, in an end surface in the minus Y axis direction of the component-accommodating-portion main body 4612, opening portions 4612R, 4612G and 4612B are formed at positions corresponding to the positions of the liquid crystal panels 451R, 451G and 451B of the optical device 45.

As shown in FIG. 8, in the end surface in the minus Y axis direction of the component-accommodating-portion main body 4612, an opening portion 4612P is formed at a position corresponding to the position of the polarization converter 423.

The opening portions 4612R, 4612G, 4612B, 4612P serve as inflow ports for allowing air to flow into a space Ar1 (FIG. 9) around the position of the optical device 45 in the optical component casing 46 and into a space Ar2 (FIG. 9) around the position of the polarization converter 423.

As shown in FIG. 7, the lid-like member 462 is a member for closing the open portion on the plus Y axis direction side of the component-accommodating-portion main body 4612. The lid-like member 462 has a substantially common plane shape to that of the component-accommodating-portion main body 4612.

As shown in FIG. 7, the lid-like member 462 is provided with a cutout 4621 at a position corresponding to the position of the optical device 45. The cutout 4621 has a U-shape so as to planarly enclose the optical device 45.

As shown in FIG. 7, the lid-like member 462 has an opening portion 4622 provided at a position corresponding to the position of the polarization converter 423.

The cutout 4621 and the opening portion 4622 serve as outflow ports for exhausting the air in the spaces Ar1, Ar2 in the optical component casing 46, the air flown to the spaces Ar1, Ar2 through the opening portions 4612R, 4612G, 4612B, 4612P, to the outside of the optical component casing 46.

Note that although not specifically shown, in the optical component casing 46, the space Ar1 is adapted not to communicate with another adjacent space by the optical components such as a rib provided to the component-accommodating-portion main body 4612, the incident-side polarization plates 452 and the field lenses 455. Similarly, in the optical component casing 46, the space Ar2 is adapted not to communicate with another adjacent space by the optical component such as the rib provided to the component-accommodating-portion main body 4612, the second lens array 422 and the superposing lens 425.

2-2 Structure of Power Source Unit

The power source unit 5 supplies electric power to components of the device main body of the projector 1. As shown in FIG. 8, the power source unit 5 is disposed along a lateral surface on the minus X axis direction side of the exterior casing 2 so as to extend from the rear surface side to the front surface side. Although not specifically shown, the power source unit 5 includes a power source block that supplies electric power provided from the outside via a power source cable to the components and a lamp driving block that turns on the power source lamp 411 in accordance with the electric power supplied from the power source block. As shown in FIG. 7 or 8, the power source block and the lamp driving block are enclosed by a shield member 51 of metal such as aluminum, the shield member 51 being open at both sides. Accordingly, the air flown from the rear surface side by the shield member 51 is guided toward the front surface side, and electromagnetic noise generated in the power source block or the lamp driving block is prevented from leaking to the outside.

2-3 Structure of Sealed Circulating-Air-Cooling Unit

Figure 10:
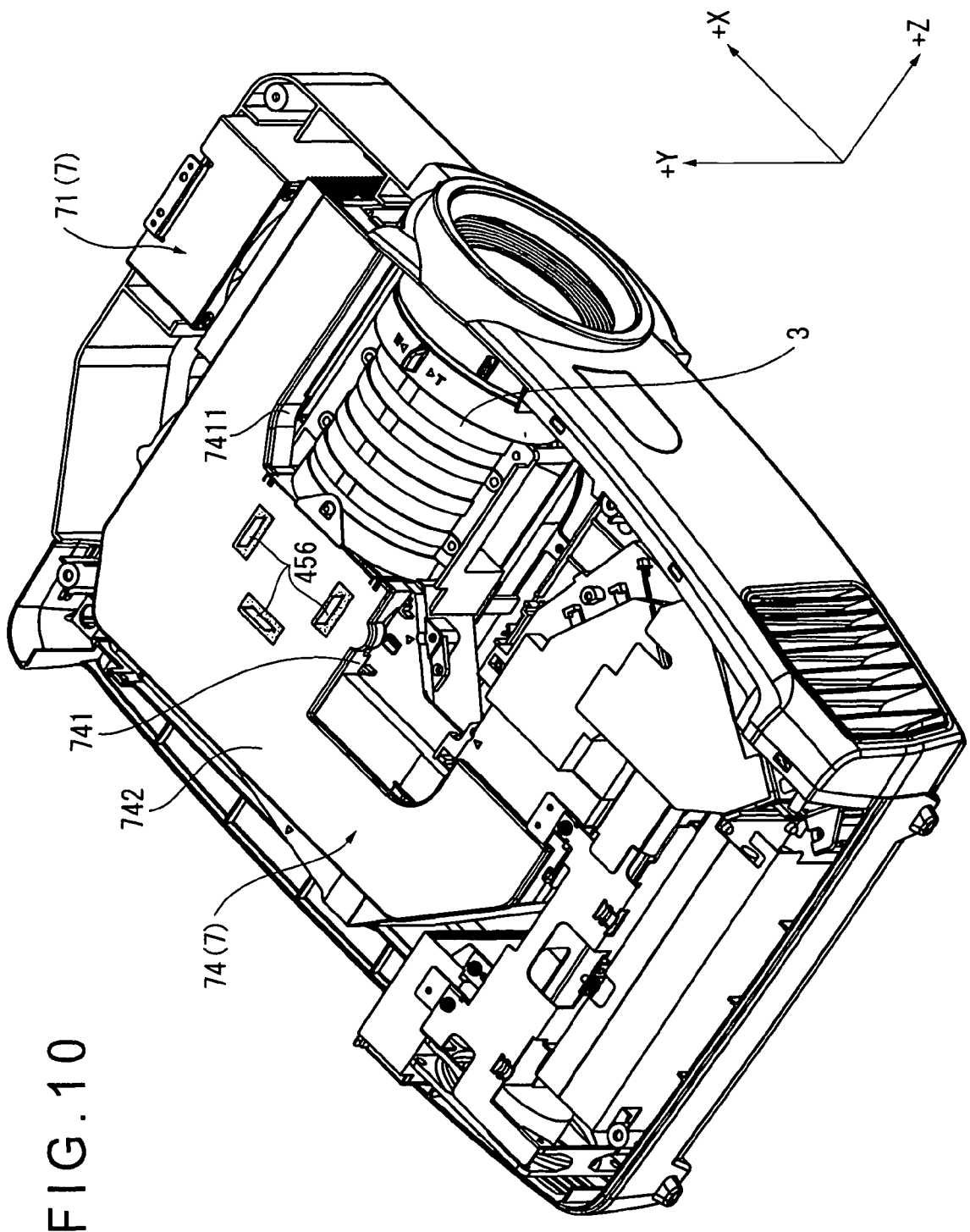
FIG. 10 shows a structure of a sealed circulating-air-cooling unit of the first exemplary embodiment.
Figure 11:
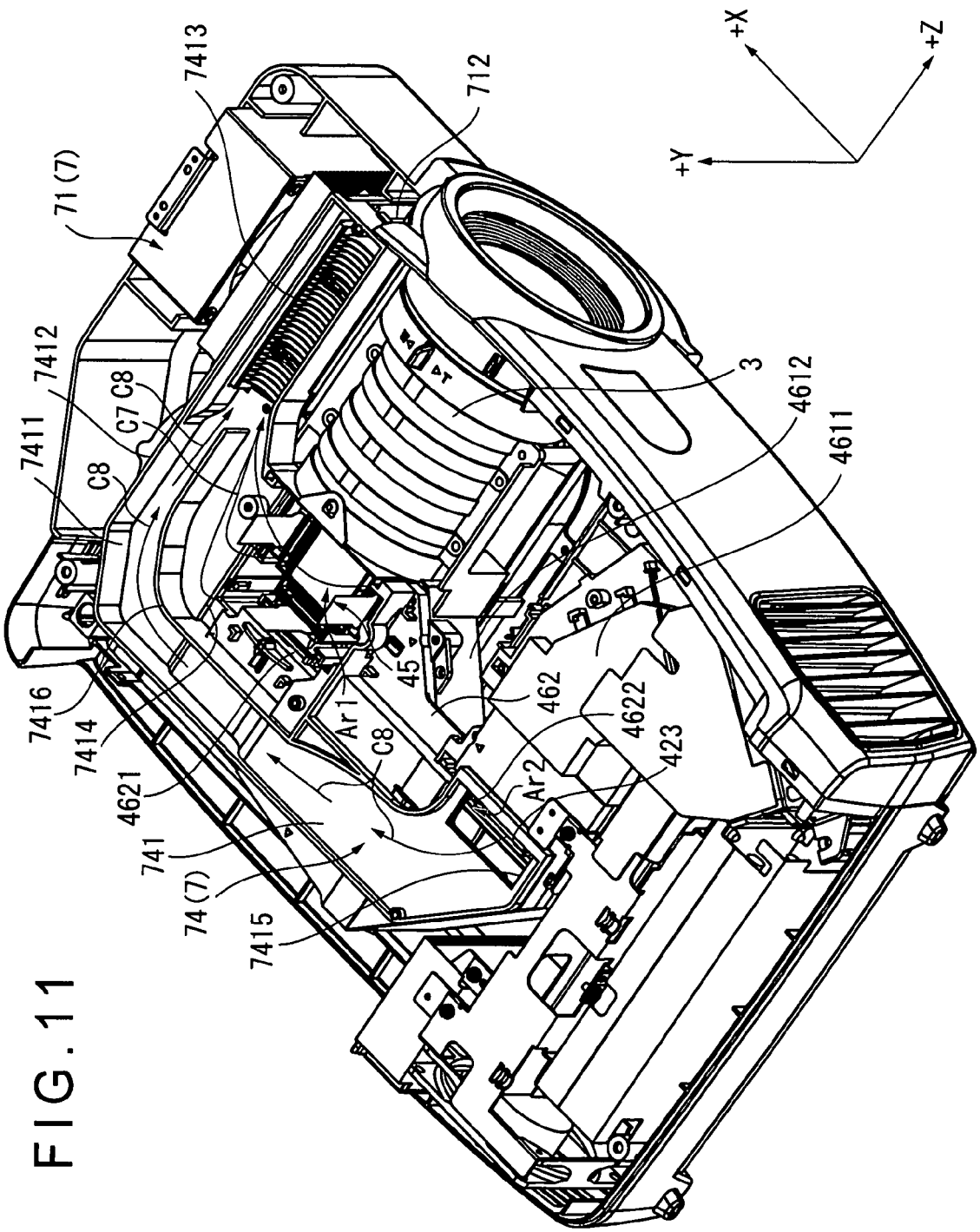
FIG. 11 shows the structure of the sealed circulating-air-cooling unit of the first exemplary embodiment.
Figure 12:
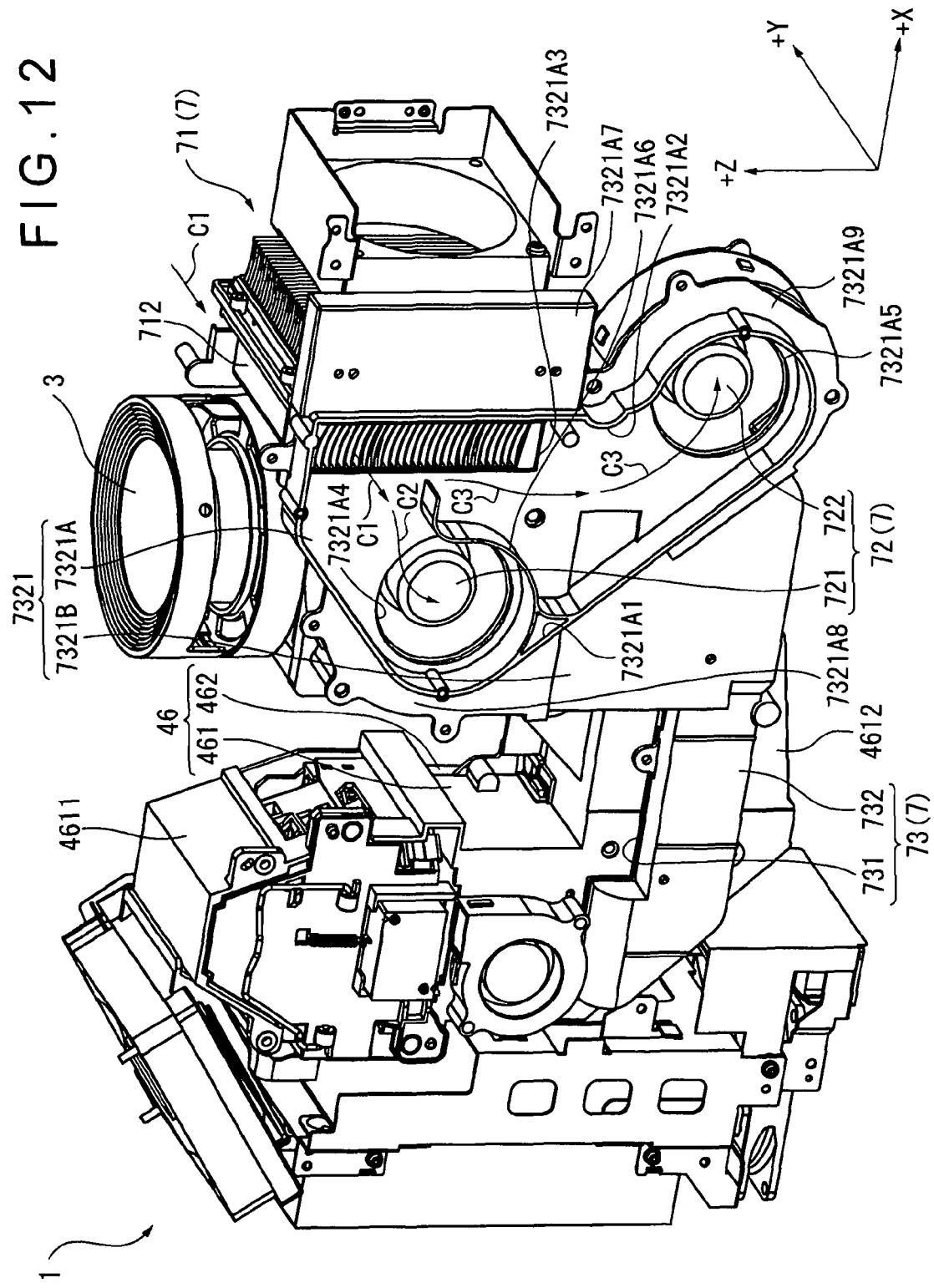
FIG. 12 shows the structure of the sealed circulating-air-cooling unit of the first exemplary embodiment.
Figure 13:
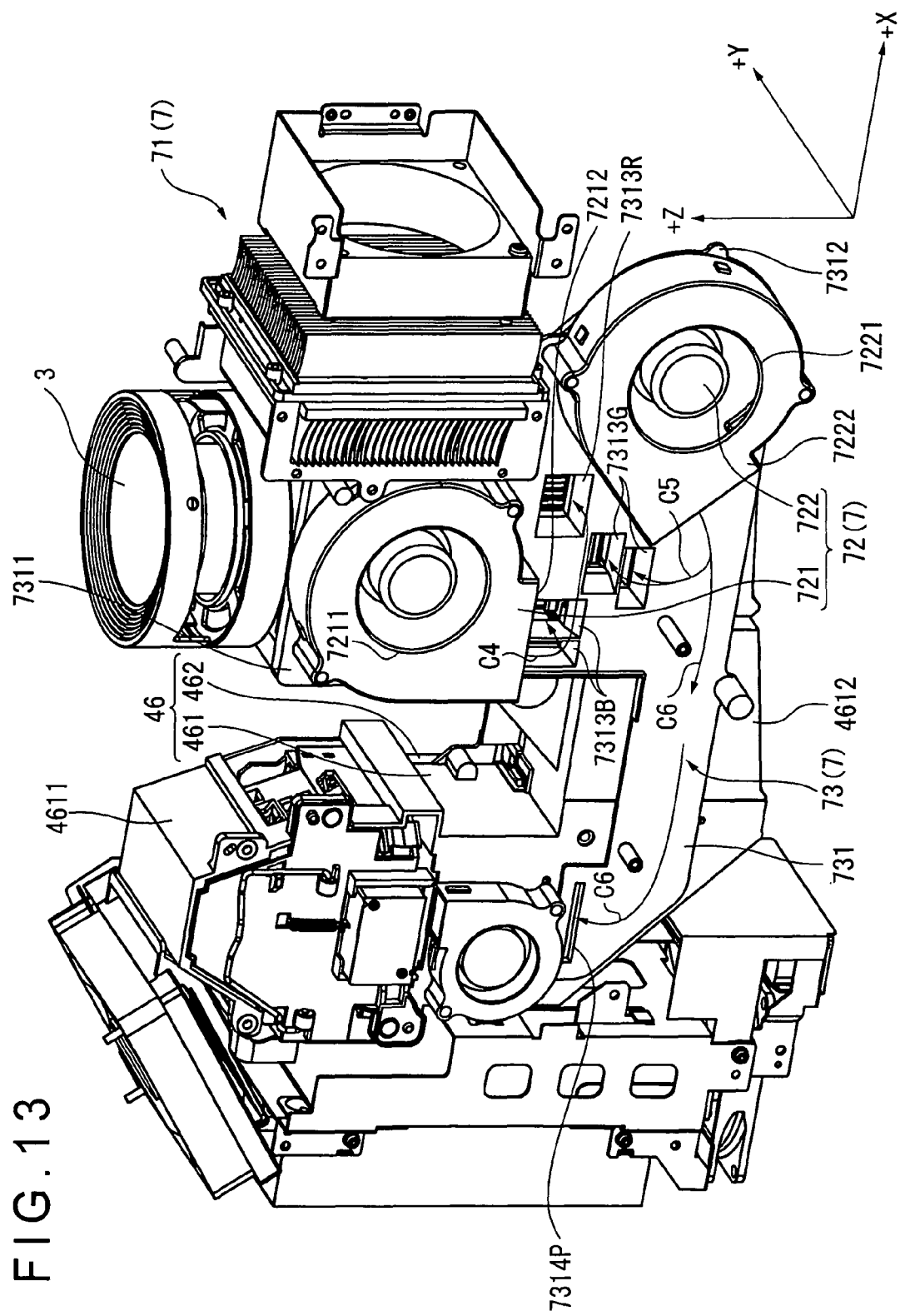
FIG. 13 shows the structure of the sealed circulating-air-cooling unit of the first exemplary embodiment.
Figure 14:
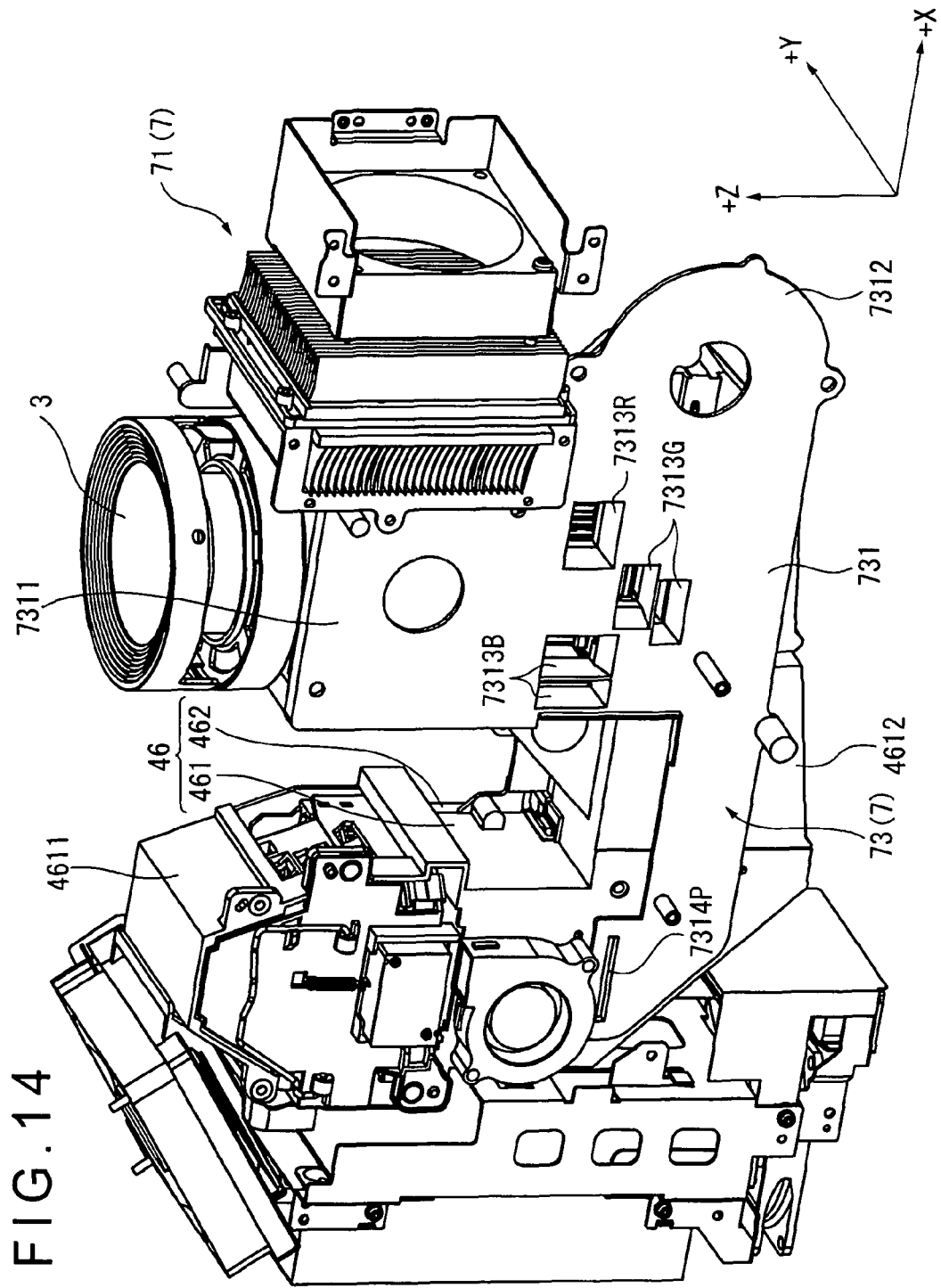
FIG. 14 shows the structure of the sealed circulating-air-cooling unit of the first exemplary embodiment.

FIGS. 10 to 14 each show a structure of the sealed circulating-air-cooling unit 7 Specifically, FIG. 10 shows a state shown in FIG. 4 with the peltier heat releasing air outlet unit 81 of the inside-casing cooling device 8 removed. FIG. 11 shows a state shown in FIG. 10 with a high-heat-conductive duct portion 742 removed. FIG. 12 shows a state shown in FIG. 6 with a cover member 7322 removed. FIG. 13 shows a state shown in FIG. 12 with a duct main body 732 removed. FIG. 14 shows a state shown in FIG. 13 with a circulation fan 72 removed.

The sealed circulating-air-cooling unit 7 and the optical component casing 46 form a sealed structure of the invention. The sealed circulating-air-cooling unit 7 circulates air in a ringed air flow passage including the spaces Ar1, Ar2 in the optical component casing 46 and cools the optical device 45 and the polarization converter 423 disposed in the spaces Ar1, Ar2. As shown in FIGS. 10 to 14, the sealed circulating-air-cooling unit 7 includes a cooling device 71, the circulation fan 72 (FIG. 12, FIG. 13), a flow-path-upstream-side duct member 73 (FIGS. 12 to 14) and the flow-path-downstream-side duct member 74 (FIG. 10, FIG. 11).

Note that the components will be described in the order of alignment along the air flow passage, starting from the upstream side of the spaces Ar1, Ar2. A structure of the circulation fan 72 will be described in detail when the flow-path-upstream-side duct member 73 is described.

2-3-1 Structure of Cooling Device

Figure 15:
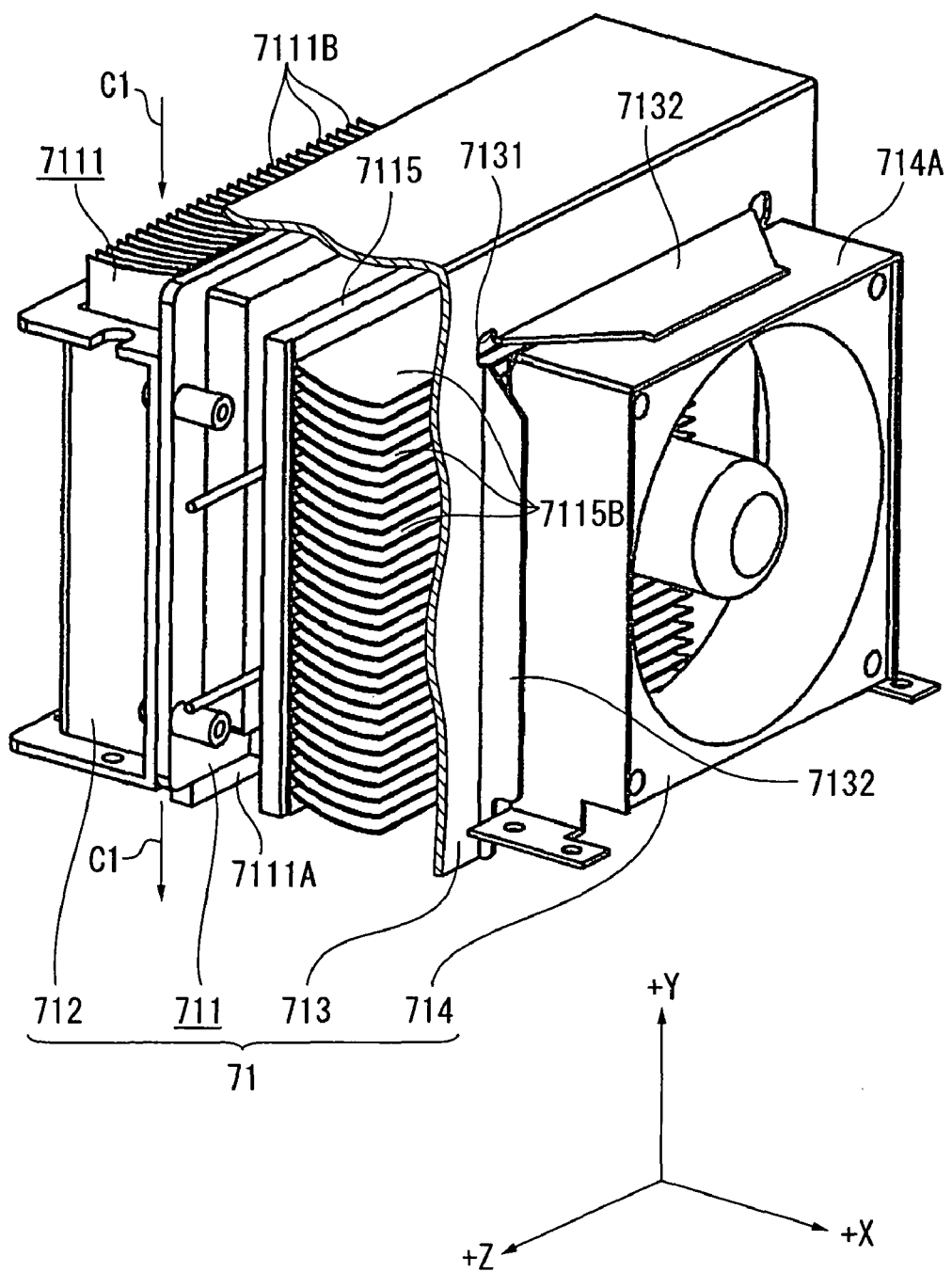
FIG. 15 is a perspective view showing a structure of a cooling device of the first exemplary embodiment.

FIG. 15 is a perspective view showing a structure of the cooling device 71. Specifically, FIG. 15 is a perspective view of the cooling device 71 when seen from the plus Z axis direction side.

As shown in FIGS. 10 to 14, the cooling device 71 is adjacently disposed on the plus X axis direction side of the projection lens 3. The cooling device 71 absorbs heat in the air circulating in the air flow passage in the sealed structure and releases the heat to the outside of the sealed structure. As shown in FIG. 15, the cooling device 71 includes a peltier unit 711, a heat-absorbing-side duct 712, a heat-releasing-side duct 713 and a cooling fan 714.

Figure 16:
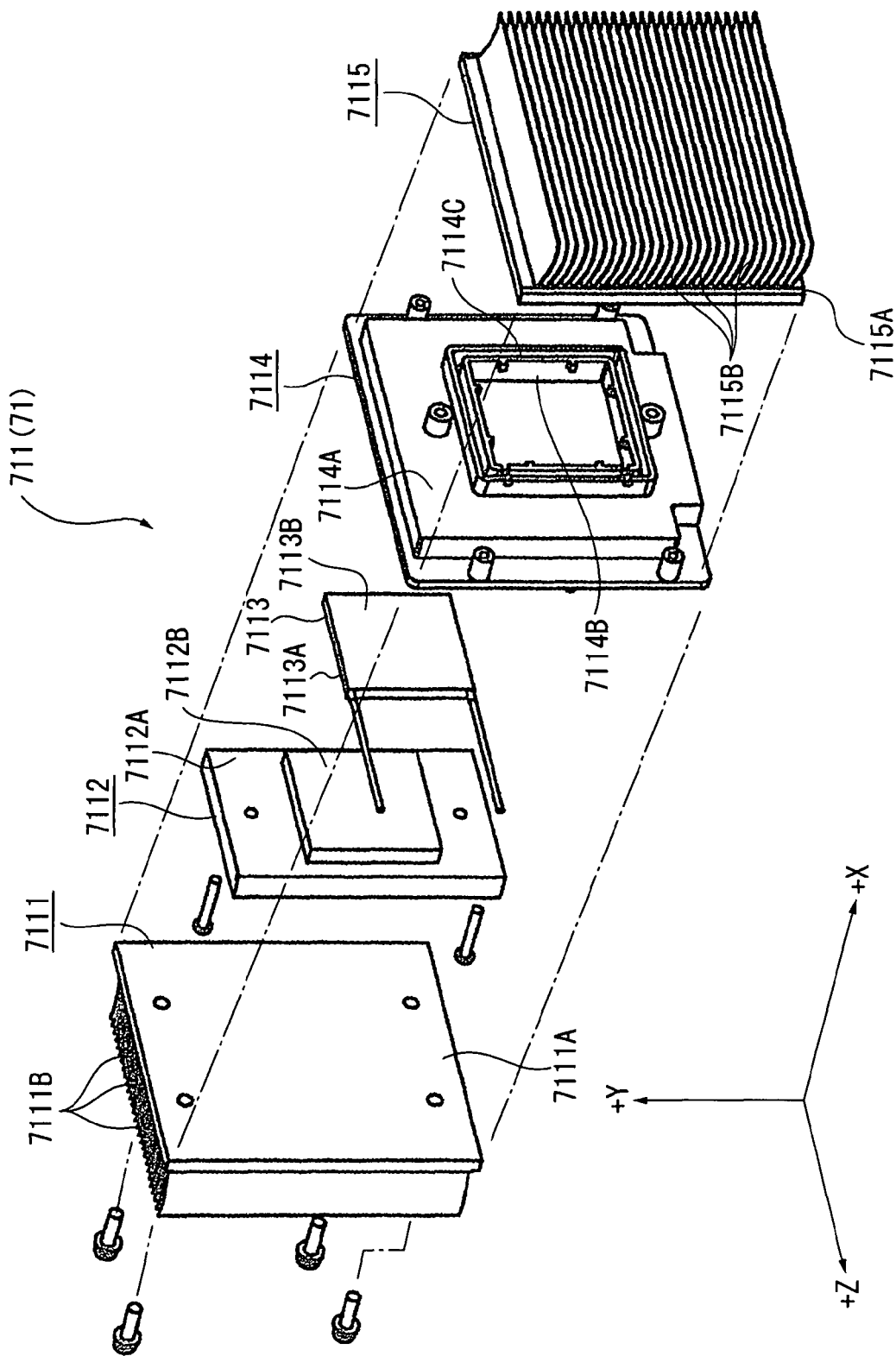
FIG. 16 shows a structure of the peltier unit of the first exemplary embodiment.
Figure 17:
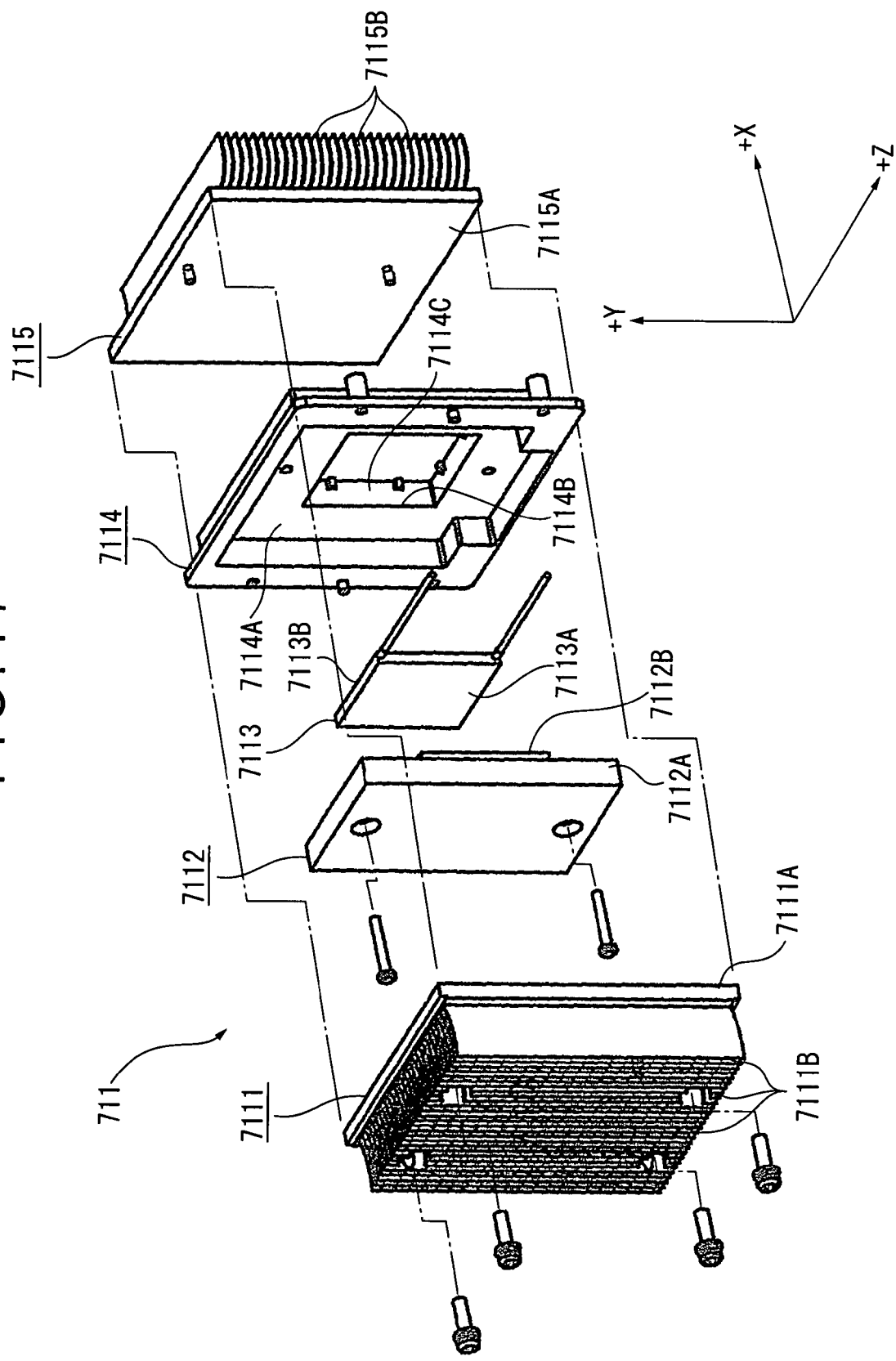
FIG. 17 shows the structure of the peltier unit of the first exemplary embodiment.
Figure 18:
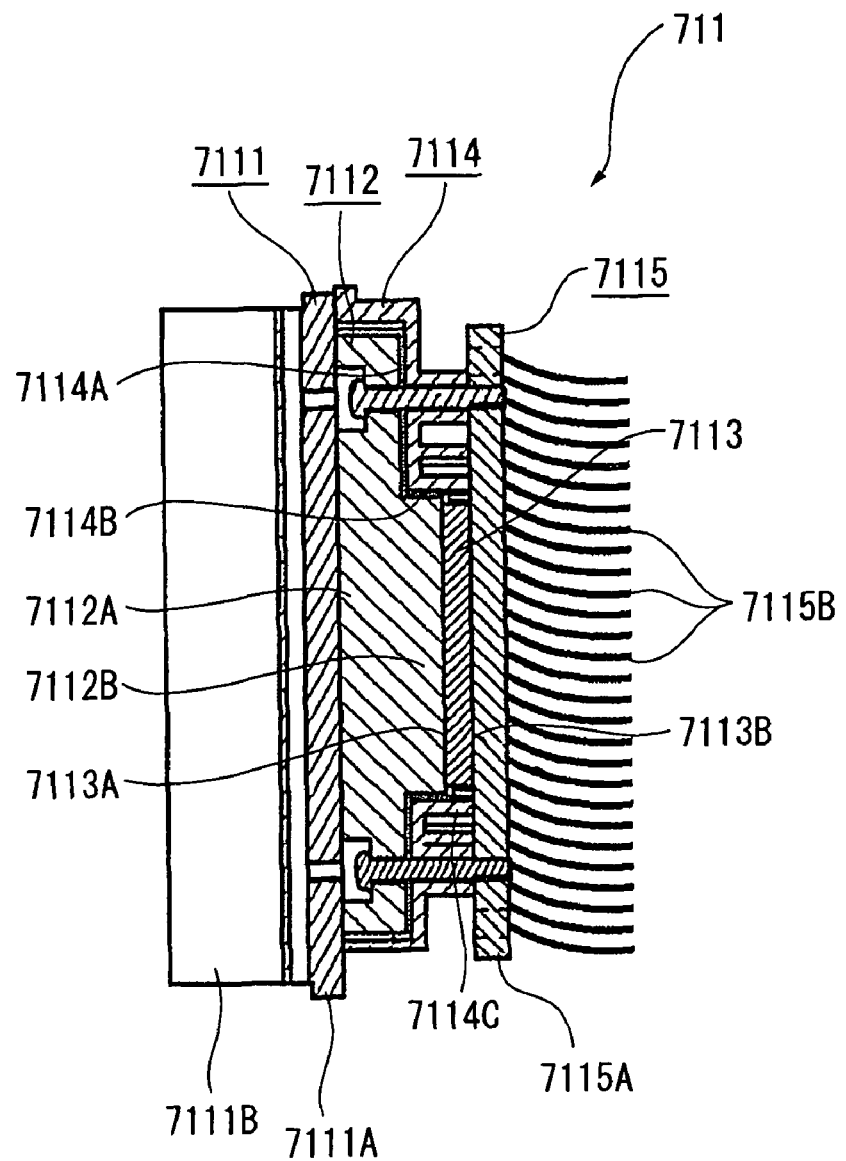
FIG. 18 shows the structure of the peltier unit of the first exemplary embodiment.

FIGS. 16 to 18 each show a structure of the peltier unit 711. Specifically, FIG. 16 is an exploded perspective view of the peltier unit 711 when seen from the plus X axis direction side (from the side remote from the projection lens 3). FIG. 17 is an exploded perspective view of the peltier unit 711 when seen from the minus X axis direction side (from the side close to the projection lens 3). FIG. 18 is a cross section of the peltier unit 711 when seen from the plus Z axis direction side.

As shown in FIGS. 16 to 18, the peltier unit 711 includes a heat-absorbing-side heat conductive member 7111, a stepped block 7112, a peltier element 7113 as a thermoelectric conversion element, a heat-transfer inhibiting member 7114 and a heat-releasing-side heat conductive member 7115, all of which are arranged in the mentioned order from the projection lens 3 side.

Although not specifically shown, the peltier element 7113 includes a plurality of jointed pairs which is electrically connected in tandem, each jointed pair formed by a P semiconductor and an N semiconductor which are jointed with each other by a metal piece.

As shown in FIGS. 16 to 18, in the peltier element 7113 having such an arrangement, when a predetermined electrical pressure is applied under the control of the control board 6, one surface of the peltier element 7113 becomes a heat absorbing surface 7113A for absorbing heat and another surface becomes a heat releasing surface 7113B for releasing heat. Note that in the first exemplary embodiment, the peltier element 7113 is so arranged that the heat absorbing surface 7113A and the heat releasing surface 7113B can be switched by changing polarity of the predetermined voltage, namely by changing a direction of current.

The heat-absorbing-side heat conductive member 7111 is formed of a high-heat-conductive material (see Table 1 below) and is connected via the stepped block 7112 to the heat absorbing surface 7113A of the peltier element 7113 in a heat conductive manner. As shown in FIGS. 16 to 18, the heat-absorbing-side heat conductive member 7111 includes a rectangular plate body 7111A and a plurality of fin members 7111B that protrudes from an end surface in the minus X axis direction of the plate body 7111A (from an opposite end surface of the connecting surface to the stepped block 7112) to extend in the Y axis direction (in the vertical direction), thereby forming a heat sink The stepped block 7112 is formed of the high-heat-conductive material (see Table 1 below) and interposed between the plate body 7111A of the heat-absorbing-side heat conductive member 7111 and the heat absorbing surface 7113A of the peltier element 7113. As shown in FIGS. 16 to 18, the stepped block 7112 includes a block main body 7112A in a plate-like shape and a bulged portion 7112B in a plate-like shape which bulges from an end surface in the plus X axis direction of the block main body 7112A (from an end surface on the peltier element 7113 side), the bulged portion 7112B having a planar shape substantially the same as that of the peltier element 7113. In the stepped block 7112, the block main body 7112A is connected to the heat-absorbing-side heat conductive member 7111 in a heat conductive manner; and the bulged portion 7112B is connected to the heat absorbing surface 7113A of the peltier element 7113 in a heat conductive manner.

In the first exemplary embodiment, a thickness of the stepped block 7112 (the thickness including a thickness of the block main body 7112A and a thickness of the bulged portion 7112B) is set to be in the range from 15 mm to 30 mm.

The heat-transfer inhibiting member 7114 is formed of a low-heat-conductive material (see Table 1 below). The heat-transfer inhibiting member 7114 is disposed between the heat-absorbing-side heat conductive member 7111 and the heat-releasing-side heat conductive member 7115 to hold the stepped block 7112 and the peltier element 7113.

As shown in FIGS. 16 to 18, the heat-transfer inhibiting member 7114 is provided with a dented portion 7114A that is dented toward the plus X axis direction side (the cooling fan 714 side), the dented portion 7114A engageable with the block main body 7112A of the stepped block 7112. As shown in FIG. 18, a height of the dented portion 7114A is set to be substantially equal to the thickness of the block main body 7112A.

As shown in FIGS. 16 to 18, an opening portion 7114B is formed in a bottom surface portion of the dented portion 7114A of the heat-transfer inhibiting member 7114, the opening portion 7114B being engageable with the bulged portion 7112B of the stepped block 7112.

In addition, the heat-transfer inhibiting member 7114 is provided with a holding portion 7114C that has a frame-like shape protruding from a circumferential end portion of the opening portion 7114B toward the plus X axis direction side (the cooling fan 714 side), the holding portion 7114C holding an outer end portion of the peltier element 7113 by an inner portion of the frame-like shape. As shown in FIG. 18, a protruding dimension of the holding portion 7114C is set to be substantially equal to or smaller than a sum of the thickness of the bulged portion 7112B and the thickness of the peltier element 7113. The surface 7113A of the peltier element 7113 is in secure contact with a plate body 7115A of the heat-releasing-side heat conductive member 7115. The surface 7113B of the peltier element 7113 is in secure contact with the bulged portion 7112B of the stepped block 7112.

According to the above-described arrangement, when the peltier unit 711 is assembled, the heat-transfer inhibiting member 7114 is disposed so as to cover outer ends of the stepped block 7112 and the peltier element 7113 as shown in FIG. 18.

The heat-releasing-side heat conductive member 7115 is formed of the high-heat-conductive material (see Table 1 below) and is connected to the heat releasing surface 7113B of the peltier element 7113 in a heat conductive manner. As shown in FIGS. 16 to 18, similarly to the heat-absorbing-side heat conductive member 7111, the heat-releasing-side heat conductive member 7115 is formed of the heat sink having the plate body 7115A and a plurality of fin members 7115B. As shown in FIGS. 16 to 18, the plurality of fin members 7115B extends in a direction (in the Z axis direction) orthogonal to the extending direction of the plurality of fin members 7111B of the heat-absorbing-side heat conductive member 7111.

The heat-absorbing-side duct 712 is formed of the low-heat-conductive material (see Table 1 below). As shown in FIG. 15, the heat-absorbing-side duct 712 has a substantially U-shape in cross section, the heat-absorbing-side duct 712 extending in the Y axis direction so as to enclose the plurality of fin members 7111B of the heat-absorbing-side heat conductive member 7111. A tip end of the U-shaped heat-absorbing-side duct 712 is connectable with the plate body 7111A of the heat-absorbing-side heat conductive member 7111. When the heat-absorbing-side duct 712 is connected with the plate body 7111A, the plurality of fin members 7111B is disposed on an inner portion of the U-shape. As shown in FIG. 15, a flow path C1 is formed by the heat-absorbing-side duct 712 in which air can flow in the extending direction of the plurality of fin members 7111B. The flow path C1 is a part of air flow passage in the sealed structure. Specifically, while the air circulates in the flow path C1 (a heat-transferring path) from the plurality of fin members 7111B through the plate body 7111A and the stepped block 7112 to the heat absorbing surface 7113A of the peltier element 7113, heat in the air is absorbed by the heat absorbing surface 7113A of the peltier element 7113.

The heat-releasing-side duct 713 is formed of the high-heat-conductive material (see Table 1 below). As shown in FIG. 15, the heat-releasing-side duct 713 is interposed between the cooling fan 714 and the peltier unit 711, the heat-releasing-side duct 713 guiding air that is sent via the peltier unit 711 from the cooling fan 714 in a predetermined direction. Specifically, although partially omitted in FIG. 15, the heat-releasing-side duct 713 has a shape covering three sides of the plus Z axis direction side, the plus Y axis direction side and the plus X axis direction side of the heat-releasing-side heat conductive member 7115. As shown in FIG. 15, a cutout 7131 is formed in a surface on the plus X axis direction side (a surface facing the fin member 7115B) of the heat-releasing-side duct 713. As shown in FIG. 15, on a circumferential end portion of the cutout 7131, connecting portions 7132 are provided, which are to be connected with a fan attaching member 714A for attaching the cooling fan 714 in the exterior casing 2. As shown in FIG. 15, the heat-releasing-side duct 713 guides air blown by the cooling fan 714 onto the fin members 7115B toward the minus Z axis direction side.

The cooling fan 714 is an axial flow fan that is disposed so as to face the cooling-device air inlet 224 formed in the exterior casing 2 as shown in FIG. 15. The cooling fan 714 drives under the control of the control board 6 to suck air outside the exterior casing 2 through the cooling-device air inlet 224 and eject the air to the plurality of the fin members 7115B of the heat-releasing-side heat conductive member 7115. Specifically, hear transferred by a heat-transferring path from the heat releasing surface 7113B of the peltier element 7113 through the plate body 7115A and the plurality of fin members 7115B to the plurality of fin members 7115B is cooled by the cooling fan 714.

2-3-2 Structure of Flow-Path-Upstream-Side Duct Member

The flow-path-upstream-side duct member 73 is formed of the low-heat-conductive material (see Table 1 below). The flow-path-upstream-side duct member 73 guides air circulated in the flow path C1 via the cooling device 71 to the circulation fan 72. The flow-path-upstream-side duct member 73 also guides the air ejected by the circulation fan 72 to the spaces Ar1, Ar2. As shown in FIGS. 6 and 12 to 14, the flow-path-upstream-side duct member 73 includes a base plate 731 and the duct main body 732 (FIG. 6, FIG. 12).

As shown in FIGS. 6 and 12 to 14, the base plate 731 is attached with a predetermined space to an end surface in the minus Y axis direction of the component-accommodating-portion main body 4612 of the optical component casing 46, the space being, for example, about 5 to 10 mm, the base plate 731 supporting the circulation fan 72 and the duct main body 732. As shown in FIGS. 13 and 14, the base plate 731 has a substantially T-shape in plan view. More specifically, the base plate 731 extends in the Z axis direction from the lower side of the projection lens 3 toward a position corresponding to the position of the optical device 45 in the optical component casing 46. An end portion of the base plate 731 in the minus Z axis direction extends in the X axis direction toward a position corresponding to the position of the polarization converter 423 and the opposite side of the position of the polarization converter 423.

As shown in FIG. 13 or 14, a portion of the base plate 731 on the lower side of the projection lens 3 serves as a first attaching portion 7311 for attaching the circulation fan 72. As shown in FIG. 13 or 14, a portion of the base plate 731 which protrudes in the plus X axis direction from a position corresponding to the position of the optical device 45 serves as a second attaching portion 7312 for attaching the circulation fan 72.

The circulation fan 72 circulates air in the ringed air flow passage in the sealed structure. As shown in FIG. 13, the circulation fan 72 includes a first sirocco fan 721 and a second sirocco fan 722. As shown in FIG. 13, the first sirocco fan 721 is attached to the first attaching portion 7311 of the base plate 731 such that an air inlet 7211 is oriented toward the minus Y axis direction side and an air outlet 7212 is oriented toward the minus Z axis direction side. As shown in FIG. 13, the second sirocco fan 722 is attached to the second attaching portion 7312 of the base plate 731 such that an air inlet 7221 is oriented toward the minus Y axis direction side and an air outlet 7222 is oriented toward the minus Z axis direction side and inclined toward the minus X axis direction side by a predetermined angle relative to the XY plane.

As shown in FIG. 13 or 14, in the base plate 731, opening portions 7313R, 7313G, 7313B respectively corresponding to the opening portions 4612R, 4612G, 4612B formed in the optical component casing 46 are formed at positions corresponding to the position of the optical device 45.

As shown in FIG. 13 or 14, in the base plate 731, an opening portion 7314P corresponding to the opening portions 4612P formed in the optical component casing 46 is formed at a position corresponding to the position of the polarization converter 423.

Since the duct main body 732 is attached to an end surface of the base plate 731 in the minus Y axis direction, the duct main body 732 can guide the air circulated in the flow path C1 via the cooling device 71 to the circulation fan 72 and the air ejected from the circulation fan 72 to the spaces Ar1, Ar2. As shown in FIG. 6 or 12, the duct main body 732 includes a base body 7321 and the cover member 7322 (FIG. 6).

As shown in FIG. 12, the base body 7321 has substantially the same plane shape as that of the base plate 731. A first duct portion 7321A and a second duct portion 7321B integrally form the base body 7321.

The first duct portion 7321A guides air that is circulated in the flow path C1 via the cooling device 71 to the circulation fan 72. As shown in FIG. 12, the first duct portion 7321A includes a partition wall 7321A1 that planarly covers the heat-absorbing-side duct 712 of the cooling device 71 and the circulation fan 72 when the sealed circulating-air-cooling unit 7 is assembled. The partition wall 7321A1 is formed in a container-like shape having an opening portion 7321A2 on the minus Y axis direction side.

As shown in FIG. 12, an opening portion 7321A3 is formed in the first duct portion 7321A on a position corresponding to the heat-absorbing-side duct 712 of the cooling device 71, the opening portion 7321A3 communicating with the flow path C1.

As shown in FIG. 12, opening portions 7321A4, 7321A5 are formed in the first duct portion 7321A at positions respectively corresponding to the air inlets 7211, 7221 of the sirocco fans 721 and 722 of the circulation fan 72.

As shown in FIG. 12, a flow adjusting rib 7321A6 is provided on the first duct portion 7321A between the opening portions 7321A4, 7321A5 so as to extend from the partition wall 7321A1 toward the opening portion 7321A3.

As shown in FIG. 12, a heat-releasing-airflow controller 7321A7 in a rectangular shape in plan view is provided on the first duct portion 7321A at a position corresponding to the heat-releasing-side duct 713 of the cooling device 71, the heat-releasing-airflow controller 7321A7 extending from the partition wall 7321A1 in the plus X axis direction. Accordingly, when the sealed circulating-air-cooling unit 7 is assembled, the heat-releasing-airflow controller 7321A7 is connected with the heat-releasing-side duct 713 of the cooling device 71. The heat-releasing-airflow controller 7321A7 and the heat-releasing-side duct 713 guide air that is blown onto the fin member 7115B by the cooling fan 714 in the minus Z axis direction.

As shown in FIG. 12, a circumferential end portion of the opening portion 7321A4 of the first duct portion 7321A serves as a first attaching portion 7321A8 for attaching the first sirocco fan 721 of the circulation fan 72. The first sirocco fan 721 is sandwiched and fixed by the first attaching portion 7311 of the base plate 731 and the first attaching portion 7321A8 of the duct main body 732.

As shown in FIG. 12, a circumferential end portion of the opening portion 7321AS of the first duct portion 7321A serves as a second attaching portion 7321A9 for attaching the second sirocco fan 721 of the circulation fan 72. The second sirocco fan 722 is sandwiched and fixed by the second attaching portion 7312 of the base plate 731 and the second attaching portion 7321A9 of the duct main body 732.

As shown in FIG. 6, the cover member 7322 is attached to the partition wall 7321A1 of the first duct portion 7321A and closes the opening portion 7321A2.

As shown in FIG. 12, since the cover member 7322 is attached to the first duct portion 7321A, air circulated in the flow path C1 is introduced through the opening portion 7321A3 to a space between the first duct portion 7321A and the cover member 7322. The flow adjusting rib 7321A6 forms the flow path C2 guiding the air to the opening portion 7321A4 (the first sirocco fan 721) and the flow path C3 guiding the air to the opening portion 7321AS (the second sirocco fan 722). The flow paths C2, C3 form a part of the air flow passage in the sealed structure.

The second duct portion 7321B guides the air that is circulated in the flow paths C2, C3 and sucked and ejected to the sirocco fans 721, 722 to the spaces Ar1, Ar2 in the optical component casing 46. As shown in FIG. 6 or 12, the second duct portion 7321B has a substantially L-shape in plan view in which the second duct portion 7321B extends from a position corresponding to the position of the optical device 45 in the minus Z axis direction and extends to a position corresponding to the position of the polarization converter 423 in the minus X axis direction, forming a container-like shape in plan view with an opening on the plus Y axis direction side.

Although not specifically shown, a cutout connecting with the air outlet 7212 of the first sirocco fan 721 and a cutout connecting with the air outlet 7222 of the second sirocco fan 722 are formed in a lateral wall portion of the container-like shape of the second duct portion 7321B.

Although not specifically shown, the second duct portion 7321B is provided with a flow adjusting rib that guides to a predetermined portion the air ejected from the first sirocco fan 721 and the second sirocco fan 722.

As shown in FIG. 13, the duct main body 732 attached to the base plate 731 guides the air that is circulated in the flow path C2 and sucked and ejected by the first sirocco fan 721 to a space between the second duct portion 7321B and the base plate 731. The flow adjusting rib forms a flow path C4 that guides the air to the space Ar1 via the opening portions 7313R, 7313B of the base plate 731 and the opening portions 4612R, 4612B of the optical component casing 46. In addition, as shown in FIG. 13, air that is circulated in the flow path C3 and sucked and ejected by the second sirocco fan 722 to a space between the second duct portion 7321B and the base plate 731. The flow adjusting rib forms a flow path C5 that guides the air to the space Ar1 via the opening portion 7313G of the base plate 731 and the opening portion 4612G of the optical component casing 46. The flow adjusting rib also forms a flow path C6 that guides the air to the space Ar2 via the opening portion 7314P of the base plate 731 and the opening 4612P of the optical component casing 46. The flow paths C4 to C6 form a part of the air flow passage in the sealed structure.

2-3-3 Structure of Flow-Path-Downstream-Side Duct Member

The flow-path-downstream-side duct member 74 is a member that guides air flown to the outside of the spaces Ar1, Ar2 from the inside of the spaces Ar1, Ar2 to the heat-absorbing-side duct 712 (the flow path C1) of the cooling device 71. As shown in FIG. 10 or 11, the flow-path-downstream-side duct member 74 includes the low-heat-conductive duct portion 741 and the high-heat-conductive duct portion 742 (FIG. 10).

The low-heat-conductive duct portion 741 is formed of the low-heat-conductive material (see Table 1 below). As shown in FIG. 10, the low-heat-conductive duct portion 741 includes a partition wall 7411 that planarly covers an open portion of the heat-absorbing-side duct 712 of the cooling device 71 on the plus Y axis direction side and the component-accommodating-portion main body 4612 of the optical component casing 46, forming a substantially L-shape container-like shape in plan view having an opening portion 7412 on the plus Y axis direction side. As shown in FIG. 11, the low-heat-conductive duct portion 741 is attached to an end surface of the heat-absorbing-side duct 712 in the plus Y axis direction and an end surface of the lid-like member 462 in the plus Y axis direction with a predetermined distance (for example, about 5 to 10 mm).

The flow-path-downstream-side duct member 74 is provided with a hole in which a FPC cable 456 for connecting the liquid crystal panels 451 with the control board 6 is inserted. A gap between the hole and the FRC cable 456 is filled with rubber, sponge and the like to prevent degradation in sealing property of the flow-path-downstream-side duct member 74.

As shown in FIG. 11, an opening portion 7413 is formed in the low-heat-conductive duct portion 741 at a position corresponding to the heat-absorbing-side duct 712, the opening portion 7413 communicating with the flow path C1.

As shown in FIG. 11, an opening portion 7414 is formed in the low-heat-conductive duct portion 741 at a position corresponding to the cutout 4621 of the lid-like member 462, the opening portion 7414 communicating with the space Ar1 via the cutout 4621.

As shown in FIG. 11, an opening portion 7415 is formed in the low-heat-conductive duct portion 741 at a position corresponding to the opening portion 4622 of the lid-like member 462, the opening portion 7415 communicating with the space Ar2 via the opening portion 4622.

As shown in FIG. 11, a flow adjusting rib 7416 is provided to the low-heat-conductive duct portion 741, the flow adjusting rib 7416 extending from the partition wall 7411 to the opening portion 7412 and separating the opening portions 7414, 7415.

The high-heat-conductive duct portion 742 is formed of the high-heat-conductive material (see Table 1 below). As shown in FIG. 10, the high-heat-conductive duct portion 742 is a member that is attached to the partition wall 7411 of the low-heat-conductive duct portion 741 and closes the opening portion 7412.

Since the high-heat-conductive duct portion 742 is attached to the low-heat-conductive duct portion 741, the flow paths C7 and C8 are formed as shown in FIG. 11, the flow path C7 introducing air that is flown to the outside of the space Ar1 from the inside of the space Ar1 to the inside of the flow-path-downstream-side duct member 74 via the cutout 4621 and the opening portion 7414, the flow path C7 also guiding the air to the heat-absorbing-side duct 712 (the flow path C1) via the opening portion 7413, the flow path C8 introducing air flown to the outside of the space Ar2 from the inside of the space Ar2 to the inside of the flow-path-downstream-side duct member 74 via the opening portions 4622 and 7415, the flow path C8 also guiding the air to the heat-absorbing-side duct 712 (the flow path C1) via the opening portion 7413. The flow paths C7, C8 form a part of the air flow passage in the sealed structure.

The above-described flow paths C1 to C8 and the spaces Ar1 and Ar2 form the ringed air flow passage in the sealed structure. By circulating air through the ringed air flow passage from the flow path C1 to the flow path C2, the flow path C3 via the flow paths C4, C5 and the flow path C6 to the spaces Ar1, Ar2 to the flow path C7, the flow path C8 to the flow path C1, the optical device 45 (the liquid crystal panels 451, the incident-side polarization plates 452, the irradiation-side polarization plate 454 and the like) in the spaces Ar1, Ar2 and the polarization converter 423 are cooled.

Although not specifically shown, the optical component casing 46 and the sealed circulating-air-cooling unit 7 each have a sealed structure in which the air flow passage is not in communication with the outside by, for example, providing an elastic sealing member and the like between the components.

The above-described high-heat-conductive material and low-heat-conductive material may be one exemplified in Table 1 below. As shown in Table 1, the high-heat-conductive material may preferably have a heat conductivity of 42 W/(m·K) or higher. The low-heat-conductive material may preferably have a beat conductivity of 0.9 W/(m·K) or lower.

TABLE 1

| | | Material Name | Heat Conductivity (W/m · K)) |
|---|---|---|---|
| High-Heat-Conductive Material | Metal | Iron (Fe) | 80 |
| | | Alminium (Pure Al) | 237 |
| | | Copper (Pure Cu) | 398 |
| | | A5052 (Al Alloy) | 138 |
| | | ADC12 (Al Alloy) | 96 |
| | | AZ91D (Mg Alloy) | 72 |
| | | Carbon Steel | 42 |
| | | SUS (Stainless Steel) | 16 |
| Low-Heat-Conductive Material | Resin | Acryl | 0.21 |
| | | Epoxy | 0.3 |
| | | Polycarbonate | 0.23 |
| | | ABS | 0.9 |
| | | Polypropylene | 0.2 |
| | Heat Insulating Material | Glass Wool | 0.034 |
| | | Foamed Polystyrene | 0.038 |
| | | Rigid Urethane Foam | 0.018 |

2-4 Structure of Inside-Casing Cooling Device

The inside-casing cooling device 8 cools components outside the sealed structure (the control board 6, the flow-path-downstream-side duct member 74, the light source device 41, the power source unit 5 and the like). As shown in FIGS. 4 to 6, the inside-casing cooling device 8 includes the peltier heat releasing air outlet unit 81 (FIG. 4, FIG. 5), a light-source cooling fan 82 (FIG. 6), a power-source cooling fan 83 and an exhaust fan 84.

The peltier heat releasing air outlet unit 81 circulates air blown from the cooling fan 714 onto the fin member 7115B of the heat-releasing-side duct 713 to a position between the control board 6 and the flow-path-downstream-side duct member 74. As shown in FIG. 4 or 5, the peltier heat releasing air outlet unit 81 includes an outer-side duct member 811 and an airflow guiding portion 812.

Figure 19:
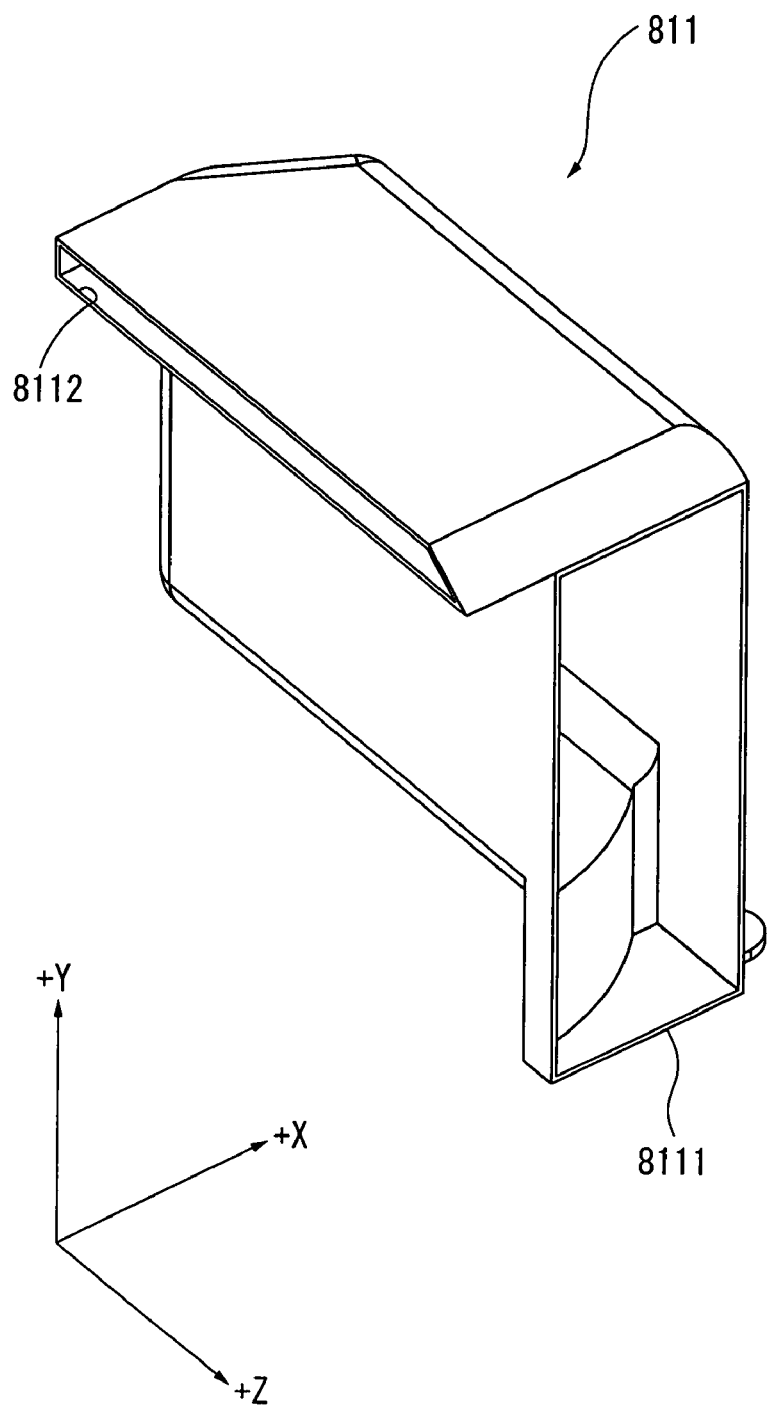
FIG. 19 is a perspective view showing an outer-side duct member of the first exemplary embodiment.

FIG. 19 is a perspective view showing the outer-side duct member 811.

As shown in FIG. 19, the outer-side duct member 811 includes an introduction hole 8111 that introduces air into the outer-side duct member 811 and an outflow hole 8112 that exhausts the air inside to the outside of the outer-side duct member 811, the holes 8112, 8113 being substantially orthogonal to each other. The air introduced into the outer-side duct member 811 through the introduction hole 8111 is bent in the plus Y axis direction and then bent toward the outflow hole 8112 for circulation. Although not specifically shown, the outer-side duct member 811 is disposed such that the introduction hole 8111 is connected with a rear lateral end of the heat-releasing-side duct 713 and a rear lateral end of the heat-releasing-airflow controller 7321A7. As shown in FIG. 4 or 5, the outer-side duct member 811 is disposed such that the outflow hole 8112 is positioned at a position between an end of the control board 6 (not shown in FIG. 4) in the plus X axis direction and an end of the flow-path-downstream-side duct member 74 in the plus X axis direction. The outer-side duct member 811 introduces therein via the introduction hole 8111 the air that is blown from the cooling fan 714 onto the fin member 7115B and is guided by the heat-releasing-airflow controller 7321A7 and the heat-releasing-side duct 713 in the minus Z axis direction, the outer-side duct member 811 exhausting the air via the outflow hole 8112 to a position between the control board 6 and the flow-path-downstream-side duct member 74 from the plus X axis direction side to the minus X axis direction side.

The airflow guiding portion 812 circulates the air exhausted from the outer-side duct member 811 between the control board 6 and the flow-path-downstream-side duct member 74 along portions facing the spaces Ar1, Ar2 of the flow-path-downstream-side duct member 74. As shown in FIG. 4 or 5, the airflow guiding portion 812 includes a first guide portion 8121 and a second guide portion 8122.

As shown in FIG. 4 or 5, the first guide portion 8121 is formed of a plate member. The first guide portion 8121 is vertically provided on the high-heat-conductive duct portion 742 such that an end side of the first guide portion 8121 is connected with an end of the outflow hole 8112 of the outer-side duct member 811 in the minus Z axis direction and the other end side extends along edges in the minus Z axis direction and the minus X axis direction of the high-heat-conductive duct portion 742 of the flow-path-downstream-side duct member 74 to the vicinity of the light-source-device accommodating portion 4611.

As shown in FIG. 4 or 5, the second guide portion 8122 is formed of a plate member. The second guide portion 8122 is vertically provided on the high-heat-conductive duct portion 742 such that an end side of the second guide portion 8122 is connected with an end of the outflow hole 8112 of the outer-side duct member 811 in the plus Z axis direction and the other end side extends in the minus X axis direction along an edge on an inner side of the L-shape of the high-heat-conductive duct portion 742 of the flow-path-downstream-side duct member 74 to the vicinity of the light-source-device accommodating portion 4611.

As shown in FIG. 4 or 5, by disposing the control board 6 on the plus Y axis direction side of the flow-path-downstream-side duct member 74 via the airflow guiding portion 812, a flow path C11 is formed in which air exhausted from the outflow hole 8112 of the outer-side duct member 811 is circulated from a portion facing the space Ar1 to a portion facing to the space Ar2.

As shown in FIG. 6, the light-source cooling fan 82 is formed of the sirocco fans. The light-source cooling fan 82 is attached on one end side of the component-accommodating-portion main body 4612 in the minus Y axis direction, the one end side connected with the light-source-device accommodating portion 4611, such that an air inlet 821 is open on the minus Y axis direction side and an air outlet 822 is open on the plus Z axis direction side. The light-source cooling fan 82 drives under the control of the control board 6, thereby sucking cooling air outside the exterior casing 2 through the light-source air inlet 223 formed in the lower case 22 and ejecting the air in the plus Z axis direction. As shown in FIG. 6, the air ejected from the light-source cooling fan 82 is introduced from an air introducing portion 4131 formed in the lamp housing 413 of the light source device 41 through the flow path C12 communicating the inside and the outside of the lamp housing 413 to the inside of the lamp housing 413, thereby cooling the light source lamp 411 and the reflector 412.

As shown in FIGS. 4 to 6, the power-source cooling fan 83 is formed of the axial-flow fan. The power-source cooling fan 83 is disposed at a corner portion on the minus Z axis direction side and the minus X axis direction side in the exterior casing 2 such that an air inlet 831 is open on the minus Z axis direction and an air outlet 832 is open on the plus Z axis direction side. As shown in FIG. 4 or 5, the power-source cooling fan 83 drives under the control of the control board 6, thereby sucking cooling air outside the exterior casing 2 through the power-source air inlet 225 formed in the exterior casing 2 and ejecting the air in the plus Z axis direction. As shown in FIGS. 4 to 6, the air ejected from the power-source cooling fan 83 is introduced by the shield member 51 of the power source unit 5 through a flow path C13 communicating the inside and the outside of the shield member 51 to the inside of the shield member 51 through an opening portion of the shield member 51 on the minus Z axis direction side, thereby cooling the power source block or the lamp driving block.

As shown in FIGS. 4 to 6, the exhaust fan 84 is formed of the axial-flow fan. The exhaust fan 84 is disposed at a corner portion on the plus Z axis direction side and the minus X axis direction side in the exterior casing 2 such that an air inlet 841 (FIG. 6) is open in the minus Z axis direction and inclined toward, the plus X axis direction side with a predetermined angle relative to the XY plane. The exhaust fan 84 drives under the control of the control board 6 to suck air in the vicinity of the exhaust fan 84.

For example, as shown in FIG. 4 or 5, the exhaust fan 84 sucks air circulated by the peltier heat releasing air outlet unit 81 through the flow path C11 to the vicinity of the light-source-device accommodating portion 4611.

For another example, as shown in FIG. 5 or 6, the exhaust fan 84 sucks air inside the light-source-device accommodating portion 4611 through an open portion (not shown) formed in an end surface in the minus X axis direction of the light-source-device accommodating portion 4611. In other words, the exhaust fan 84 sucks the air that is introduced by the light-source cooling fan 82 through the flow path C12 to the inside of the lamp housing 413 and heated by the light source lamp 411 and the reflector 412 as well as the air flown through the opening portion 4611B formed in an end surface in the plus X axis direction of the light-source-device accommodating portion 4611 into the light-source-device accommodating portion 4611.

For another example, as shown in FIGS. 4 to 6, the exhaust fan 84 sucks air inside the shield member 51 through an open portion in the shield member 51 on the plus Z axis direction side. In other words, the air introduced by the power-source cooling fan 83 through the flow path C13 to the inside of the shield member 51 and heated by the power source block or the lamp driving block is sucked by the exhaust fan 84.

The air ejected by the exhaust fan 84 is flow-adjusted by the louver 234 while flowing through the exhaust opening 233 of the exterior casing 2 and exhausted to the outside of the exterior casing 2.

2-5 Structure of Control Board

As shown in FIG. 3, the control board 6 is a circuit board on which a circuit element such as a CPU (Central Processing Unit) is provided. The control board 6 is disposed on the upper side of the optical unit 4 via the flow-path-downstream-side duct member 74 and the airflow guiding portion 812. The control board 6 controls the optical unit 4 (the light source lamp 411, the liquid crystal panels 451), the power source unit 5, the sealed circulating-air-cooling unit 7 (the circulation fan 72, the peltier element 7113 and the cooling fan 714), the inside-casing cooling device 8 (the light-source cooling fan 82, the power-source cooling fan 83 and the exhaust fan 84) and the like. Note that, in the following description, only a control structure of the peltier element 7113 out of the control structure of the control board 6 will be described.

Figure 20:
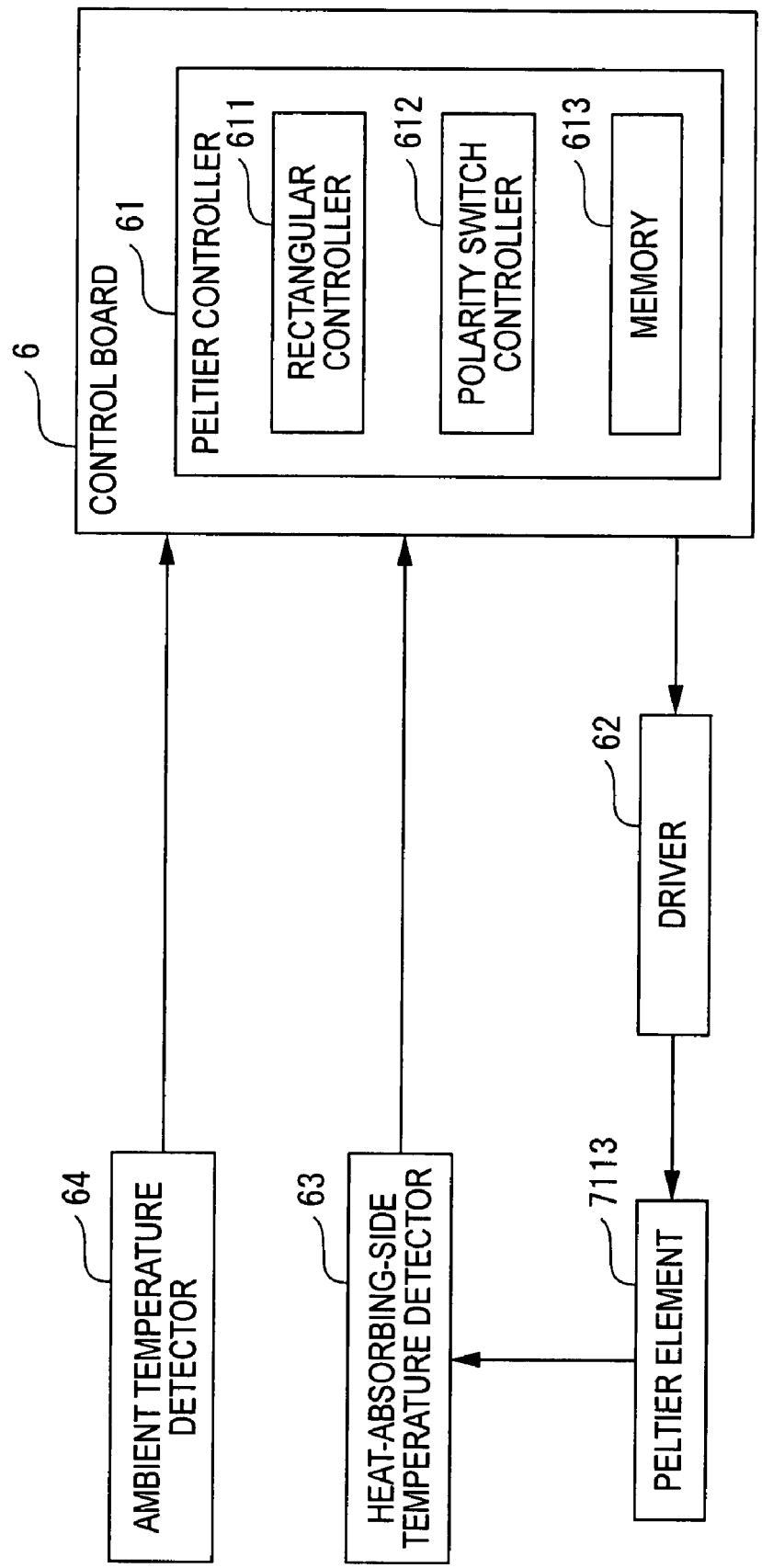
FIG. 20 is a block diagram schematically showing a control structure of the peltier element of the first exemplary embodiment.

FIG. 20 is a block diagram schematically showing the control structure of the peltier element 7113.

In the control board 6, a peltier controller 61 as a control device for controlling drive of the peltier element 7113 outputs a predetermined control command to a driver 62 that applies a predetermined voltage to the peltier element 7113 to control the drive of the peltier element 7113 as shown in FIG. 20. The peltier controller 61 includes a rectangular controller 611, a polarity switch controller 612 and a memory 613.

The rectangular controller 611 outputs the predetermined control command to the driver 62 to perform a rectangular control of the peltier element 7113 when the projector 1 is actuated (when the drive or the peltier element 7113 is started) and stopped (when the drive of the peltier element 7113 is stopped). Specifically, when actuating the projector 1, the rectangular controller 611 performs a rectangular control in which the rectangular controller 611 outputs a predetermined control command to the driver 62 to increase stepwise a voltage value applied to the peltier element 7113 up to a normal voltage value. When stopping the projector 1, the rectangular controller 611 performs a rectangular control in which the rectangular controller 611 outputs a predetermined control command to the driver 62 to decrease stepwise the voltage value applied to the peltier element 7113 from the normal voltage.

The polarity switch controller 612 performs a polarity switch control in which the polarity switch controller 612 compares a detected temperature detected by a heat-absorbing-side temperature detector 63 (see FIG. 20) formed by a thermistor or the like for detecting a temperature of the heat-absorbing-side heat conductive member 7111 connected to the control board 6 with an ambient temperature detected by an ambient temperature detector 64 (see FIG. 20) formed by a thermistor or the like for detecting the ambient temperature outside the sealed structure and outputs a predetermined control command to the driver 62 to switch the polarity of the voltage to be applied to the peltier element 7113 when a difference between the detected temperature and the ambient temperature (detected temperature difference) is larger than a set temperature difference based on set temperature difference information stored in the memory 613.

The memory 613 stores a control program used when processing is performed by the controllers 611, 612, information required for executing the processing (the set temperature difference information, etc.) and the like. In short, the memory 613 corresponds to a set temperature difference information storage section of the invention.

The set temperature difference information is information about a difference (set temperature difference) between a set temperature of the heat-absorbing-side heat conductive member 7111 for cooling the optical device 45 and the polarization converter 423 (to-be-cooled objects) to a desired temperature and the set ambient temperature outside the sealed structure which is set in accordance with an environment in which the projector 1 is used.

Note that the memory 613 is so arranged that the above-described set temperature information can be appropriately changed on, for instance, a menu window for setting a drive state of the projector 1 through the operation of the operation panel 212 or the remote controller.

The heat-absorbing-side temperature detector 63 detects the temperature of the heat-absorbing-side heat conductive member 7111 that is heat-conductively connected to the heat absorbing surface 7113A of the peltier element 7113 so that the heat of the heat absorbing surface 7113A is transferred thereto. Since the heat-absorbing-side heat conductive member 7111 is heat-conductively connected to the heat absorbing surface 7113A via the stepped block 71112, the heat-absorbing-side temperature detector 63 cannot directly detect the temperature of the heat absorbing surface 7113A. However, since the temperature of the heat-absorbing-side heat conductive member 7111 and the temperature of the heat absorbing surface 7113A are substantially equal, the heat-absorbing-side temperature detector 63 detects the temperature of the heat-absorbing-side heat conductive member 7111 in substitution for detecting the temperature of the heat absorbing surface 7113A.

3 Control Method of Peltier Element

Next, a control method of the peltier element 7113 by the above-described peltier controller 61 will be described.

Figure 21:
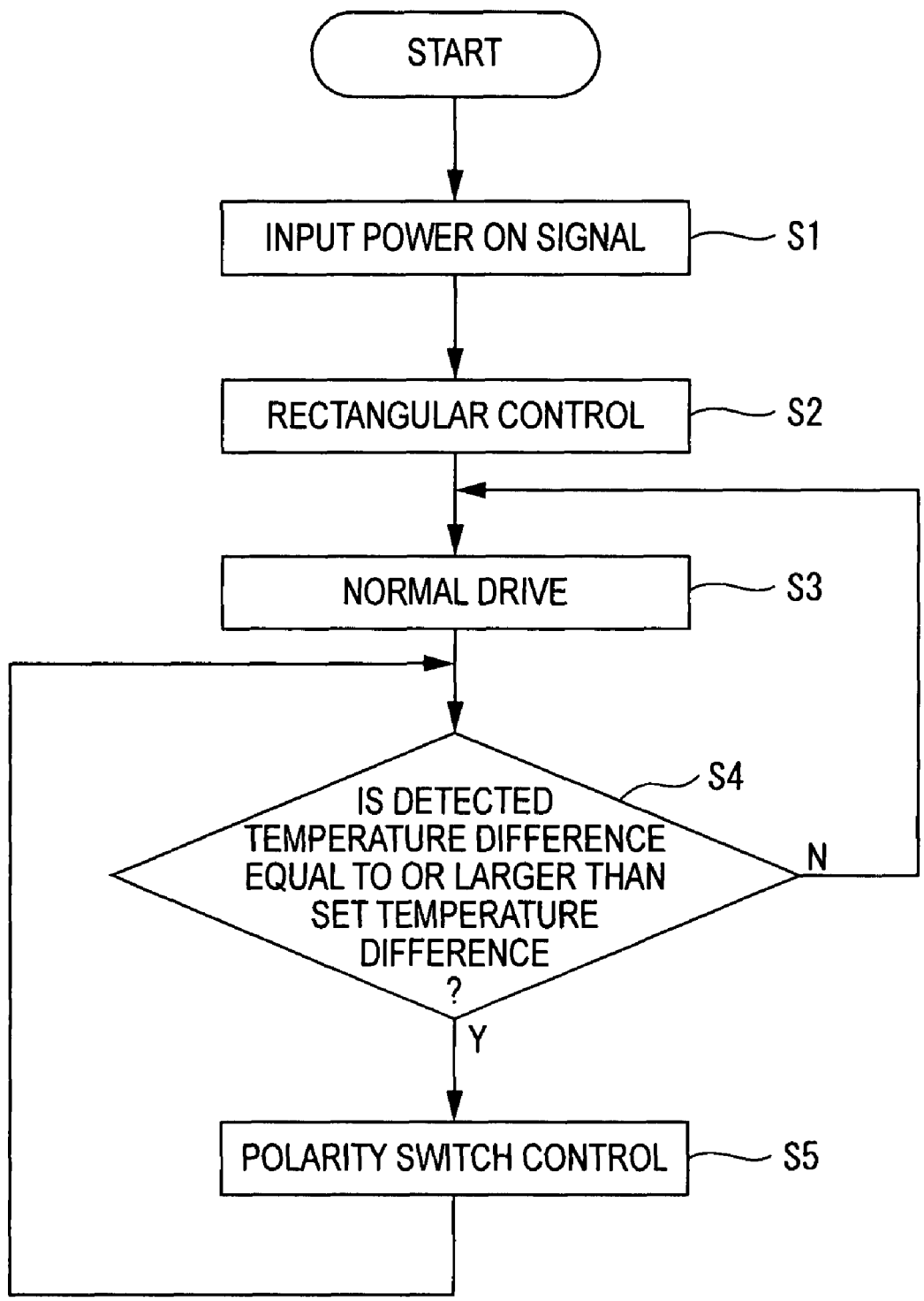
FIG. 21 is a flowchart showing how the peltier element is controlled according to the first exemplary embodiment.

FIG. 21 is a flowchart showing how the peltier element 7113 is controlled.

First, when an user operates the operation panel 212 or the remote controller (not shown) to perform an input operation for "actuating projector 1", the peltier controller 61 of the control board 6 receives a power ON signal from the operation panel 212 or the remote controller light receiving module (not shown) (Step S1). Then, the peltier controller 61 reads a control program stored in the memory 613 to start a drive control of the peltier element 7113 as follows.

Figure 22:
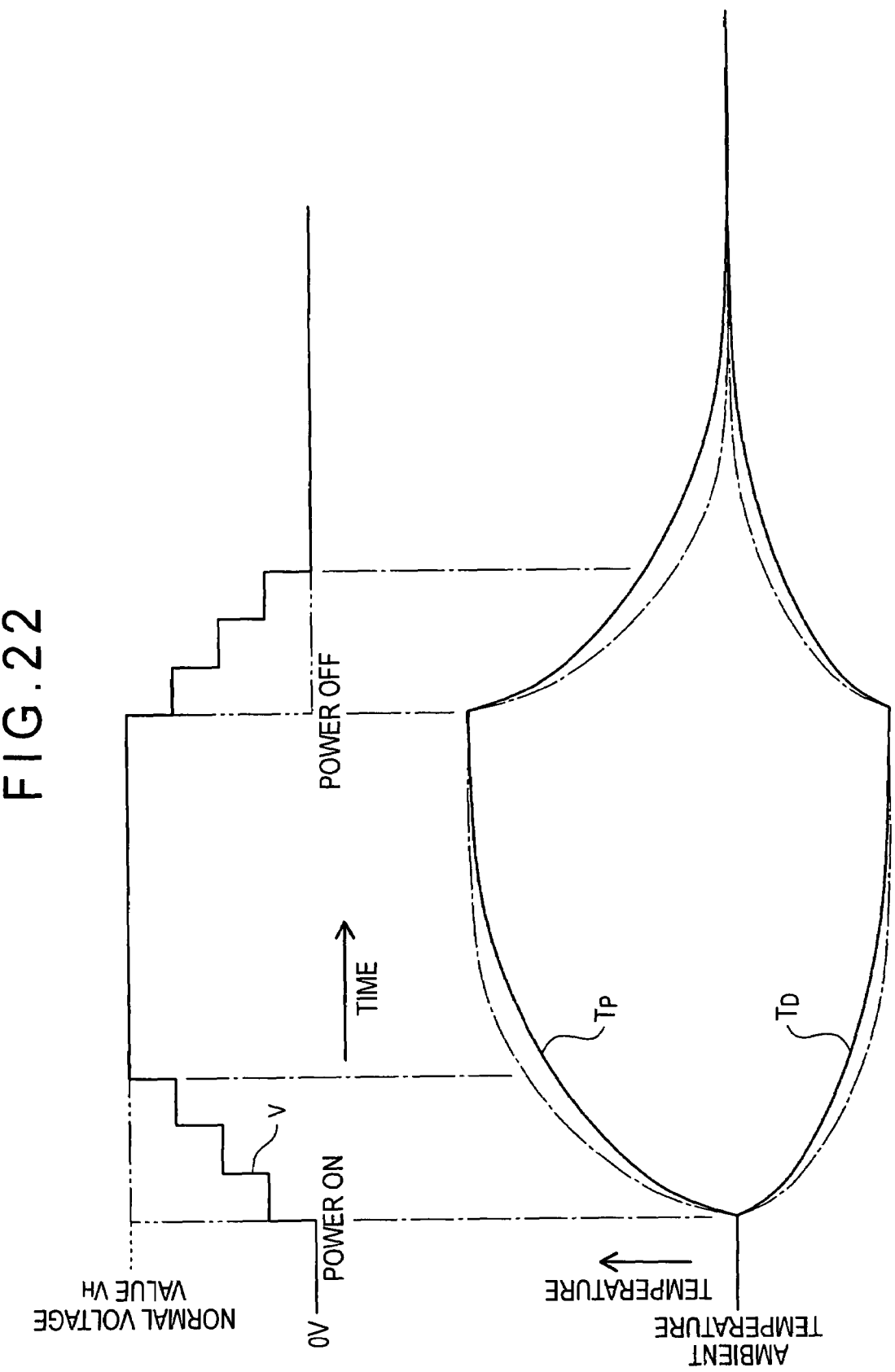
FIG. 22 shows an example of a rectangular control performed by a rectangular controller according to the first exemplary embodiment.

FIG. 22 shows an example of a rectangular control performed by the rectangular controller 611. Note that FIG. 22 shows behaviors of an applied voltage value V to the peltier element 7113 (upper part), an ambient temperature $T_P$ outside the sealed structure (middle part) and a detected temperature $T_D$ by the heat-absorbing-side temperature detector 63 (lower part) with an elapse of time on the horizontal axis.

After Step S1, as shown in FIG. 22 when receiving the power ON signal, the rectangular controller 611 outputs a predetermined control command to the driver 62 to perform a rectangular control for increasing stepwise a voltage value of the voltage applied to the peltier element 7113 from 0V to a normal voltage value $V_H$ (Step S2).

After Step S2, the peltier controller 61 outputs a predetermined control command to the driver 62 for maintaining a normal drive state in which the normal voltage value $V_H$ is applied to the peltier element 7113 (Step S3).

During the normal drive state in Step S3, the peltier controller 61 recognizes the detected temperature $T_D$ detected by the heat-absorbing-side temperature detector 63 and the ambient temperature $T_P$ detected by the ambient temperature detector 64 and constantly calculates a detected temperature difference between the detected temperature $T_D$ and the ambient temperature $T_P$. The peltier controller 61 constantly compares the detected temperature difference with the set temperature difference based on the set temperature difference information stored in the memory 613 to judge whether or not the detected temperature difference becomes equal to or larger than the set temperature difference (Step S4). By judging whether or not the detected temperature difference becomes equal to or larger than the set temperature difference during the normal drive state in Step S3, the peltier controller 61 detects whether or not the temperature of the heat-absorbing-side heat conductive member 7111 (i.e., the temperature of the heat absorbing surface 7113A of the peltier element 7113) becomes excessively low relative to the ambient temperature.

When the judgment result of Step S4 is "N", namely when judging that the temperature of the heat-absorbing-side heat conductive member 7111 (i.e., the temperature of the heat absorbing surface 7113A of the peltier element 7113) is not excessively low relative to the ambient temperature, the peltier controller 61 returns the process to Step S3 and maintains the normal drive state.

On the other hand, when the judgment result of Step S4 is "Y", namely when judging that the temperature of the heat-absorbing-side heat conductive member 7111 (i.e., the temperature of the heat absorbing surface 7113A of the peltier element 7113) is excessively low relative to the ambient temperature, the peltier controller 61 performs the polarity switch control continuously until the detected temperature difference becomes smaller than the set temperature difference (Step S5).

Specifically, when the detected temperature difference is equal to or larger than the set temperature difference, the polarity switch controller 612 outputs a predetermined control command to the driver 62 to perform the polarity switch control for switching the polarity of the voltage applied to the peltier element 7113. By the polarity switch control, the heat absorbing surface 7113A of the peltier element 7113 is switched to the heat releasing surface for releasing heat, while the heat releasing surface 7113B is switched to the heat absorbing surface for absorbing heat. In short, by performing the polarity switch control, the temperature of the heat absorbing surface 7113A that has been excessively low relative to the ambient temperature is increased.

During Steps S1 to S5 described above, when the user operates the operation panel 212 or the remote controller (not shown) to perform an input operation for "stopping the projector 1", the peltier controller 61 receives a power OFF signal from the operation panel 212 or the remote controller light receiving module. Then, the peltier controller 61 performs a rectangular control to stop the drive of the peltier element 7113.

Specifically, as shown in FIG. 22, when receiving the power OFF signal, the rectangular controller 611 outputs a predetermined control command to the driver 62 to perform a rectangular control for decreasing stepwise a voltage value of the voltage applied to the peltier element 7113 from the normal voltage value $V_H$ to 0V.

The above-described first exemplary embodiment can provide following exemplary advantages.

According to the first exemplary embodiment, since the optical device 45 and the polarization converter 423 are accommodated in the spaces Ar1, Ar2 in the optical component casing 46 of the sealed structure, dust, lamp black or the like can be prevented from adhering on the optical components 45, 423, thereby ensuring stable image quality in projection image projected from the projector 1.

In addition, since the cooling device 71, the circulation fan 72 and the optical component casing 46 that form the sealed structure are disposed in order of mention along the air-flowing direction in the air flow passage in the sealed structure. With the arrangement, the circulation fan 72 can suck the air cooled on the heat absorbing side of the cooling device 71 (the heat-absorbing-side heat conductive member 7111, the stepped block 7112 and the heat absorbing surface 7113A of the peltier element 7113) and eject the air toward the optical components 45, 423 accommodated in the spaces Ar1, Ar2 in the optical component casing 46. Accordingly, the air that is cooled to a low temperature on the heat absorbing side of the cooling device 71 can be sent to the optical components 45, 423 while maintaining the low temperature, thereby efficiently cooling the optical components 45, 423.

Since the circulation fan 72 includes the two sirocco fans 721, 722, ejecting pressure and air speed of the ejected air can be sufficiently secured, thereby efficiently cooling the optical components 45, 423.

In addition, the flow-path-upstream-side duct member 73 is formed of a low-heat-conductive material having heat conductivity of equal to or lower than 0.9 W/(m·k). By forming the flow-path-upstream-side duct member 73 of a material having a sufficiently low heat conductivity, heat of the air outside the sealed structure or heat of components disposed outside the sealed structure can be prevented from being transferred via the flow-path-upstream-side duct member 73 to the air flowing from the cooling device 71 to the optical component casing 46 in the air flow passage from the flow paths C2, C3 to the flow paths C4, C5, C6. Accordingly, the air cooled to the low temperature on the heat absorbing side of the cooling device 71 can be sent to the optical components 45, 423, thereby efficiently cooling the optical components 45, 423.

Since the flow-path-upstream-side duct member 73 (base plate 731) is attached to the component-accommodating-portion main body 4612 of the optical component casing 46 with a predetermined space (e.g., about 5 to 10 mm), an air layer (heat insulating layer) between the flow-path-upstream-side duct member 73 and the optical component casing 46 can securely prevent the heat transferred from the optical components such as the light source device 41 to the optical component casing 46 from being transferred to the air flowing in the air flow passage from the flow paths C2, C3 to the flow paths C4, C5, C6.

By employing a structure for efficiently cooling the optical components 45, 423 as described above, the rotation speed of the circulation fan 72 does not have to be unnecessarily increased, thereby contributing to noise-reduction of the projector 1. In addition, the power consumption of the peltier element 7113 can also be restrained from being unnecessarily increased, thereby contributing to power-saving of the projector 1.

The flow-path-downstream-side duct member 74 includes the high-heat-conductive duct portion 742 that is formed of a high-heat-conductive material having a sufficiently high heat conductivity of equal to or higher than 42 W/(m·K) at the position planarly interfering with the cutout 4621 and the opening portion 4622 of the optical component casing 46. Specifically, in the flow-path-downstream-side duct member 74, the high-heat-conductive duct portion 742 is provided at a portion onto which the air heated by the optical components 45, 423 accommodated in the spaces Ar1, Ar2 in the optical component casing 46 is blown via the cutouts 4621 and the opening portion 4622 of the optical component casing 46 and via the opening portions 7414, 7415 of the low-heat-conductive duct portion 741. With the arrangement, the heat of the air flowing in the air flow passage of the flow paths C7, C8 in the flow-path-downstream-side duct member 74, namely the heat of the air heated by the optical components 45, 423 accommodated in the spaces Ar1, Ar2 in the optical component casing 46 can be released to the outside of the sealed structure via the high-heat-conductive duct portion 742. Accordingly, the temperature of the air flowing in the air flow passage in the sealed structure can be set to sufficiently low, so that the optical components 45, 423 can be cooled more efficiently.

The flow-path-downstream-side duct member 74 is formed by the two components of the high-heat-conductive duct portion 742 and the low-heat-conductive duct portion 741 that is formed of a low-heat-conductive material having a sufficiently low heat conductivity of equal to or lower than 0.9 W/(m·K), the low-heat-conductive duct portion 741 disposed close to the optical component casing 46. With the arrangement, the heat transferred from the optical components such as the light source device 41 to the optical component casing 46 can be prevented from being transferred via the low-heat-conductive duct portion 741 to the air flowing in the air flow passage of the flow paths C7, C8 in the flow-path-downstream-side duct member 74 Accordingly, by forming the flow-path-downstream-side duct member 74 by the two components of the high-heat-conductive duct portion 742 and the low-heat-conductive duct portion 741, the temperature of the air flowing in the air flow passage of the sealed structure can be set to sufficiently low, so that the optical components 45, 423 can be cooled more efficiently.

Since the flow-path-downstream-side duct member 74 (low-heat-conductive duct portion 741) is attached to the lid-like member 462 of the optical component casing 46 with a predetermined space (e.g., about 5 to 10 mm), an air layer (heat insulating layer) between the flow-path-downstream-side duct portion 74 and the optical component casing 46 can securely prevent the heat transferred from the optical components such as the light source device 41 to the optical component casing 46 from being transferred via the flow-path-downstream-side duct member 74 to the air flowing in the air flow passage of the flow paths C7, C8.

In the cooling device 71, since the heat-absorbing-side heat conductive member 7111 and the heat-releasing-side heat conductive member 7115 are relatively attached to the heat absorbing surface 7113A and the heat releasing surface 7113B of the peltier element 7113 in a heat-conductive manner, the surface areas of the heat absorbing side and the heat-releasing side can be increased. The cooling device 71 includes the cooling fan 714 that ejects the air to the heat-releasing-side heat conductive member 7115. With the arrangement, absorption and release of heat can be properly performed in the cooling device 71, thereby sufficiently cooling the air flowing in the air flow passage in the sealed structure.

Since the projector 1 includes the outer-side duct member 811, the air ejected from the cooling fan 714 and passed through the heat-releasing-side heat conductive member 7115 can be sent to a heat-generating member such as the control board 6 outside the sealed structure in the projector 1. With the arrangement, the projector 1 does not have to be provided with a cooling fan dedicated to cool the heat-generating member, thereby reducing the number of cooling fans and simplifying a cooling mechanism for cooling the heat-generating member outside the sealed structure.

Since the outer-side duct member 811 guides the air that is ejected from the cooling fan 714 and passed through the heat-releasing-side heat conductive member 7115 to a position between the flow-path-downstream-side duct member 74 and the control board 6, the flow-path-downstream-side duct member 74, the circuit element mounted on the control board 6 and the like that are heated by the heat of the air heated by the optical components 45, 423 accommodated in the spaces Ar1 and Ar2 in the optical component casing 46 can be cooled by the air flowing in the flow path C11 defined by the flow-path-downstream-side duct member 74, the control board 6 and the airflow guiding portion 812. Accordingly, the flow-path-downstream-side duct member 74 and the control board 6 can be prevented from being deteriorated by heat.

Meanwhile, in the driving state of the projector 1, namely in the driving state of the peltier element 7113, when the temperature of the heat absorbing surface 7113A of the peltier element 7113 becomes excessively low relative to the ambient temperature, condensation occurs on the heat absorbing side of the cooing device 71. The occurrence of the condensation on the heat absorbing side of the cooling device 71 might cause operational defect of the cooling device 71.

In the first exemplary embodiment, the polarity switch controller 612 of the peltier controller 61 performs the polarity switch control when the detected temperature difference between the detected temperature $T_D$ of the heat-absorbing-side heat conductive member 71111 (i.e., the temperature of the heat absorbing surface 7113A of the peltier element 7113) detected by the heat-absorbing-side temperature detector 63 and the ambient temperature $T_P$ outside the sealed structure detected by the ambient temperature detector 64 becomes equal to or larger than the set temperature difference based on the set temperature difference information stored in the memory 613. With the arrangement, by performing the polarity switch control when the detected temperature difference is equal to or larger than the set temperature difference, namely when the temperature of the heat-absorbing-side heat conductive member 7111 (i.e., the temperature of the heat absorbing surface 7113A of the peltier element 7113) becomes excessively low relative to the ambient temperature, the temperature of the surface facing the inside of the sealed structure (heat absorbing surface 7113A) in the peltier element 7113 is increased. Accordingly, the occurrence of the condensation on the heat absorbing side of the cooling device can be prevented, thereby preventing the operational defect of the cooling device 71 caused by the condensation.

Meanwhile, in a case where the normal voltage value $V_H$ is applied to the peltier element 7113 in a short time when the drive of the peltier element 7113 is started, gradient of temperature fall on the heat-absorbing side of the cooling device 71 is relatively large and gradient of temperature rise on the heat releasing side of the cooling device 71 is relatively large. When the gradient of the temperature change is relatively large, connecting states among components 7111 to 7115 forming the peltier unit 711 of the cooling device 71 are broken due to thermal stress among the components 7111 to 7115, which might result in operational defect of the cooling device 71. Also in a case where the voltage value applied to the peltier element 7113 is changed from the normal voltage value $V_H$ to 0V in a short time (as shown by the dotted dashed line in FIG. 22) when the drive of the peltier element 7113 is stopped, the operational defect of the cooling device 71 might occur similarly to the above case.

In the first exemplary embodiment, when the drive of the peltier element 7113 is started, the rectangular controller 611 of the peltier controller 61 performs the rectangular control for increasing stepwise the voltage value applied to the peltier element 7113 from 0V to the normal voltage value. With the arrangement, as compared to the above-described arrangement in which the normal voltage value $V_H$ is applied to the peltier element 7113 in a short time, the gradient of the temperature fall on the heat absorbing side of the cooling device 71 can be small while the gradient of the temperature rise on the heat releasing side of the cooling device 71 can be small. Accordingly, the thermal stress among the components 7111 to 7115 forming the peltier unit 711 of the cooling device 71 can be reduced, thereby preventing the operational defect of the cooling device 71.

When the drive of the peltier element 7113 is stopped, the rectangular controller 611 performs the rectangular control for decreasing stepwise the voltage value applied to the peltier element 7113 from the normal voltage value $V_H$ to 0V. With the arrangement, as compared to the above-described arrangement in which the voltage value applied to the peltier element 7113 is changed from the normal voltage value $V_H$ to 0V in a short time, the gradient of the temperature rise on the heat absorbing side of the cooling device 71 can be small while the gradient of the temperature fall on the heat releasing side of the cooling device 71 can be small. Accordingly, the thermal stress among the components 7111 to 7115 forming the peltier unit 711 of the cooling device 71 can be reduced, thereby preventing the operational defect of the cooling device 71.

Second Exemplary Embodiment

Next, a second exemplary embodiment of the invention will be described with reference to the attached drawings.

In the description below, the same components as those in the first exemplary embodiment are indicated by the same reference numerals for omitting or simplifying detailed description thereof.

Figure 23:
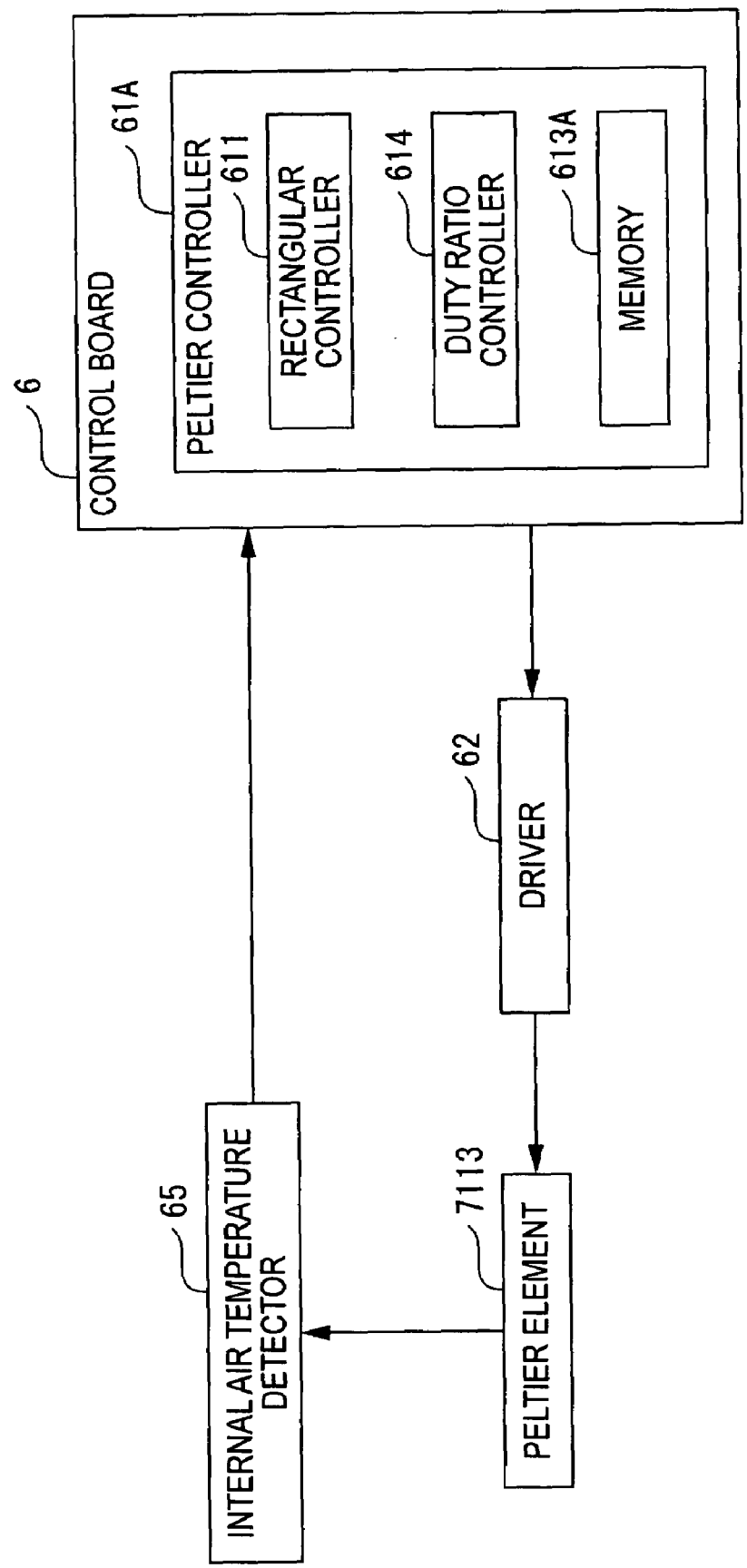
FIG. 23 is a block diagram schematically showing a control structure of a peltier element of a second exemplary embodiment.

FIG. 23 is a block diagram schematically showing a control structure of the peltier element 7113 of the second exemplary embodiment.

As shown in FIG. 23, the second exemplary embodiment is different from the first exemplary embodiment only in the structure of a peltier controller 61A as a control device for controlling the peltier element 7113 and in that an internal air temperature detector 65 that detects a temperature of air circulating in the sealed structure is provided instead of the heat-absorbing-side temperature detector 63. The other arrangements are the same as those in the first exemplary embodiment. Note that the internal air temperature detector 65 may be disposed at any position as long as the internal air temperature detector 65 can detect the temperature of the air circulating in the sealed structure.

As shown in FIG. 23, the peltier controller 61A includes a duty ratio controller 614 and a memory 613A in addition to the rectangular controller 611 described in the first exemplary embodiment.

The duty ratio controller 614 performs a duty ratio control in which the duty ratio controller 614 compares a detected temperature by the internal air temperature detector 65 with a set temperature based on set temperature information stored in the memory 613A and outputs a predetermined control command to the driver 62 to intermittently drive the peltier element 7113 with a duty ratio based on duty ratio information stored in the memory 613A when the detected temperature becomes equal to or lower than the set temperature.

The memory 613A stores, similarly to the memory 613 described in the first exemplary embodiment, a control program used when processing is performed by the controllers 611, 614, information required for executing the processing (the set temperature information, the duty ratio information etc.) and the like. In short, the memory 613A corresponds to the set temperature information storage section and a duty ratio information storage section of the invention.

The set temperature information is information about set temperature of air circulating in the sealed structure when the optical device 45 and the polarization converter 423 (to-be-cooled objects) are cooled to a desired temperature.

It should be noted that the duty ratio information is information about a ratio (duty ratio) of a drive time per unit time when the voltage is applied to the peltier element 7113 to a non-drive time per unit time when the voltage is not applied to the peltier element 7113, during the duty ratio control by the duty ratio controller 614.

It should also be noted that the memory 613A is so arranged that the above-described set temperature information and duty ratio information can be appropriately changed on, for instance, a menu window through the operation of the operation panel 212 or the remote controller, similarly to the memory 613 described in the first exemplary embodiment.

Next, a control method of the peltier element 7113 by the above-described peltier controller 61A will be described.

Figure 24:
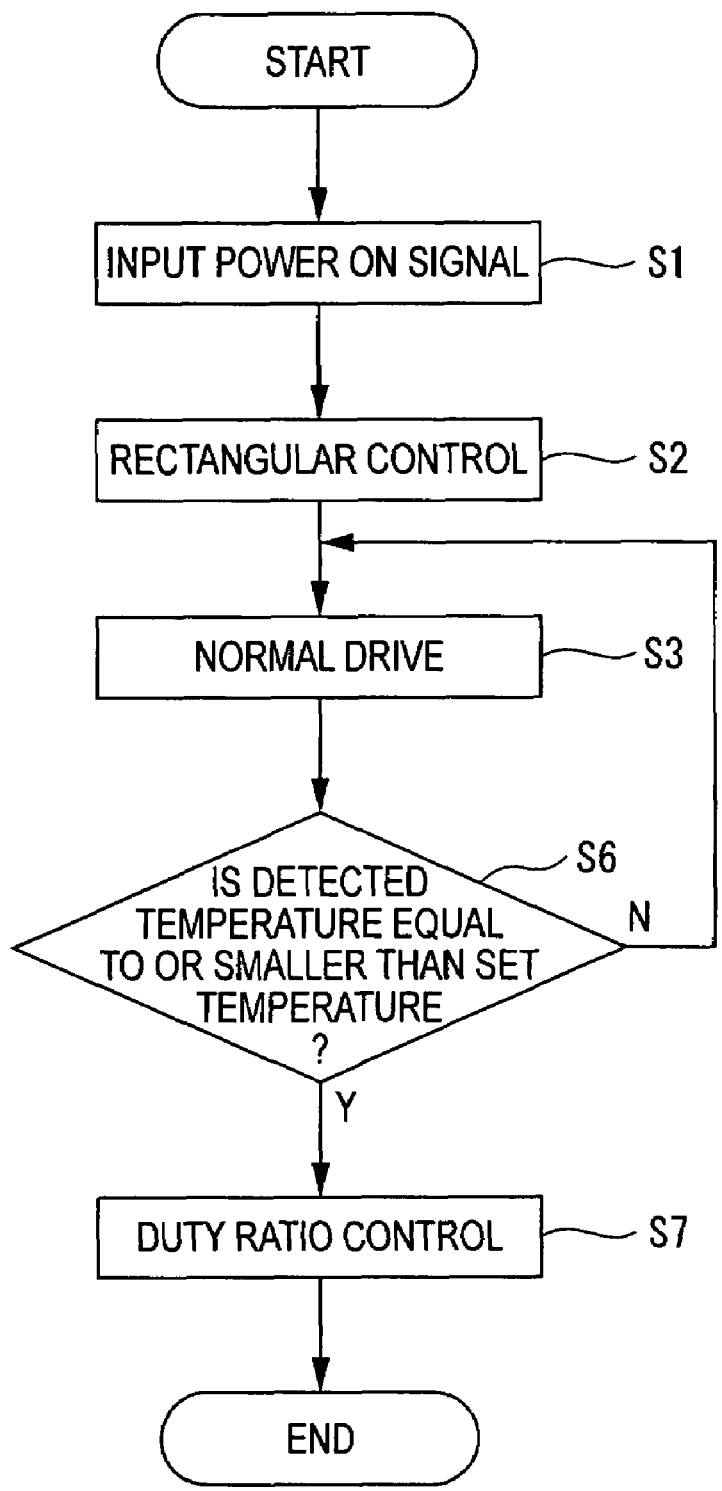
FIG. 24 is a flowchart showing how the peltier element is controlled according to the second exemplary embodiment.

FIG. 24 is a flowchart showing how the peltier element 7113 is controlled according to the second exemplary embodiment.

Note that descriptions of processes same as those in the first exemplary embodiment will be simplified in the following description.

First, similarly to the first exemplary embodiment, upon receiving the power ON signal (Step S1), the peltier controller 61A performs the rectangular control of the peltier element 7113 (Step S2) and the normal drive of the peltier element 7113 (Step S3).

Then, during the normal drive in Step S3, the peltier controller 61A recognizes the detected temperature $T_D$ detected by the internal air temperature detector 65 (see FIG. 25) and compares the detected temperature $T_D$ with the set temperature $T_S$ based on the set temperature information stored in the memory 613A (see FIG. 25) to judge whether or not the detected temperature $T_D$ becomes equal to or lower than the set temperature $T_S$ (Step S6)

When the judgment result is "N" in Step S6, namely when the detected temperature $T_D$ is larger than the set temperature $T_S$, the peltier controller 61A returns the process to Step S3 and maintains the normal drive.

On the other hand, when the judgment result is "Y" in Step S6, namely when the detected temperature $T_D$ is equal to or lower than the set temperature $T_S$, the peltier controller 61A performs the duty ratio control (Step S7).

Figure 25:
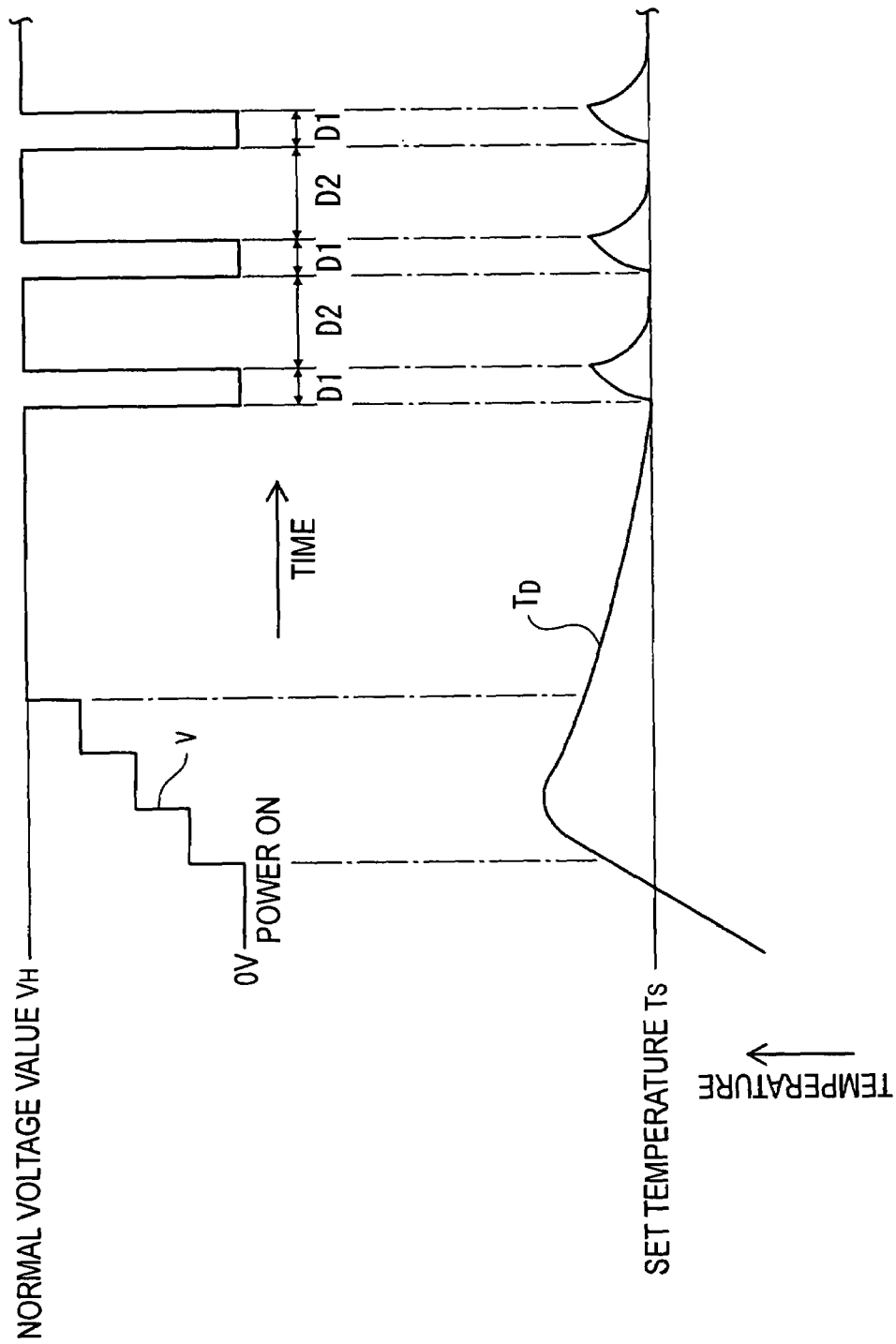
FIG. 25 shows an example of a duty ratio control performed by a duty ratio controller according to the second exemplary embodiment.

FIG. 25 shows an example of the duty ratio control performed by the duty ratio controller 614.

Note that, similarly to FIG. 22, FIG. 25 shows behaviors of an applied voltage value V (upper part) and the detected temperature $T_D$ by the internal air temperature detector 65 (lower part)

Specifically, in Step S7, when the detected temperature $T_D$ becomes equal to or lower than the set temperature $T_S$ as shown in FIG. 25, the duty ratio controller 614 outputs a predetermined control command to the driver 62 to perform the duty ratio control for intermittently driving the peltier element 7113 such that a non-driving state D1 in which the voltage is not applied to the peltier element 7113 and a driving state D2 in which the normal voltage value $V_H$ is applied to the peltier element 7113 are repeated by a duty ratio based on the duty ratio information stored in the memory 613A.

When receiving the power OFF signal during the Steps S1 to S3, S6 and S7, the peltier controller 61A performs the rectangular control similarly to the first exemplary embodiment to stop the drive of the peltier element 7113.

The above-described second exemplary embodiment can provide following exemplary advantages in addition to the same advantages to the first exemplary embodiment.

In the second exemplary embodiment, the duty ratio controller 614 of the peltier controller 61A performs the duty ratio control when the detected temperature $T_D$ of the air inside the sealed structure which is detected by the internal air temperature detector 65 becomes equal to or lower than the set temperature $T_S$ based on the set temperature information stored in the memory 613A. With the arrangement, the duty ratio control is performed when the detected temperature $T_D$ becomes equal to or lower than the set temperature $T_S$, namely when the drive of the peltier element 7113 is stabilized. Accordingly, as compared to an arrangement in which a certain normal voltage value $V_H$ is constantly applied to the peltier element 7113 even after the drive of the peltier element 7113 is stabilized, consumption power of the peltier element 7113 can be reduced, thus contributing to power-saving of the projector 1. In addition, since the duty ratio control is performed after the drive of the peltier element 7113 is stabilized, the cooling efficiency of the air flowing in the air flow passage in the sealed structure can be sufficiently ensured in the cooling device 71.

Third Exemplary Embodiment

Next, a third exemplary embodiment of the invention will be described with reference to the attached drawings.

In the description below, the same components as those in the second exemplary embodiment are indicated by the same reference numerals for omitting or simplifying detailed description thereof.

Figure 26:
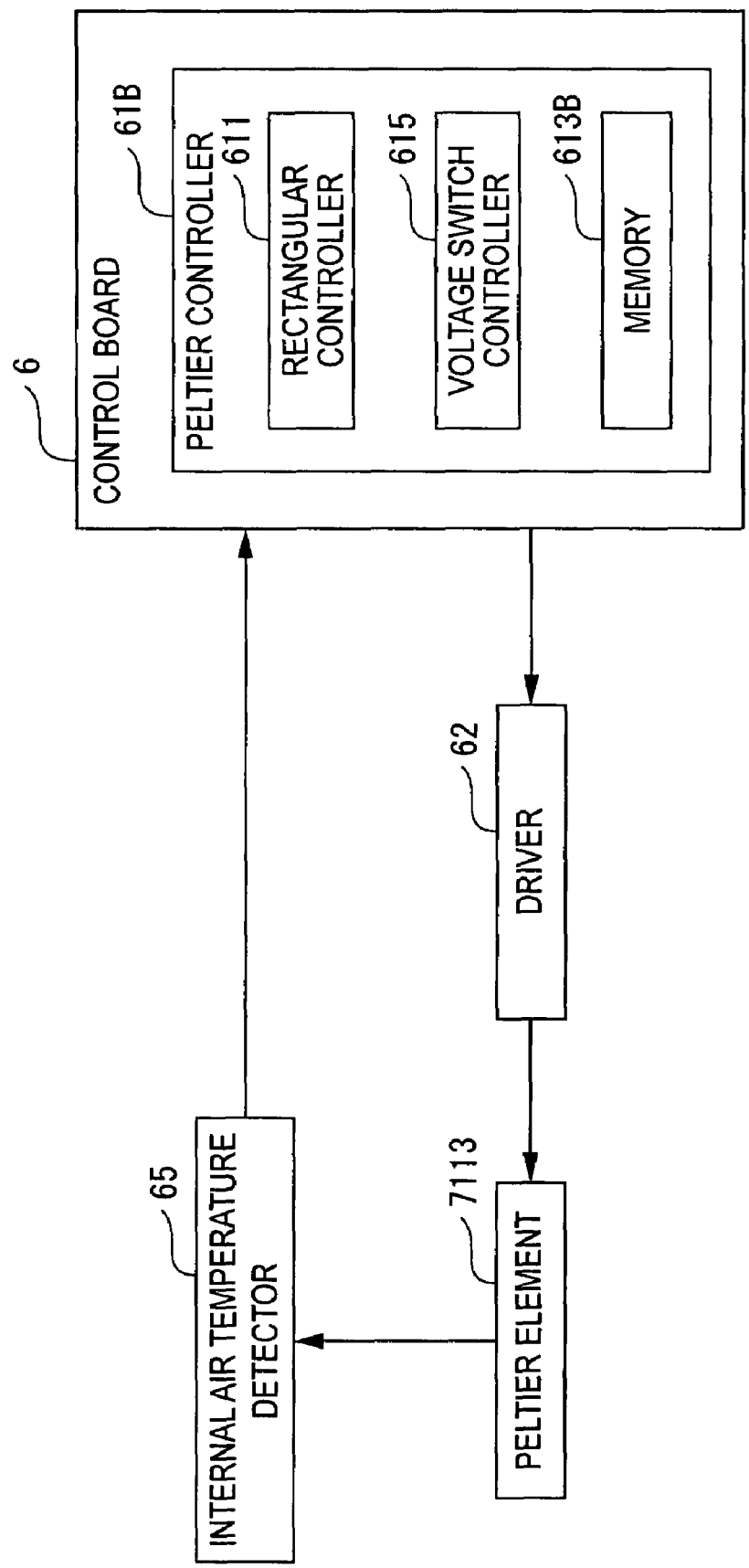
FIG. 26 is a block diagram schematically showing a control structure of a peltier element of a third exemplary embodiment.

FIG. 26 is a block diagram schematically showing a control structure of the peltier element 7113 of a third exemplary embodiment.

The third exemplary embodiment is different from the second exemplary embodiment only in a structure of a peltier controller 61B as a control device for controlling the peltier element 7113 as shown in FIG. 26. The other arrangements are the same as those of the second exemplary embodiment.

As shown in FIG. 26, the peltier controller 61B includes a voltage switch controller 615 and a memory 613B in addition to the rectangular controller 611 described in the first exemplary embodiment.

The voltage switch controller 615 performs a voltage switch control in which the voltage switch controller 615 compares the detected temperature by the internal air temperature detector 65 with a set temperature based on set temperature information stored in the memory 613B and outputs a predetermined control command to the driver 62 to repeatedly perform the normal drive and a low-voltage drive of the peltier element 7113 based on normal drive time information and low-voltage drive time information stored in the memory 613B when the detected temperature becomes equal to or lower than the set temperature.

The memory 613B stores, similarly to the memory 613 described in the first exemplary embodiment, a control program used when processing is performed by the controllers 611, 615, information required for executing the processing (the set temperature information, the normal drive time information, the low-voltage drive time information etc.) and the like. In short, the memory 613B corresponds to the set temperature information storage section and a drive time information storage section of the invention.

The set temperature information is the same as that described in the second exemplary embodiment.

The normal drive time information is information about a drive time when the peltier element 7113 is normally driven (i.e., when the normal voltage value is applied to the peltier element 7113) in the voltage switch control by the voltage switch controller 615.

The low-voltage drive time information is information about a drive time when the peltier element 7113 is driven by low voltage (i.e., when a voltage value lower than the normal voltage value is applied to the peltier element 7113) in the voltage switch control by the voltage switch controller 615.

It should also be noted that the memory 613B is so arranged that the above-described set temperature information and normal drive time information and low-voltage drive time information can be appropriately changed on, for instance, a menu window through the operation of the operation panel 212 or the remote controller, similarly to the memory 613 described in the first exemplary embodiment.

Next, a control method of the peltier element 7113 by the above-described peltier controller 61B will be described.

Figure 27:
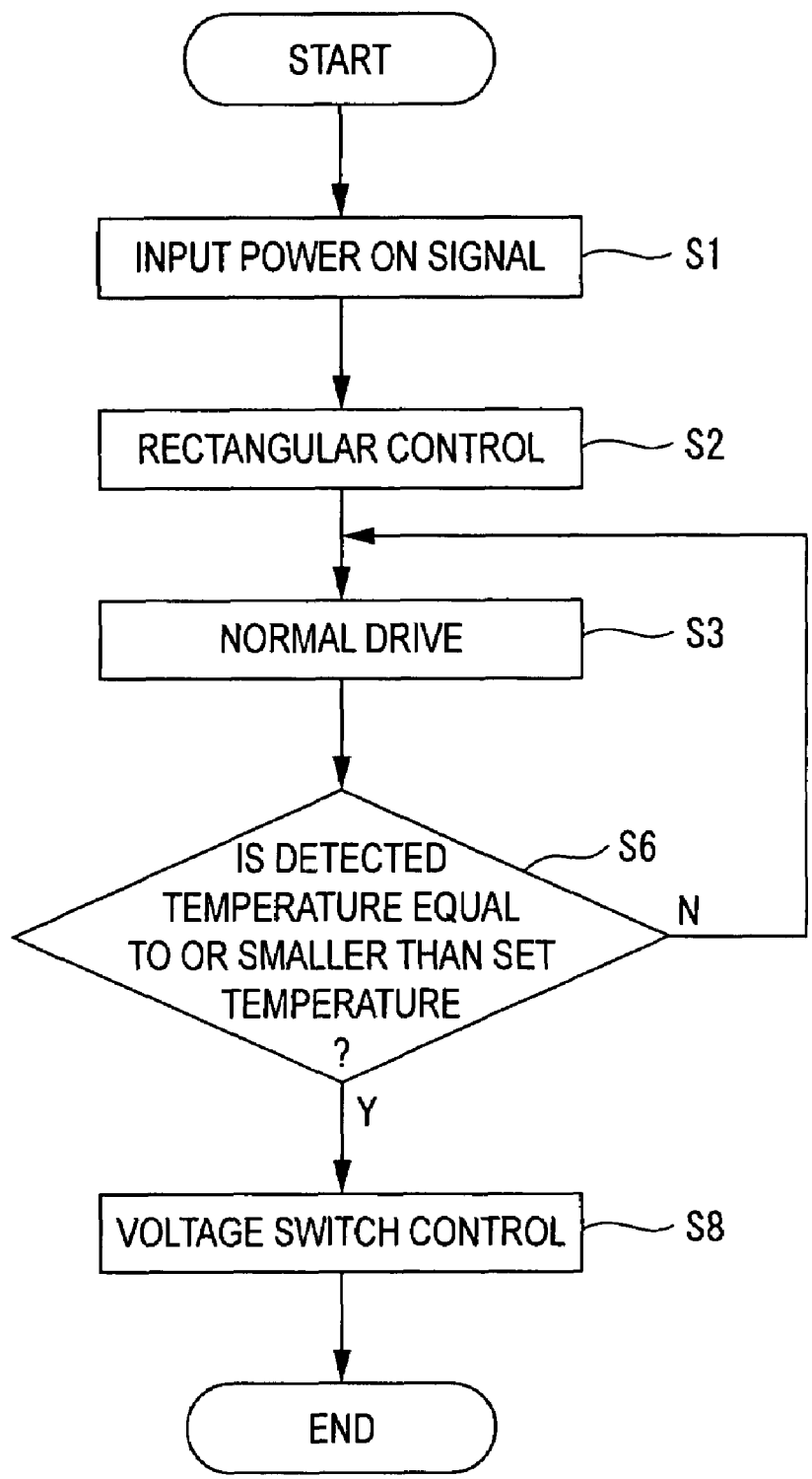
FIG. 27 is a flowchart showing how the peltier element is controlled according to the third exemplary embodiment.

FIG. 27 is a flowchart showing how the peltier element 7113 is controlled according to the third exemplary embodiment.

Note that the description of processes same as those in the first and second exemplary embodiments will be simplified in the following description.

First, similarly to the second exemplary embodiment, upon receiving the power ON signal (Step S1), the peltier controller 61B performs the rectangular control of the peltier element 7113 (Step S2), the normal drive of the peltier element 7113 (Step S3) and a judgment on whether or not the detected temperature $T_D$ (see FIG. 28) becomes equal to or lower than the set temperature $T_S$ (see FIG. 28) (Step S6).

When the judgment result is "N" in Step S6, namely when the detected temperature $T_D$ is larger than the set temperature $T_S$, the peltier controller 61B returns the process to Step S3 and maintains the normal drive.

On the other hand, when the judgment result is "Y" in Step S6, namely when the detected temperature $T_D$ is equal to or lower than the set temperature $T_S$, the peltier controller 61B performs the voltage switch control (Step S8).

Figure 28:
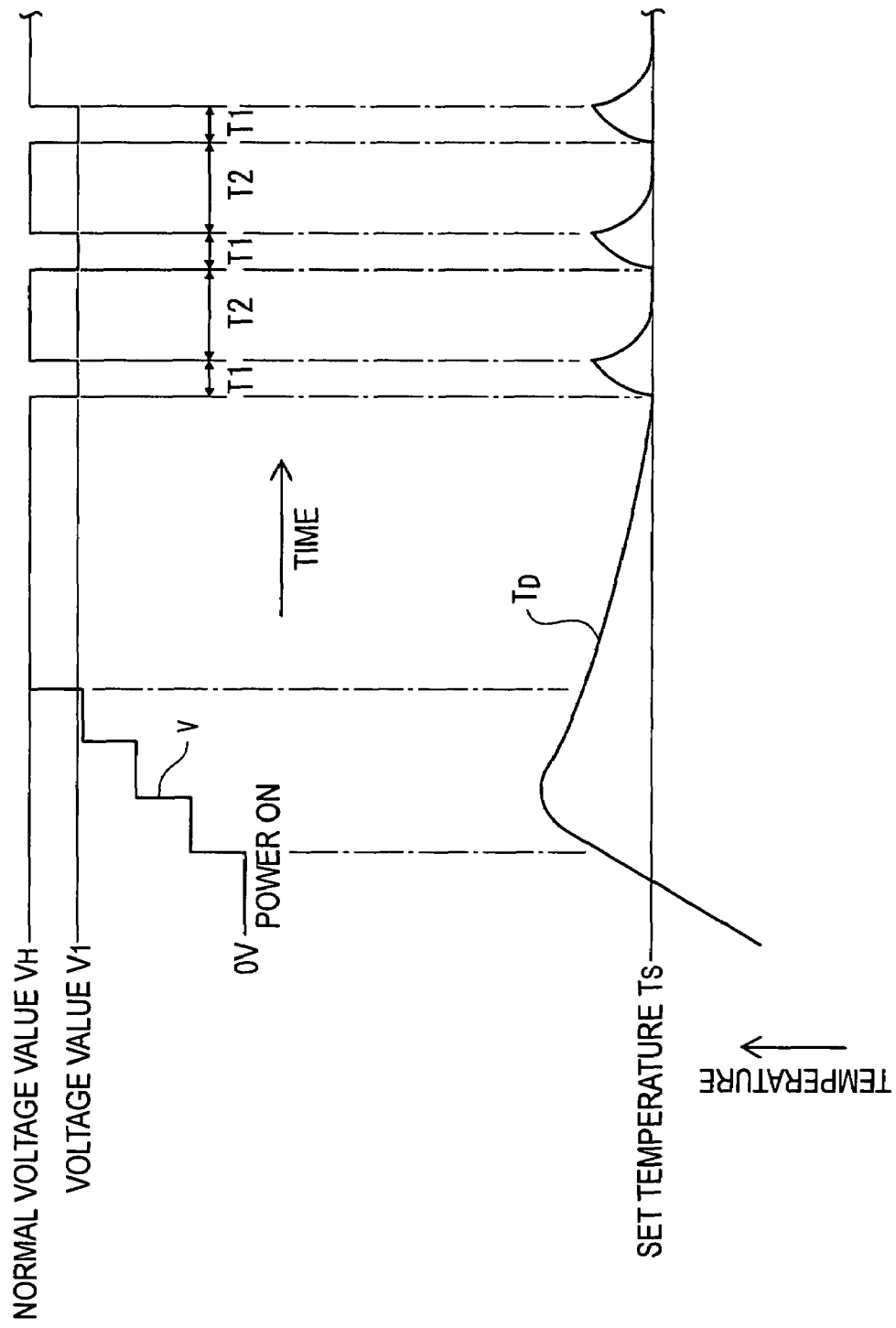
FIG. 28 shows an example of a voltage switching control performed by a voltage switch controller according to the third exemplary embodiment.

FIG. 28 shows an example of the voltage switch control performed by the voltage switch controller 615.

Note that, similarly to FIGS. 22 and 25, FIG. 28 shows behaviors of an applied voltage value V (upper part) and the detected temperature $T_D$ by the internal air temperature detector 65 (lower part).

Specifically, as shown in FIG. 28, when the detected temperature $T_D$ becomes equal to or lower than the set temperature $T_S$, the voltage switch controller 615 performs the voltage switch control in which the voltage switch controller 615 outputs a predetermined control command to the driver 62 to repeatedly perform the low-voltage drive in which a low voltage V1 lower than the normal voltage value $V_H$ is applied to the peltier element 7113 for a drive time T1 and the normal drive in which the normal voltage value $V_H$ is applied to the peltier element 7113 for a drive time T2, the drive time T1 being based on the low-voltage drive time information stored in the memory 613B, the drive time T2 being based on the normal drive time information stored in the memory 613B.

When receiving the power OFF signal during the Steps S1 to S3, S6 and S8, the peltier controller 61B performs the rectangular control similarly to the first exemplary embodiment to stop the drive of the peltier element 7113.

With the arrangement of the third exemplary embodiment in which the voltage drive switch control is performed after the drive of the peltier element 7113 is stabilized, the advantages same as those in the first and second exemplary embodiments can be attained.

Note that the scope of the invention is not limited to the above-described embodiments but includes modifications, improvements and the like as long as an object of the invention can be achieved.

In the above-described exemplary embodiments, the optical device 45 and the polarization converter 423 are employed as optical components disposed in the sealed structure. However, the arrangement is not limited thereto. Only one of the optical device 45 and the polarization converter 423 may be disposed in the sealed structure, or an optical component other than the optical device 45 and the polarization converter 423 may be alternatively disposed in the sealed structure.

In the above-described exemplary embodiments, although the flow-path-downstream-side duct member 74 is formed by the two components of the high-heat-conductive duct portion 742 and the low-heat-conductive duct portion 741, the low-heat-conductive duct portion 741 may be formed of a high-heat-conductive material similar to that of the high-heat-conductive duct portion 742. In the flow-path-downstream-side duct member 74, only the position planarly interfering with the cutout 4621 and the opening portion 4622 of the optical component casing 46 may be made of the high-heat-conductive material.

In the above-described exemplary embodiments, the outer-side duct member 811 guides the air ejected from the cooling fan 714 and passed through the heat-releasing-side heat conductive member 7115 to a position between the flow-path-downstream-side duct member 74 and the control board 6, but the arrangement is not limited thereto. The outer-side duct member 811 may alternatively guide the air toward heat-generating members such as the power source unit 5 and the light source device 41.

In the above-described exemplary embodiments, the peltier element 7113 may be controlled by a proper combination of the control structures of the first, second and third exemplary embodiments.

Figure 29:
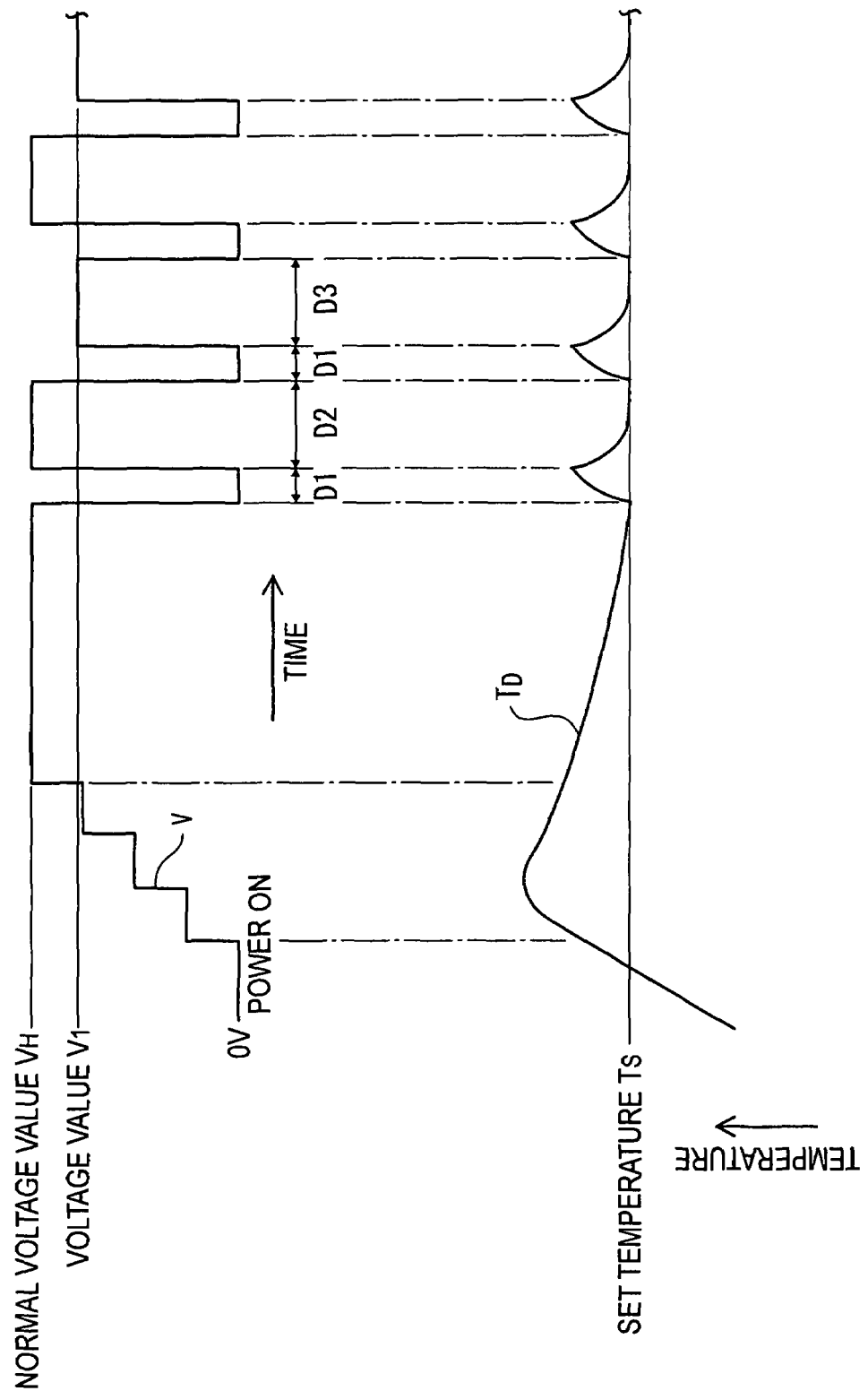
FIG. 29 shows a modification of the second and third exemplary embodiments.

Specifically, FIG. 29 shows a control in which the duty ratio control described in the second exemplary embodiment and the voltage switch control described in the third exemplary embodiment are combined. Note that, similarly to FIGS. 22, 25 and FIG. 28, FIG. 29 shows behaviors of an applied voltage value V (upper part), a temperature $T_P$ in the vicinity of the liquid crystal panel 451 (middle part) and the detected temperature $T_D$ by the heat-absorbing-side temperature detector 63 (lower part).

For example, the peltier element 7113 may be controlled by a combination of the duty ratio control described in the second exemplary embodiment and the voltage switch control described in the third exemplary embodiment. Specifically, as shown in FIG. 29, after the drive of the peltier element 7113 is stabilized, a control is performed so as to repeat the non-driving state D1 in which the voltage is not applied to the peltier element 7113 and the driving state D2 in which the normal voltage value $V_H$ is applied to the peltier element 7113 and to repeat the non-driving state D1 and the driving state D3 in which the voltage value V1 is applied to the peltier element 7113. With the control, the consumption power of the peltier element 7113 can further be reduced, thereby more appropriately contributing to power-saving of the projector 1.

In the above-described exemplary embodiments, the light source device 41 is a discharge optical emission type optical device. However, the arrangement is not limited thereto. A solid light-emitting element such as a laser diode, an LED (Light Emitting Diode), an organic EL (Electro Luminescence) element and a silicon light-emitting element may be alternatively employed.

In the above-described exemplary embodiments, only one light source device 41 is used and the color separating optical system 43 separates light into three colors of light. However, the color separating optical system 43 may be omitted and three solid light-emitting elements each irradiating the three colors of light may be employed as the light source device.

In the above-described exemplary embodiments, the cross dichroic prism 453 is employed as a color-combining optical device. However, the arrangement is not limited thereto. A plurality of dichroic mirrors may be alternatively employed for combining the color light.

In the above-described exemplary embodiments, the projector 1 is a three-panel projector having the three liquid crystal panels 451. However, the arrangement is not limited thereto. A single-panel projector having only one liquid crystal panel may be employed. Alternatively, a projector having two liquid crystal panels or a projector having four or more liquid crystal panels may be employed.

In the above-described exemplary embodiments, the liquid crystal panels are a transmissive type having a light incident surface and a light irradiation surface individually. However, the liquid crystal panels may be a reflection type having a surface serving as both of the light incident surface and the light irradiation surface.

In the above-described exemplary embodiments, the liquid crystal panels are used as an optical modulator. However, the optical modulator may not be liquid crystal.

In the above-described exemplary embodiments, only a front-type projector that projects an image in a direction for observing a screen is exemplified, but an aspect of the invention can be applied to a rear-type projector that projects an image in a direction opposite to the direction for observing the screen.

Although the best mode for implementing an aspect of the invention has been disclosed above, the scope of the invention is not limited thereto. Specifically, although the aspects of the invention have been illustrated and described by taking certain exemplary embodiments as an example, a person skilled in the art can modify the exemplified arrangements in shape, material, quantity and other details without departing from the technical idea and scope of the invention.

Hence, the description containing limitation on shape, material and the like is presented as an example for easy understanding but not intended to limit the invention. Therefore, a description using the names of the components without a part of or all of the limitation on shape, material and the like is also contained in the scope of the invention.

The projector according to the aspect of the invention can efficiently cool optical components while stably securing image quality of a projected image, thus being applicable as a projector for presentation or home theater.

What is claimed is:

1. A projector, comprising:
   an optical component;
   a sealed structure that includes an optical component casing accommodating the optical component inside, a cooling device, a plurality of duct members including a flow-path-upstream-side duct member that guides air from the cooling device to the optical component casing, and a ringed air flow passage defined by the duct members,
   the optical component casing including an air inlet for introducing air into the optical component casing and an air outlet for exhausting the air to an outside of the optical component casing,
   the cooling device including a thermoelectric conversion element having a heat absorbing surface that faces an inside of the sealed structure and a heat releasing surface that faces an outside of the sealed structure,
   the duct members introducing the air into the optical component casing via the air inlet and re-introducing the air that is exhausted from the inside to the outside of the optical component casing via the air outlet again into the optical component casing via the air inlet,
   the optical component disposed in the ringed air flow passage, the ringed air flow passage allowing the air circulating therein; and
   a circulation fan that circulates the air in the ringed air flow passage, the circulation fan disposed on a downstream side of the cooling device and an upstream side of the optical component casing along an air-flowing direction in the ringed air flow passage, wherein
   the cooling device includes a heat-absorbing-side heat conductive member and a heat-releasing-side heat conductive member respectively attached to the heat absorbing surface and the heat releasing surface of the thermoelectric conversion element in a heat-conductive manner, and a heat-transfer inhibiting member disposed between the heat-absorbing-side heat conductive member and the heat-releasing-side heat conductive member, the heat-transfer inhibiting member having a contour that covers the heat-absorbing-side heat conductive member in plan view, the heat-transfer inhibiting member provided with an opening for accommodating the thermoelectric conversion element therein,
   the heat-absorbing-side heat conductive member, the heat-releasing-side heat conductive member and the heat-transfer inhibiting member are integrally formed, and
   the flow-path-upstream-side duct member and the heat-transfer inhibiting member are formed of a material having a heat conductivity equal to or lower than 0.9 W(m·K).

2. The projector according to claim 1, wherein a flow-path-downstream-side duct member of the plurality of duct members that guides the air from the optical component casing to the cooling device is formed of a material having a heat conductivity of equal to or higher than 42 W(m·K).

3. The projector according to claim 1, wherein
   a flow-path-downstream side duct member of the plurality of duct members that guides the air from the optical component casing to the cooling device includes a high-heat-conductive duct portion at a position planarly interfering with the air outlet, and
   the high-heat-conductive duct portion is formed of a material having a heat conductivity of equal to or higher than 42 W(m·K).

4. The projector according to claim 3, wherein
   the flow-path-downstream-side duct member includes two components of the high-heat-conductive duct portion and a low-heat-conductive portion that is disposed close to the optical component casing, and
   the low-heat-conductive duct portion is formed of a material having a heat conductivity of equal to or lower than 0.9 W(m·K).

5. The projector according to claim 1, wherein
the cooling device further includes a cooling fan and an outer-side duct member,
the cooling fan introducing the air from an outside of the projector into an inside of the projector and ejecting the air toward the heat-releasing-side heat conductive member,
the outer-side duct member guiding the air that is ejected by the cooling fan and passed through the heat-releasing-side heat conductive member to a heat-generating member disposed outside the sealed structure in the projector.

6. The projector according to claim 5, further comprising:
a control board that controls components of the projector, wherein
the optical component casing, a flow-path-downstream-side duct member of the plurality of duct members that guides the air from the optical component casing to the cooling device and the control board are disposed in order of mention in an overlapping manner, and
the outer-side duct member guides the air that is ejected from the cooling fan and passed through the heat-releasing-side heat conductive member to a position between the flow-path-downstream-side duct member and the control board.

7. The projector according to claim 1, further comprising:
a control device, a heat-absorbing-side temperature detector and an ambient temperature detector, the control device applying a voltage to the thermoelectric conversion element to control drive of the thermoelectric conversion element, the heat-absorbing-side temperature detector detecting a temperature of a heat-absorbing-side heat conductive member that is attached to the heat absorbing surface of the thermoelectric conversion element in a heat-conductive manner, the ambient temperature detector detecting an ambient temperature outside the sealed structure, wherein
the control device includes:
a set temperature difference information storage section that stores set temperature difference information about a set temperature difference between a set temperature of the heat-absorbing-side heat conductive member and a set ambient temperature outside the sealed structure; and
a polarity switch controller that performs a polarity switch control in which the polarity switch controller compares a detected temperature detected by the heat-absorbing-side temperature detector with an ambient temperature detected by the ambient temperature detector and switches polarity of the voltage applied to the thermoelectric conversion element when a detected temperature difference between the detected temperature and the ambient temperature becomes equal to or larger than the set temperature difference based on the set temperature difference information.

8. The projector according to claim 1, further comprising:
a control device that applies a voltage to the thermoelectric conversion element to control drive of the thermoelectric conversion element, wherein
the control device includes a rectangular controller that performs a rectangular control in which the rectangular controller increases stepwise the voltage applied to the thermoelectric conversion element to a normal voltage value when the drive of the thermoelectric conversion element is started and decreases stepwise the voltage applied to the thermoelectric conversion element from the normal voltage value when the drive of the thermoelectric conversion element is stopped.

9. The projector according to claim 1, further comprising:
a control device that applies a voltage to the thermoelectric conversion element to control drive of the thermoelectric conversion element; and
an internal air temperature detector that detects an air temperature inside the sealed structure, wherein
the control device includes:
a set temperature information storage section that stores set temperature information about a set air temperature inside the sealed structure;
a duty ratio information storage section that stores duty ratio information about a predetermined duty ratio; and
a duty ratio controller that performs a duty ratio control in which the duty ratio controller compares a detected temperature detected by the internal air temperature detector with a set temperature based on the set temperature information and intermittently drives the thermoelectric conversion element with a duty ratio based on the duty ratio information when the detected temperature becomes equal to or lower than the set temperature.

10. The projector according to claim 1, further comprising:
a control device that applies a voltage to the thermoelectric conversion element to control drive of the thermoelectric conversion element; and
an internal air temperature detector that detects an air temperature inside the sealed structure, wherein
the control device includes:
a set temperature information storage section that stores set temperature information about a set air temperature inside the sealed structure;
a drive time information storage section that stores normal drive time information about a normal drive time for normally driving the thermoelectric conversion element and low-voltage drive time information about a low-voltage drive time for driving the thermoelectric conversion element at a low voltage lower than a normal voltage value that is applied during the normal drive time; and
a voltage switch controller that performs a voltage switch control in which the voltage switch controller compares a detected temperature detected by the internal air temperature detector with a set temperature based on the set temperature information and repeatedly performs normal drive and low-voltage drive based on the normal drive time information and the low-voltage drive time information when the detected temperature becomes equal to or lower than the, set temperature.

11. A projector, comprising:
an optical component;
a sealed structure that includes an optical component casing accommodating the optical component inside, a cooling device, a plurality of duct members including a flow-path-upstream-side duct member that guides air from the cooling device to the optical component casing, and a ringed air flow passage defined by the duct members,
the optical component casing including an air inlet for introducing air into the optical component casing and an air outlet for exhausting the air to an outside of the optical component casing,
the cooling device including a thermoelectric conversion element having a heat absorbing surface that faces an inside of the sealed structure and a heat releasing surface that faces an outside of the sealed structure, a heatabsorbing-side heat conductive member, a heat-releasing-side heat conductive member, a cooling fan, and an outer-side duct member, the duct members introducing the air into the optical component casing via the air inlet and re-introducing the air that is exhausted from the inside to the outside of the optical component casing via the air outlet again into the optical component casing via the air inlet, the flow-path-upstream-side duct member formed of a material having a heat conductivity of equal to or lower than 0.9 W/(m·K), the optical component disposed in the ringed air flow passage, the ringed air flow passage allowing the air circulating therein;

a circulation fan that circulates the air in the ringed air flow passage, the circulation fan disposed on a downstream side of the cooling device and an upstream side of the optical component casing along an air-flowing direction in the ringed air flow passage; and a control board that controls components of the projector, wherein the heat-absorbing-side heat conductive member and the heat-releasing-side heat conductive member are respectively attached to the heat absorbing surface and the heat releasing surface of the thermoelectric conversion element in a heat-conductive manner, the cooling fan introduces the air from an outside of the projector into an inside of the projector and ejects the air toward the heat-releasing-side heat conductive member, the outer-side duct member guides the air that is ejected by the cooling fan and passed through the heat-releasing-side heat conductive member to a heat-generating member disposed outside the sealed structure in the projector, the optical component casing, a flow-path-downstream-side duct member of the plurality of duct members that guides the air from the optical component casing to the cooling device and the control board are disposed in order of mention in an overlapping manner, and the outer-side duct member guides the air that is ejected from the cooling fan and passed through the heat-releasing-side heat conductive member to a position between the flow-path-downstream-side duct member and the control board.

* * * * *